United States Patent
Hayashi et al.

(10) Patent No.: US 11,348,549 B2
(45) Date of Patent: May 31, 2022

(54) DISPLAY DEVICE AND METHOD OF DRIVING DISPLAY DEVICE

(71) Applicant: Japan Display Inc., Tokyo (JP)

(72) Inventors: Hirotaka Hayashi, Tokyo (JP); Gen Koide, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 17/155,316

(22) Filed: Jan. 22, 2021

(65) Prior Publication Data

US 2021/0142754 A1     May 13, 2021

Related U.S. Application Data

(63) Continuation of application No. PCT/JP2019/029313, filed on Jul. 25, 2019.

(30) Foreign Application Priority Data

Jul. 31, 2018   (JP) .............................. JP2018-143874

(51) Int. Cl.
  *G09G 3/30*      (2006.01)
  *G09G 3/36*      (2006.01)
  (Continued)

(52) U.S. Cl.
  CPC ......... *G09G 3/3677* (2013.01); *G02F 1/1368* (2013.01); *G02F 1/136213* (2013.01);
  (Continued)

(58) Field of Classification Search
  CPC ............. G02F 1/1368; G02F 1/136213; G02F 1/136286; G09G 3/3614; G09G 3/3688;
  (Continued)

(56) References Cited

U.S. PATENT DOCUMENTS 5,999,234 A * 12/1999 Budd ................ G02F 1/134363
                                                            349/38
2009/0109360 A1   4/2009 Takahashi
(Continued)

FOREIGN PATENT DOCUMENTS

JP     2008-281922 A     11/2008
JP     2009-109600 A      5/2009

OTHER PUBLICATIONS

International Search Report dated Sep. 17, 2019 in PCT/JP2019/029313 filed on Jul. 25, 2019, 2 pages.
(Continued)

*Primary Examiner* — Sanghyuk Park
(74) *Attorney, Agent, or Firm* — Oblon, McClelland, Maier & Neustadt, L.L.P.

(57)    ABSTRACT

According to one embodiment, a display device includes a first scanning line, a second scanning line, a signal line, a capacitance line, and a pixel. The pixel includes a pixel electrode, an auxiliary electrode, a first switch, a second switch, and a third switch. The first switch is electrically connected to the signal line, the pixel electrode, and the first scanning line. The second switch is electrically connected to the auxiliary electrode, the first scanning line, and the capacitance line. The third switch is electrically connected to the signal line, the second scanning line, and the auxiliary electrode.

11 Claims, 33 Drawing Sheets

(51) Int. Cl.
*G02F 1/1362* (2006.01)
*G02F 1/1368* (2006.01)

(52) U.S. Cl.
CPC .. *G02F 1/136227* (2013.01); *G02F 1/136286* (2013.01); *G09G 3/3614* (2013.01); *G09G 3/3688* (2013.01); *G09G 2300/0426* (2013.01); *G09G 2310/0202* (2013.01); *G09G 2310/08* (2013.01)

(58) Field of Classification Search
CPC ... G09G 2300/0426; G09G 2310/0202; G09G 2310/08; G09G 3/3677
See application file for complete search history.

(56) References Cited

U.S. PATENT DOCUMENTS

| | | | | |
|---|---|---|---|---|
| 2009/0135323 | A1* | 5/2009 | Yang | G02F 1/13624 349/37 |
| 2012/0113080 | A1* | 5/2012 | den Boer | G02F 1/13624 345/211 |
| 2012/0113084 | A1* | 5/2012 | Yang | G09G 3/3655 345/212 |
| 2016/0246102 | A1* | 8/2016 | Hsu | G02F 1/13306 |

OTHER PUBLICATIONS

Office Action dated Feb. 1, 2022, in Japanese Patent Application No. 2018-143874, Machine Translation provided by Global Dossier.

\* cited by examiner

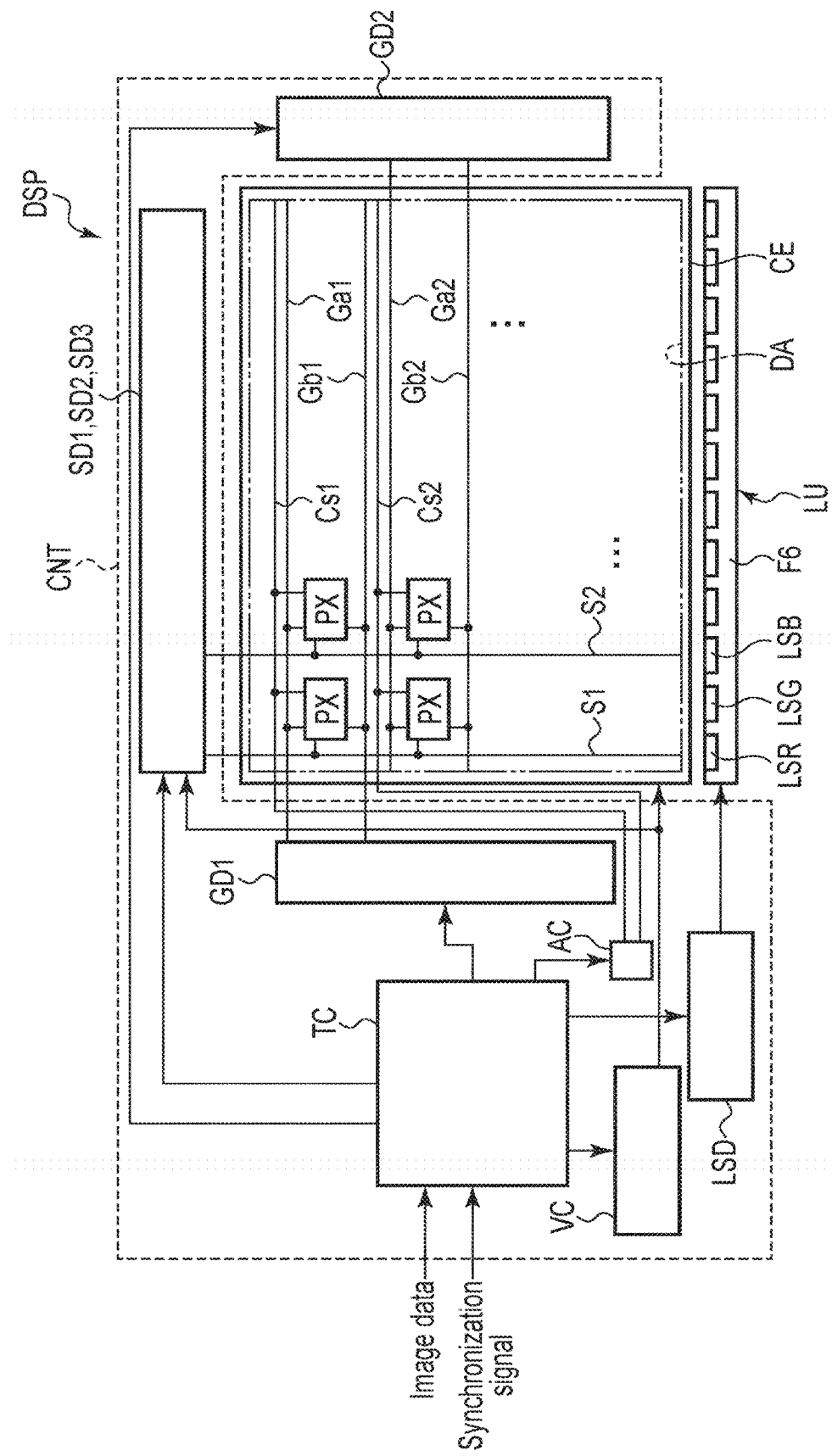
F I G. 3

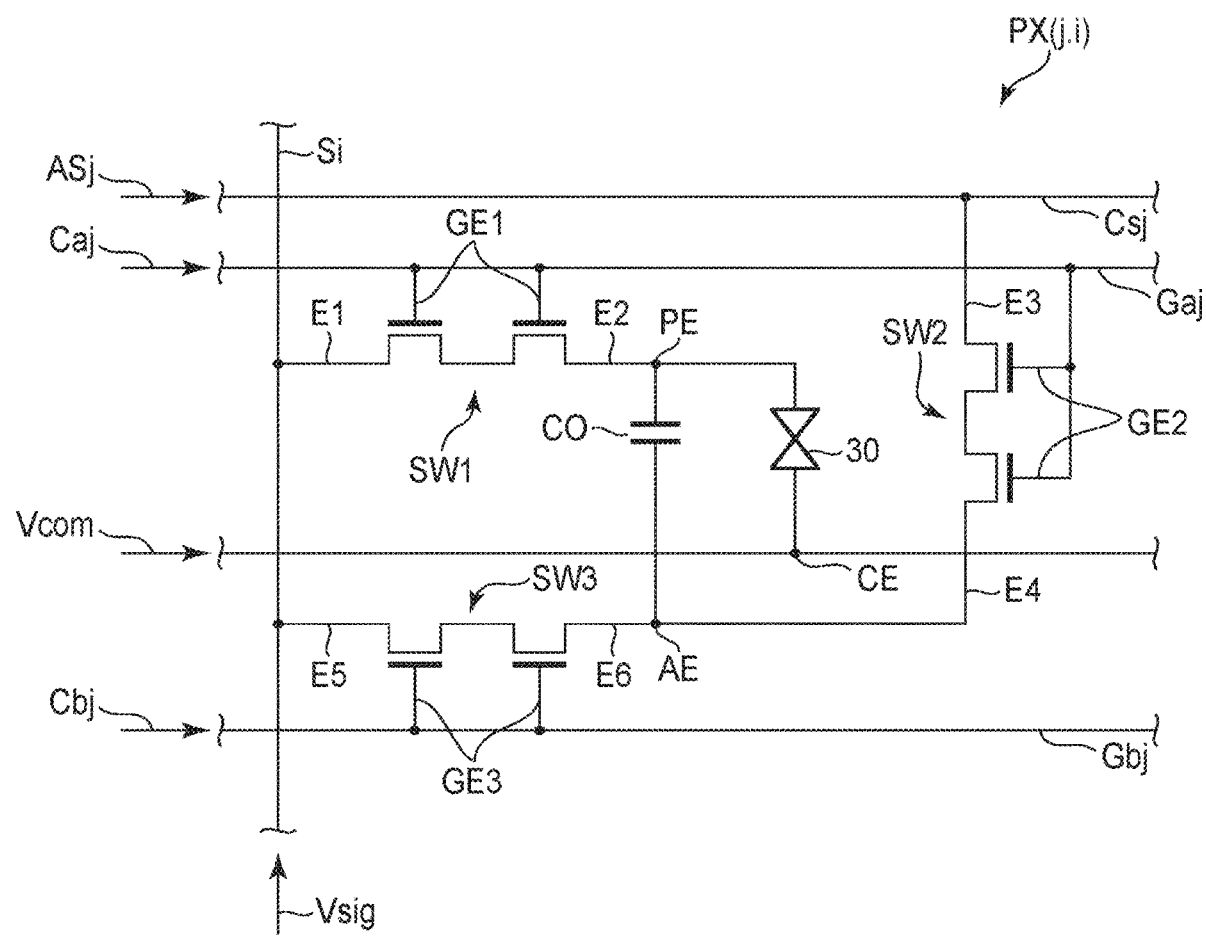
F I G. 4

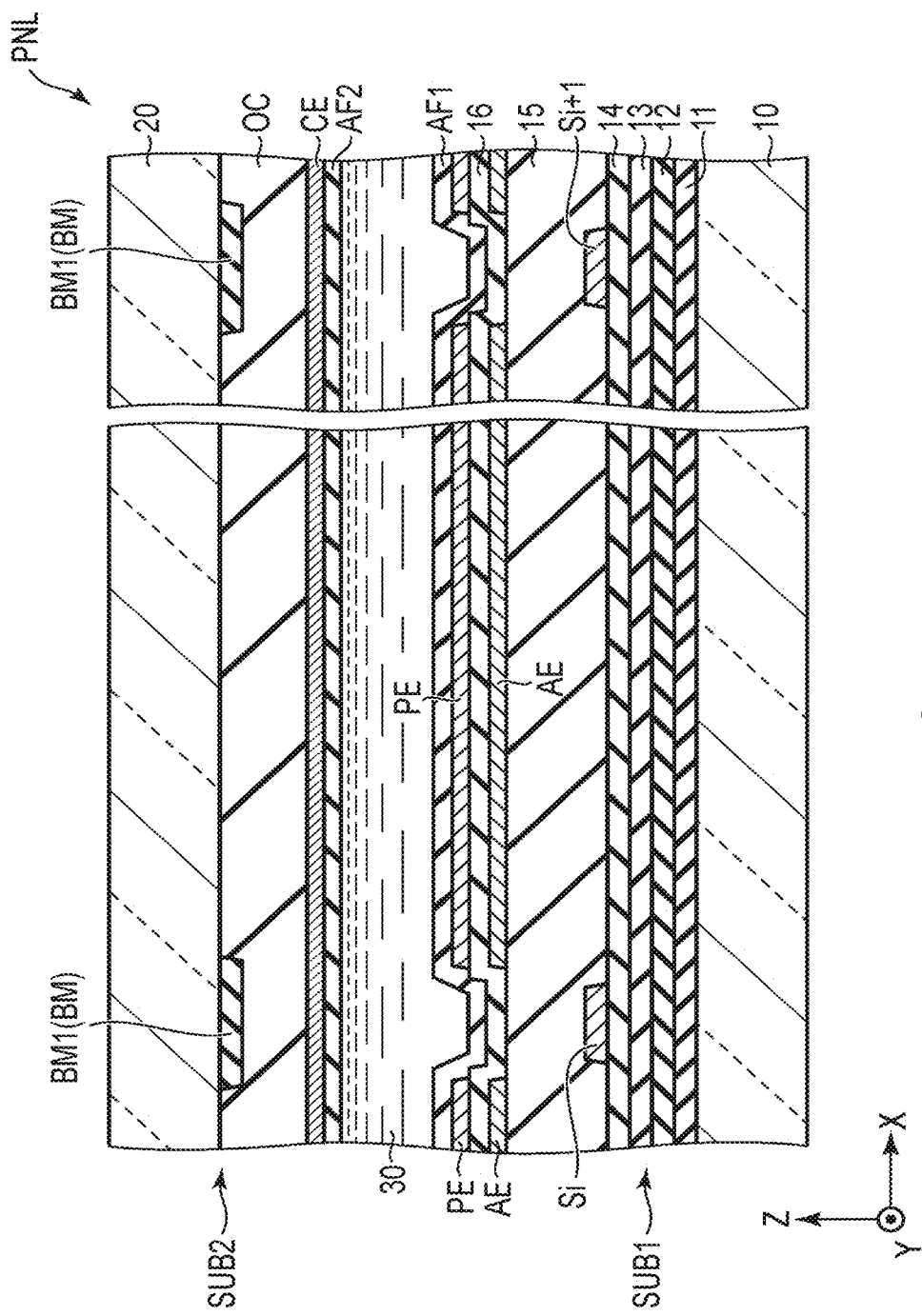
F I G. 6

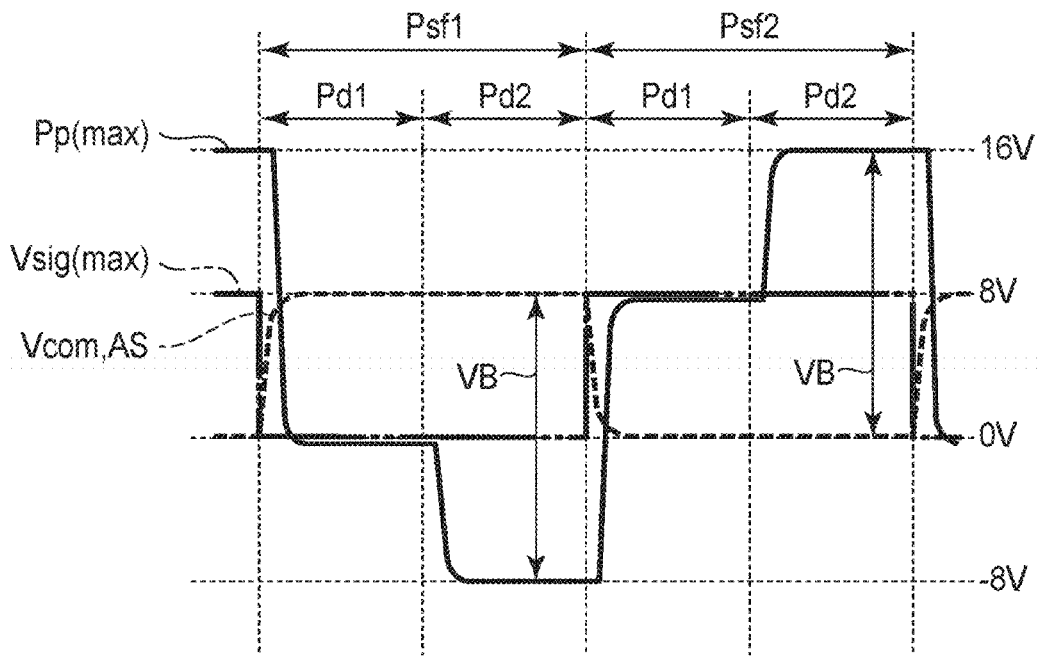
F I G. 14
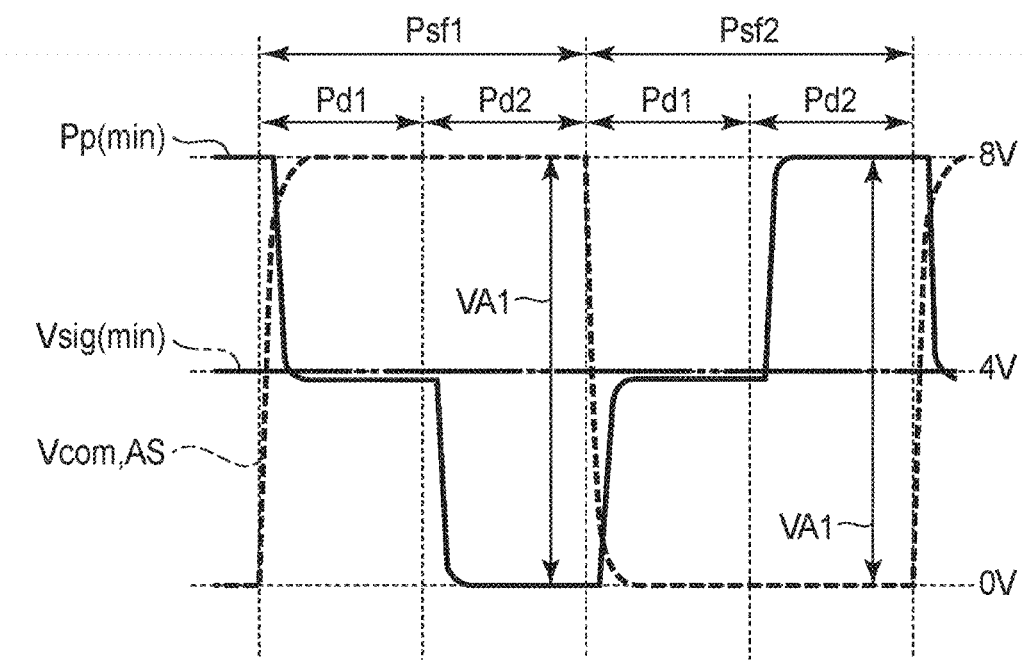
F I G. 15

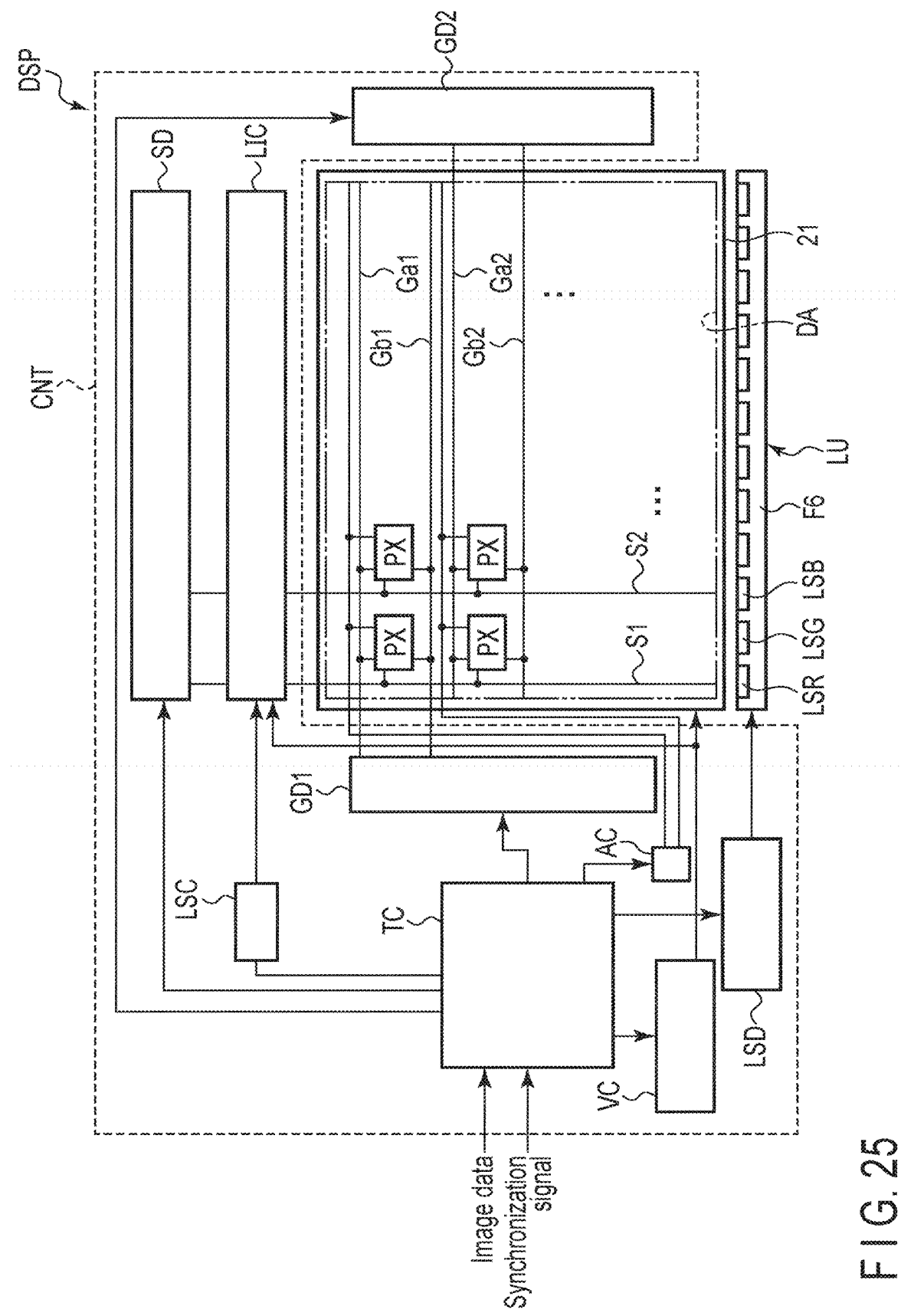
F I G. 25

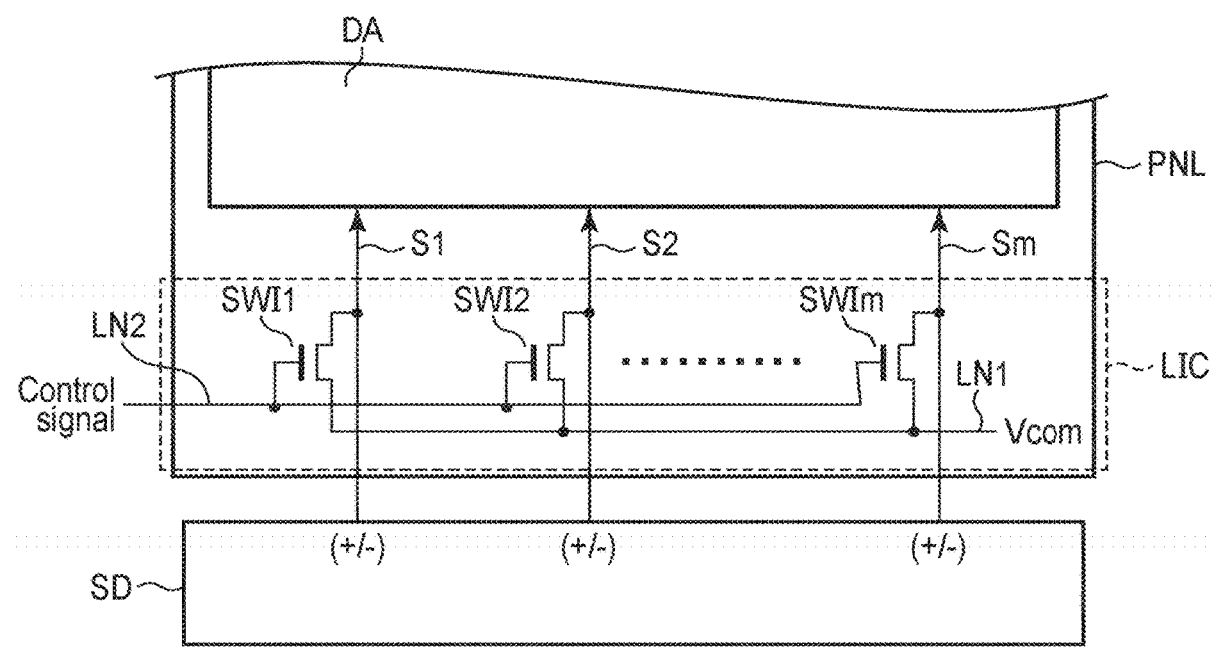
F I G. 26

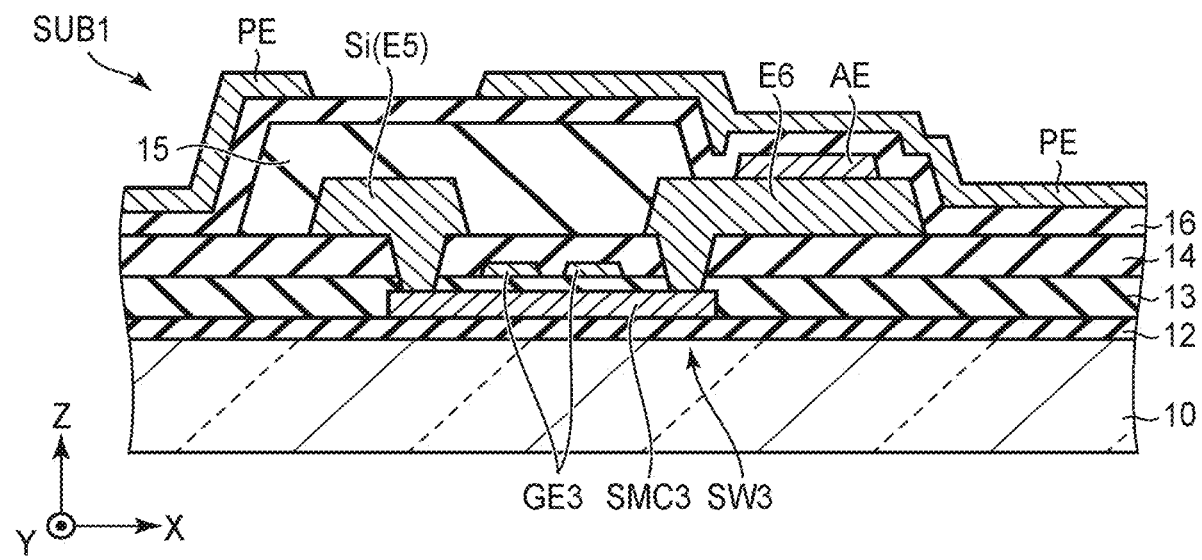
F I G. 38

DISPLAY DEVICE AND METHOD OF DRIVING DISPLAY DEVICE

CROSS-REFERENCE TO RELATED APPLICATIONS

This application is a Continuation Application of PCT Application No. PCT/JP2019/029313, filed Jul. 25, 2019 and based upon and claiming the benefit of priority from Japanese Patent Application No. 2018-143874, filed Jul. 31, 2018, the entire contents of all of which are incorporated herein by reference.

FIELD

Embodiments described herein relate generally to a display device and a method of driving the display device.

BACKGROUND

Liquid crystal display devices are widely used to be equipped with electronic equipments such as a mobile phone and a personal computer. For example, such a liquid crystal display device includes an array substrate and a counter substrate arranged to be opposed to each other, a liquid crystal layer held between these substrates, a plurality of pixels arranged in a matrix, and a drive circuit configured to drive the pixels.

On the array substrate, pixel electrodes are arranged in a matrix to correspond to the pixels, respectively. On the counter substrate, counter electrode is arranged to be opposed to the pixel electrodes. The alignment of liquid crystal molecules included in the liquid crystal layer are controlled by a voltage applied to the pixel electrodes and a voltage applied to the counter electrodes.

In the liquid crystal layer, when the same voltage (direct current voltage) is being applied for a long period, the inclination of the liquid crystal layer is fixed, and as a result, an image lag is caused, and the life of the liquid crystal layer is shortened. In order to prevent this problem, in the liquid crystal display device, the voltage applied to the liquid crystal layer is alternated at predetermined intervals, that is, the voltage applied to the pixel electrodes is changed between a positive voltage side and a negative voltage side at predetermined intervals using the voltage applied to the counter electrodes as a reference. That is, polarity inversion drive is performed.

As a driving method in which an alternate current voltage is applied to a liquid crystal layer, there is a known method of capacity coupling (CC) driving method in which a voltage of an auxiliary capacitance line is controlled in a period when a pixel switch is in a non-conductive condition such that a change of a pixel electrode potential becomes greater than a change of a signal potential supplied to a signal line.

BRIEF DESCRIPTION OF THE DRAWINGS

FIG. 3 is a diagram illustrating main structural elements of the display device of FIG. 1.

FIG. 4 is an equivalent circuit diagram of a pixel of FIG. 3.

FIG. 6 is a cross-sectional view of the display panel of FIG. 5, taken along line VI-VI.

FIG. 14 is a diagram illustrating an example of an image signal in display scanning, potential of a pixel electrode, common voltage, and auxiliary signal, in which waveforms with respect to a maximum value of gradation are shown.

FIG. 15 is a diagram illustrating an example of an image signal in display scanning, potential of the pixel electrode, common voltage, and auxiliary signal, in which waveforms with respect to a minimum value of gradation are shown.

FIG. 25 illustrates main structural elements of a display device of a variation 1 of the embodiment.

FIG. 26 illustrates an example of the structure of a Vcom drawing circuit of FIG. 25.

FIG. 38 is a cross-sectional view of the first substrate of FIG. 37, taken along line XXXVIII-XXXVIII.

DETAILED DESCRIPTION

Figure 1:
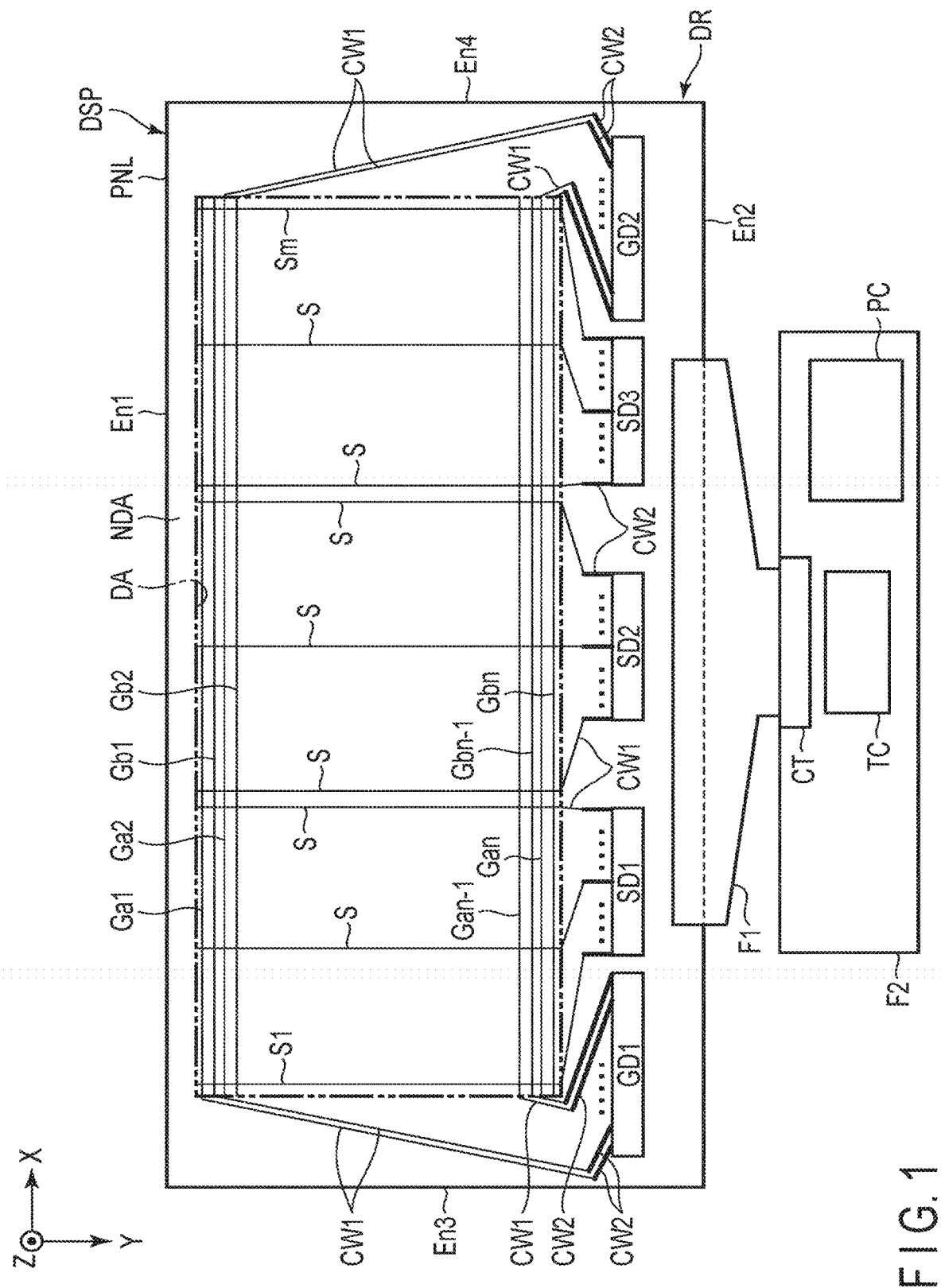
FIG. 1 is a plan view illustrating an example of the structure of a display device of an embodiment.

In general, according to one embodiment, there is provided a display device comprising: a first scanning line; a second scanning line; a signal line; a capacitance line; and a pixel including a pixel electrode, an auxiliary electrode which is electrostatic capacitive coupling with the pixel electrode, a first switch, a second switch, and a third switch. The first switch is electrically connected to the signal line, the pixel electrode, and the first scanning line. The second switch is electrically connected to the auxiliary electrode, the first scanning line, and the capacitance line. The third switch is electrically connected to the signal line, the second scanning line, and the auxiliary electrode.

According to another embodiment, there is provided a display device comprising: a plurality of first scanning lines extending in a first direction; a plurality of second scanning lines extending in the first direction; a plurality of signal lines extending in a second direction crossing the first direction; a plurality of capacitance lines extending in the first direction; a plurality of pixels arranged in a matrix in the first direction and the second direction, the pixels each including a pixel electrode, an auxiliary electrode which is electrostatic capacitive coupling with the pixel electrode, a first switch, a second switch, and a third switch; and a driver configured to sequentially feed a first control signal to the first scanning lines to switch each of the first switch and the second switch between on and off, to sequentially feed a second control signal to the second scanning lines to switch the third switch between on and off, to feed an image signal to the signal lines, and to feed an auxiliary signal to the capacitance lines. The pixels in each row arranged in the first direction are commonly connected to corresponding one first scanning line, corresponding one second scanning line, and corresponding one capacitance line of the first scanning lines, the second scanning lines, and the capacitance lines. The pixels in each column arranged in the second direction are commonly connected to corresponding one signal line of the signal lines. The driver is configured, in a first driving period in one horizontal scanning period, to turn on the first switches and the second switches and to turn off the third switches in all pixels in one row, to feed the image signal to the pixel electrodes of all pixels in the one row via the signal lines and the first switches, and to feed the auxiliary signal to the auxiliary electrodes of all pixels in the one row via the corresponding one capacitance line and the second switches, and in a second driving period following the first driving period in the one horizontal scanning period, to turn off the first switches and the second switches and to turn on the third switches in all pixels in the one row and, and to feed the image signal to the auxiliary electrodes of all pixels in the one row via the signal lines and the third switches.

According to another embodiment, there is provided a method of driving a display device which includes a pixel including a first scanning line, a second scanning line, a signal line, a capacitance line, a pixel electrode, an auxiliary electrode which is electrostatic capacitive coupling with the pixel electrode, a first switch, a second switch, and a third switch, the method comprising: feeding a first control signal to the first scanning line to switch each of the first switch and the second switch between on and off; feeding a second control signal to the second scanning line to switch the third switch between on and off; feeding an image signal to the signal line; feeding an auxiliary signal to the capacitance line; turning on each of the first switch and the second switch, turning off the third switch, feeding the image signal to the pixel electrode via the signal line and the first switch, and feeding the auxiliary signal to the auxiliary electrode via the capacitance line and the second switch in a first driving period; and turning off each of the first switch and the second switch, turning on the third switch, and feeding the image signal to the auxiliary electrode via the signal line and the third switch in a second driving period following the first driving period.

An Embodiment

An embodiment will be described hereinafter with reference to the accompanying drawings. The disclosure is merely an example, and proper changes within the spirit of the invention, which are easily conceivable by a skilled person, are included in the scope of the invention as a matter of course. In addition, in some cases, in order to make the description clearer, the widths, thicknesses, shapes, etc., of the respective parts are schematically illustrated in the drawings, compared to the actual modes. However, the schematic illustration is merely an example, and adds no restrictions to the interpretation of the invention. In the specification and drawings, the same elements as those described in connection with preceding drawings are denoted by like reference numerals, and a detailed description thereof may be omitted.

In the present embodiment, the display device to be explained is a liquid crystal display device with polymer dispersed liquid crystal. The display device can be used for various devices such as a smart phone, tablet terminal, and mobile phone.

FIG. 1 is a plan view of an example of the structure of a display device DSP of an embodiment.

As in FIG. 1, a first direction X and a second direction Y are orthogonal to each other. A third direction Z crosses the first direction X and the second direction Y. The first direction X corresponds to a row direction and the second direction Y is a column direction. In this example, the first direction X, second direction Y, and third direction Z are orthogonal to each other; however, they may cross at any angle other than 90 degrees. In the present application, a direction toward the tip of arrow indicating the third direction Z will be referred to as upper direction (or as above), and a direction opposite thereto will be referred to as lower direction (or as below).

The display device DSP includes a display panel PNL and wiring substrates F1 and F2. The display panel PNL includes a display area DA to display an image and a frame-shaped non-display area NDA surrounding the display area DA. The display panel PNL includes n first scanning lines Ga (Ga1 to Gan), n second scanning lines Gb (Gb1 to Gbn), and m signal lines S (S1 to Sm), for example. Note that n and m are both positive integers, and n and m may be the same, or n and m may be different. The first scanning lines Ga and the second scanning lines Gb are, in the display area DA, each extend in the first direction X and are arranged in the second direction Y at intervals. In other words, the first scanning lines Ga and the second scanning lines Gb extend in the row direction. The signal lines S extend, in the display area DA, in the second direction Y and are arranged in the first direction X at intervals.

The display panel PNL includes a plurality of first connection lines CW1 and a plurality of second connection lines CW2. The first connection lines CW1 are provided with the non-display area NDA, and are electrically connected to any of the first scanning line Ga, the second scanning line Gb, and the signal line S. In the present embodiment, the first connection line CW1 and the signal line S are formed of the same material. The second connection lines CW2 are provided with the non-display area NDA, and connected to the first connection lines CW1 one-by-one. In the present embodiment, the second connection line CW2, the first scanning line Ga, and the second scanning line Gb are formed of the same material.

Note that, instead of the above, the first connection lines CW1, the first scanning line Ga, and the second scanning line Gb may be formed of the same material, or may be formed of the same material as a capacitance line Cs which will be described later.

The display panel PNL includes sides En1 and En2 extending in the first direction X and sides En3 and En4 extending in the second direction Y. In the present embodiment, the sides En1 and En2 are long sides, and the sides En3 and En4 are short sides.

Scanning line driving circuits GD1 and GD2, and signal line driving circuits SD1, SD2, and SD3 are mounted on the non-display area NDA of the display panel PNL. In the present embodiment, the scanning line driving circuit GD1, signal line driving circuit SD1, signal line driving circuit SD2, signal line driving circuit SD3, and scanning line driving circuit GD2 are positioned between the display area DA and the side En2 to be arranged in the first direction X in this order. Each of the scanning line driving circuits GD1 and GD2, and the signal line driving circuits SD1, SD2, and SD3 is electrically connected to the second connection lines CW2.

The wiring substrate F1 is connected to the display panel PNL and the wiring substrate F2. The wiring substrate F1 is electrically connected to the scanning line driving circuits GD1 and GD2, and the signal line driving circuits SD1, SD2, and SD3. The wiring substrate F2 includes a timing controller TC and a power circuit PC. The wiring substrate F1 is connected to a connector CT of the wiring substrate F2. Note that the wiring substrates F1 and F2 may be replaced with a single wiring substrate. The scanning line driving circuits GD1 and GD2, signal line driving circuits SD1, SD2, and SD3, and timing controller TC structure a driver DR of the present embodiment. The driver DR is structured to control driving of each of the first scanning line Ga, second scanning line Gb, signal line S, capacitance line which will be described later, and common electrode which will be described later.

Furthermore, the scanning line driving circuits GD1 and GD2, and the signal line driving circuits SD1, SD2, and SD3 are, for example, a driver IC, and the scanning line driving circuits GD1 and GD2, and the signal line driving circuits SD1, SD2, and SD3 of the driver IC may be mounted on the display panel PNL, or may be mounted on the wiring substrate F1 or the wiring substrate F2.

In the example depicted, odd-number first scanning lines Ga1, . . . Ga(n−1) and second scanning lines Gb1, . . . Gb(n−1) from the side En1 side are connected to the scanning line driving circuit GD1, and even-number first scanning lines Ga2, . . . Gan and second scanning lines Gb2, . . . Gbn are connected to the scanning line driving circuit GD2. Note that a connection relationship between the first and second scanning lines Ga and Gb and the scanning line driving circuits GD1 and GD2 is not limited to the example depicted. For example, the scanning line driving circuits GD1 and GD2 may be replaced with a single scanning line driving circuit, and all first scanning lines Ga and all second scanning lines Gb may be connected to a single scanning line driving circuit. A connection relationship between the signal lines S and the signal line driving circuits SD1, SD2, and SD3 is not limited to the example depicted. The signal line driving circuits SD1, SD2, and SD3 may be replaced with a single signal line driving circuit, and all signal lines S may be connected to a single signal line driving circuit.

Figure 2:
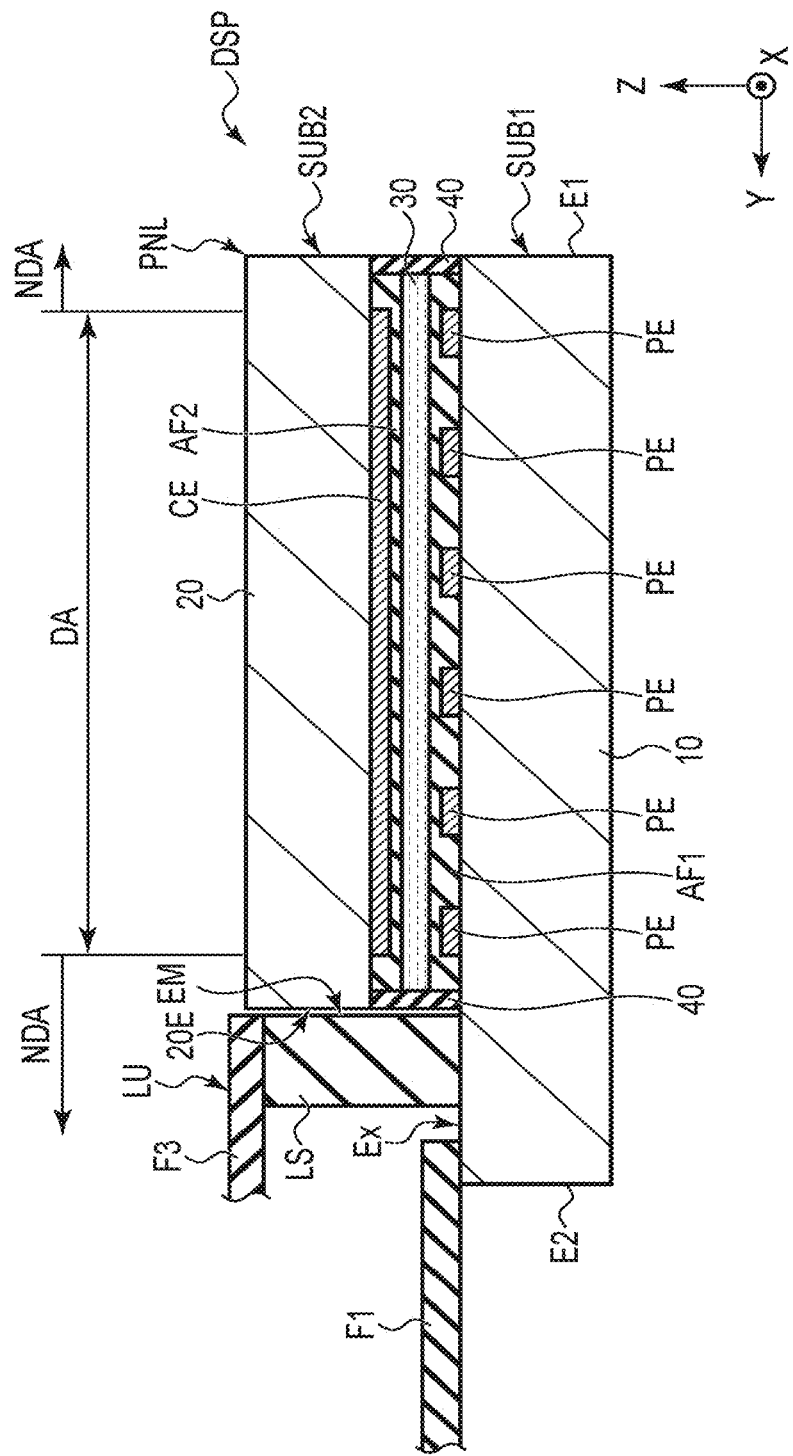
FIG. 2 is a cross-sectional view of the display device of FIG. 1.

FIG. 2 is a cross-sectional view of the display device DSP of FIG. 1. In this example, only the main part of the display device DSP in the cross-section of an X-Z plan defined by the second direction Y and the third direction Z will be explained.

As in FIG. 2, the display panel PNL includes, for example, a first substrate SUB1, a second substrate SUB2, and a liquid crystal layer 30 as a display function layer. The first substrate SUB1 includes, for example, a transparent substrate 10, pixel electrodes PE, and an alignment film AF1. The second substrate SUB2 includes, for example, a transparent substrate 20, a common electrode CE, and an alignment film AF2. The pixel electrode PE and the common electrode CE are formed of a transparent conductive material such as indium tin oxide (ITO), or indium zinc oxide (IZO).

The liquid crystal layer 30 is positioned at least in the display area DA. The liquid crystal layer 30 includes polymer dispersed liquid crystal, and is positioned between the alignment film AF1 and the alignment film AF2. The liquid crystal layer 30 of the present embodiment uses the reverse polymer dispersed liquid crystal (R-PDLC). The liquid crystal layer 30 maintains parallelism of incident light when a voltage applied thereto is low, and scatters the incident light when a voltage applied thereto is high. The first substrate SUB1 and the second substrate SUB2 are adhered by a sealant 40. The first substrate SUB1 includes an extension part EX extending in the second direction Y than the end 20E of the transparent substrate 20.

The wiring substrate F1 is mounted on the extension part EX of the first substrate SUB1 and is physically fixed to the extension part EX. Furthermore, the wiring substrate F1 is electrically connected to pads of the extension part EX, which is not shown. Note that, the pads are electrically connected to the above-mentioned scanning line driving circuits GD1 and GD2, and the signal line driving circuits SD1, SD2, and SD3.

A light source unit LU is positioned in the non-display area NDA outside the display area DA. The light source unit LU include, for example, a light emitting element LS, and a wiring substrate F3. The light emitting element LS is connected to the wiring substrate F3 and is positioned on the extension part EX. The light emitting element LS includes a light emitting part (light emitting surface) EM opposed to the end 20E. Illumination light emitted from the light emitting part EM is, as will be described later, incident on the end 20E and propagates through the display panel PNL.

FIG. 3 is a diagram illustrating main structural elements of the display device DSP of FIG. 1.

As in FIG. 3, the display device DSP includes a controller CNT depicted by a dashed line in the figure. The controller CNT includes, for example, a timing controller TC, scanning line driving circuits GD1 and GD2, signal line driving circuits SD1, SD2, and SD3, Vcom circuit VC, auxiliary circuit AC, and light source driver LSD.

The timing controller TC generates various signals based on image data and synchronization signal input from the outside. In this example, the timing controller TC outputs, based on the image data, image signals generated by performing a predetermined signal process (for example, video signal) to the signal line driving circuits SD1, SD2, and SD3. Furthermore, the timing controller TC outputs the control signal generated based on the synchronization signal to each of the scanning line driving circuits GD1 and GD2, the signal line driving circuits SD1, SD2, and SD3, the Vcom circuit VC, the auxiliary circuit AC, and the light source driver LSD. The timing controller TC will be described in detail later.

The display area DA shown in the figure with a two-dot chain line includes a plurality of pixels PX. The pixels PX are arranged in a matrix in the first direction X and the second direction Y. Each pixel PX is electrically connected to the first scanning line Ga, the second scanning line Gb, the signal line S, and the capacitance line Cs. Note that n capacitance lines Cs (Cs1 to Csn) extend in the first direction X and are arranged in the second direction Y at intervals in the display area DA.

The common electrode CE is positioned in the display area DA. The common electrode CE is shared by the pixels PX. The common electrode CE is a part of each of the pixels PX. A first control signal is supplied to each of the first scanning line Ga from the scanning line driving circuit GD1 or GD2. A second control signal is supplied to each of the second scanning lines Gb from the scanning line driving circuit GD1 or GD2. An image signal (video signal) is supplied to each of the signal lines S from the signal line driving circuit SD1, SD2, or SD3. An auxiliary signal AS is supplied to the capacitance line Cs from the auxiliary circuit AC. A common voltage Vcom is supplied to the common electrode CE from the Vcom circuit VC.

In the present embodiment, the signal lines S are connected to the signal line driving circuit SD without passing through a selection circuit. Thus, the signal line driving circuit SD can supply an image signal to all signal lines S at the same time. Note that, unlike the present embodiment, the signal lines S may be connected to the signal line driving circuits SD via a selection circuit. In that case, the signal lines S are driven in a time division manner, and the image signal is supplied to the signal lines S in a time division manner.

Furthermore, the scanning line driving circuits GD1 and GD2 may not be a driver IC but may be a gate-integrated circuit formed on the first substrate SUB1, and the selection circuit connected to the signal line driving circuit SD may be an integrated circuit formed on the first substrate SUB1.

The light source unit LU is structured to emit light of color other than achromatic color to the liquid crystal layer 30. The light source unit LU includes light emitting elements LS of several colors. For example, the light source unit LU includes a light emitting element (first light emitting element) LSR to emit first color light to the liquid crystal layer 30, light emitting element (second light emitting element) LSG to emit second color light to the liquid crystal layer 30, and light emitting element (third light emitting element) LSB to emit third color light to the liquid crystal layer 30. The first, second, and third colors are, obviously, different colors. In the present embodiment, the first color is red, second color is green, and third color is blue. The light source driver LSD controls turning on time of the light emitting elements LSR, LSG, and LSB. As will be described later, in a driving method in which one frame period includes a plurality of subframe periods, at least one of three light emitting elements LSR, LSG, and LSB is turned on in each subframe, and the color illuminated is switched per subframe.

Furthermore, the light source unit LU may include white light emitting elements alone for monochrome display instead of the above-mentioned light emitting elements LS of first to third colors for the color display.

Now, as a specific example of the pixels PX (j, i), one pixel PX positioned in row i and column j will be explained. Note that the pixels PX are formed uniformly. FIG. 4 is an equivalent circuit diagram of the pixel PX of FIG. 3.

As in FIG. 4, the pixel PX includes a pixel electrode PE, an auxiliary electrode AE, a first switch SW1, a second switch SW2, a third switch SW3, and a common electrode CE.

A common voltage Vcom is supplied to the common electrode CE from the driver DR. A voltage applied between the pixel electrode PE and the common electrode CE is applied to the liquid crystal layer 30. The auxiliary electrode AE and the pixel electrode PE are electrostatic capacitance coupling. In other words, the auxiliary electrode AE and the pixel electrode PE form a condenser CO. Two or more pixel electrodes PE are not electrically connected, and two or more auxiliary electrodes AE are not electrically connected. This is because a potential of the pixel electrodes PE and a potential of the auxiliary electrodes AE may differ in different pixels PX.

The first switch SW1, second switch SW2, and third switch SW3 are formed of a switching element such as thin film transistor (TFT). In the present embodiment, each of the first switch SW1, second switch SW2, and third switch SW3 is an N-channel and double gate TFT.

The first switch SW1 includes a first gate electrode GE1, first electrode E1, and second electrode E2. The first gate electrode GE1 is electrically connected to a first scanning line Gaj. The first electrode E1 is connected to a signal line Si. The second electrode E2 is electrically connected to the pixel electrode PE. The first switch SW1 is turned on/off based on a first control signal Caj supplied thereto via the first scanning line Gaj. When the driver DR outputs an image signal Vsig to the signal line Si while the first switch SW1 is turned on, that is, while the TFT of the first switch SW1 is switched to a conductive state, the image signal Vsig is supplied to the pixel electrode PE via the signal line Si and the first switch SW1.

The second switch SW2 includes a second gate electrode GE2, third electrode E3, and fourth electrode E4. The second gate electrode GE2 is electrically connected to the first scanning line Gaj. The third electrode E3 is electrically connected to a capacitance line Csj. The fourth electrode E4 is electrically connected to the auxiliary electrode AE. The second switch SW2 is turned on/off based on the first control signal Caj supplied thereto via the first scanning line Gaj as with the first switch SW1. When the driver DR outputs the auxiliary signal AS to the capacitance line Csj while the second switch SW2 is turned on, that is, while the TFT of the second switch SW2 is switched to a conductive state, the auxiliary signal AS is supplied to the auxiliary electrode AE via the capacitance line Csj and the second switch SW2.

The third switch SW3 includes a third gate electrode GE3, fifth electrode E5, and sixth electrode E6. The third gate electrode GE3 is electrically connected to a second scanning line Gbj. The fifth electrode E5 is connected to the signal line Si. The sixth electrode E6 is electrically connected to the auxiliary electrode AE. The third switch SW3 is turned on/off based on a second control signal Cbj supplied thereto via the second scanning line Gbj. When the driver DR outputs the image signal Vsig to the signal line Si while the third switch SW3 is turned on, that is, while the TFT of the third switch SW3 is switched to a conductive state, the image signal Vsig is supplied to the auxiliary electrode AE via the signal line Si and the third switch SW3.

The pixels PX in the rows arranged in the first direction X are commonly connected to corresponding one first scanning line Ga, corresponding one second scanning line Gb, and corresponding one capacitance line Cs of the first scanning lines Ga, second scanning lines Gb, and capacitance lines Cs. For example, the pixels PX in the jth row are commonly connected to the first scanning line Gaj, the second scanning line Gb, and the capacitance line Csj.

The pixels PX in the columns arranged in the second direction Y are commonly connected to corresponding one signal line S of the signal lines S. For example, the pixels PX in the ith column are commonly connected to the signal line Si.

Figure 5:
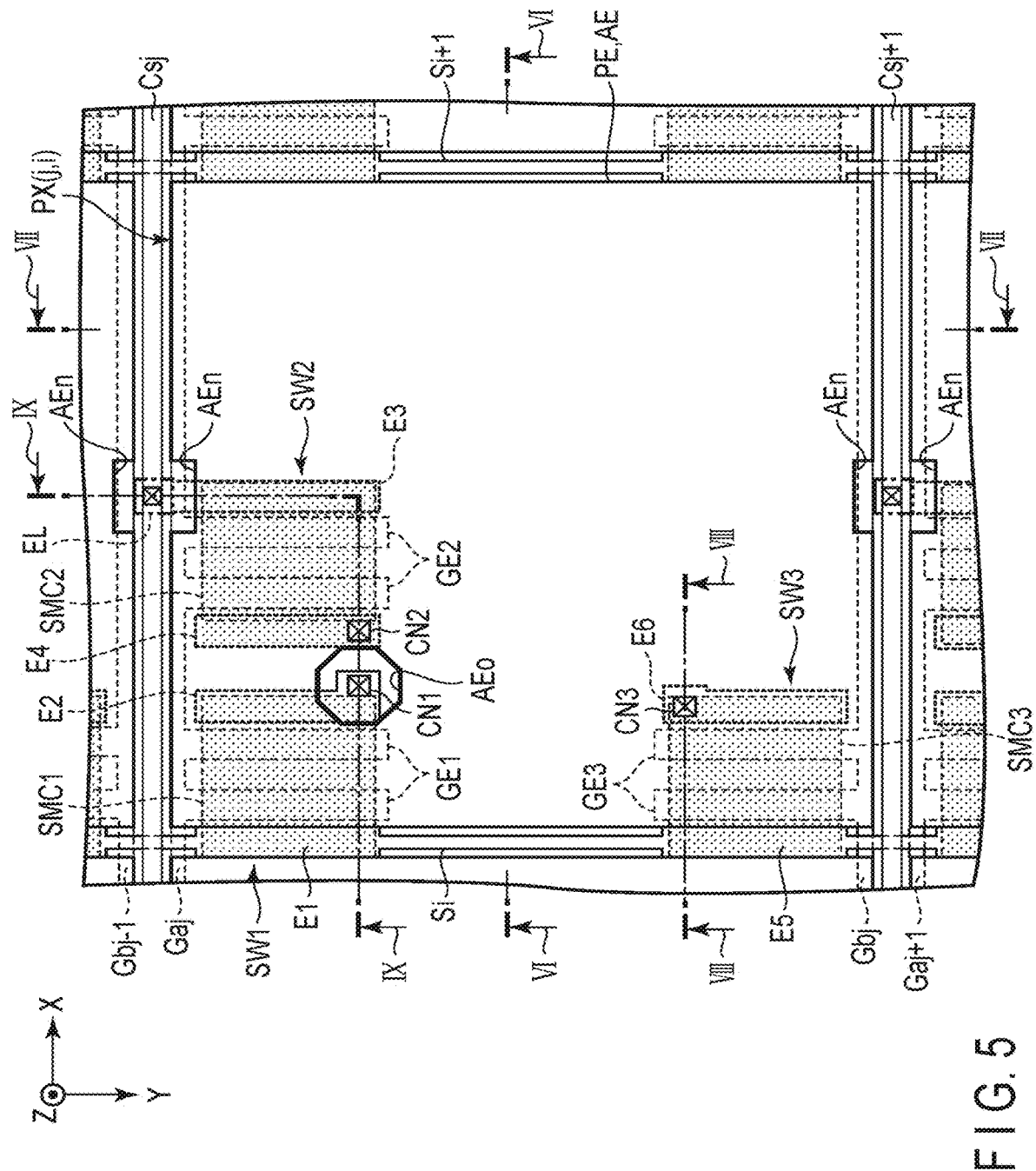
FIG. 5 is a plan view illustrating a part of a display panel of the display device in which the pixel is shown.

FIG. 5 is a plan view illustrating a part of the display panel PNL of the display device DSP, and illustrating the pixel PX. Note that, in FIG. 5, light shielding layers BM, SH1, SH2, and SH3 which will be described later are omitted.

As in FIG. 5, the capacitance line Csj is positioned, in a plan view, to be closer to the first scanning line Gaj than is the second scanning line Gbj and to be apart from the auxiliary electrode AE. In the second direction Y, the first scanning line Gaj is positioned between the capacitance line Csj and the second scanning line Gbj. In the present embodiment, a second scanning line Gbj−1, the capacitance line Csj, and the first scanning line Gaj are arranged in the second direction Y at intervals. Furthermore, the second scanning line Gbj, a capacitance line Csj+1, and a first scanning line Gaj+1 are arranged in the second direction Y at intervals.

In a plan view, the first switch SW1, the second switch SW2, and the third switch SW3 are positioned substantially between the first scanning line Gaj and the second scanning line Gbj, and substantially between the signal line Si and a signal line Si+1. As can be understood from the above, the first switch SW1, the second switch SW2, and the third switch SW3 are positioned substantially in an area surrounded by the first scanning line Gaj, the second scanning line Gbj, the signal line Si, and the signal line Si+1.

The pixel electrode PE and the auxiliary electrode AE are, in a plan view, opposed to each of the first switch SW1, the second switch SW2, and the third switch SW3. The pixel electrode PE and the auxiliary electrode AE have a quadrangular shape, and are positioned in an area surrounded by the capacitance line Csj, the capacitance line Csj+1, the signal line Si, and the signal line Si+1. In the present embodiment, the pixel electrode PE and the auxiliary electrode AE overlap the first scanning line Gaj and the second scanning line Gbj, and do not overlap the capacitance line Csj, the capacitance line Csj+1, the signal line Si, and the signal line Si+1.

The auxiliary electrode AE and the pixel electrode PE have a substantially same size. The auxiliary electrode AE has a notch AEn in the side opposed to the capacitance line Cs. In a pair of auxiliary electrodes AE adjacent to each other in the second direction Y, notches AEn are opposed to each other. The auxiliary electrode AE has an opening AEo. The opening AEo is used to bring the pixel electrode PE into contact with the first switch SW1. The pixel electrode PE passes the opening AEo of the auxiliary electrode AE to be in contact with the second electrode E2 of the first switch SW1. Furthermore, the auxiliary electrode AE and the pixel electrode PE may not have a same size, and the auxiliary electrode AE may be a size smaller than the pixel electrode PE to be formed inside the pixel electrode PE, or may be formed of four line parts by cutting out the center area of the pixel PX of the auxiliary electrode AE.

A connection electrode EL overlaps, in a plan view, the capacitance line Cs. The connection electrode EL is positioned in an area surrounded by notches AEn of auxiliary electrodes AE adjacent to each other in the second direction Y, and is positioned to be apart from the auxiliary electrodes AE. The auxiliary electrode AE and the connection electrode EL are formed of the same material. For example, the auxiliary electrode AE and the connection electrode EL are formed of a transparent conductive material such as ITO or IZO. Note that, the display panel PNL may be formed without a connection electrode EL unlike the present embodiment.

In the first switch SW1, the first electrode E1 extends in the second direction Y to be formed integrally with the signal line Sj extending in the second direction Y, for example. The second electrode E2 extends in the second direction Y to be connected to the pixel electrode PE, for example. Each of the first gate electrodes GE1 extends in the second direction Y, is positioned between the first electrode E1 and the second electrode E2, and is formed integrally with the first scanning line Gaj extending in the first direction X.

A first semiconductor layer SMC1 of the first switch SW1 is opposed to each of the first electrode E1, first gate electrode GE1, and second electrode E2 and extends continuously in the first direction X. The first semiconductor layer SMC1 extends continuously in the second direction Y along the first gate electrode GE1. Note that the first switch SW1 may include a plurality of first semiconductor layers SMC1 arranged physically independently in the second direction Y unlike the present embodiment.

In the second switch SW2, the third electrode E3 extends in the second direction Y, and is opposed to the capacitance line Csj and the connection electrode EL, for example. The fourth electrode E4 extends in the second direction Y, and is connected to the auxiliary electrode AE, for example. Each of the second gate electrodes GE2 extends in the second direction Y, is positioned between the third electrode E3 and the fourth electrode E4, and is formed integrally with the first scanning line Gaj.

A second semiconductor layer SMC2 of the second switch SW2 is opposed to each of the fourth electrode E4, second gate electrode GE2, and third electrode E3 and extends continuously in the first direction X. The second semiconductor layer SMC2 extends continuously in the second direction Y along the second gate electrode GE2. Note that the second switch SW2 may include a plurality of second semiconductor layers SMC2 arranged physically independently in the second direction Y unlike the present embodiment.

In the third switch SW3, the fifth electrode E5 extends in the second direction Y, and is formed integrally with the signal line Sj, for example. The sixth electrode E6 extends in the second direction Y, and is connected to the auxiliary electrode AE, for example. Each of the third gate electrodes GE3 extends in the second direction Y, is positioned between the fifth electrode E5 and the sixth electrode E6, and is formed integrally with the second scanning line Gbj extending in the first direction X.

A third semiconductor layer SMC3 of the third switch SW3 is opposed to each of the fifth electrode E5, the third gate electrode GE3, and the sixth electrode E6, and extends continuously in the first direction X. The third semiconductor layer SMC3 extends continuously in the second direction Y along the third gate electrode GE3. Note that, the third switch SW3 may include a plurality of third semiconductor layers SMC3 arranged physically independently in the second direction Y unlike the present embodiment.

The above-mentioned first to sixth electrodes E1 to E6 and the signal line S are formed of the same metal material. For example, the first to sixth electrodes E1 to E6 and the signal line S have a triple layer structure (Ti/Al/Ti), and include a lower layer mainly formed of a metal material such as titanium (Ti) or an alloy mainly containing Ti, a middle layer formed of a metal material such as aluminum (Al) or an alloy mainly containing Al, and an upper layer formed of a metal material such as Ti or an alloy mainly containing Ti.

The first to third gate electrodes GE1 to GE3, the first scanning line Ga, and the second scanning line Gb are formed of the same metal material. For example, the first to third gate electrodes GE1 to GE3, the first scanning line Ga, and the second scanning line Gb are formed of a metal material such as Al, Ti, silver (Ag), molybdenum (Mo), tungsten (W), cupper (Cu), and chrome (Cr), or of an alloy containing a combination of above metal materials, and they may have a monolayer structure or a multilayer structure. In the present embodiment, the first to third gate electrodes GE1 to GE3, the first scanning line Ga, and the second scanning line Gb are formed of Mo.

The capacitance line Cs is formed of a metal material. For example, the capacitance line Cs has a triple layer structure (Mo/Al/Mo), and includes a lower layer formed of a metal material such as Mo or an alloy mainly containing Mo, a middle layer formed of a metal material such as Al or an alloy mainly containing Al, and an upper layer formed of a metal material such as Mo or an alloy mainly containing Mo.

The auxiliary electrode AE functions as a node common to the second switch SW2, the third switch SW3, and the condenser CO. Thus, as compared to a case where the auxiliary electrode AE does not function as a node, an area efficiency of the second switch SW2 and the third switch SW3 in the pixel PX can be increased. For example, lines connecting the fourth electrode E4 and the auxiliary electrode AE and lines connecting the sixth electrode E6 and the auxiliary electrode AE can be reduced, and an opening area of the pixel PX can be increased.

Now, the cross-sectional structure of the display panel PNL will be explained. FIG. 6 is a cross-sectional view of the display panel PNL of FIG. 5, taken along line VI-VI.

As in FIG. 6, the first substrate SUB1 includes the transparent substrate 10, insulating layers 11, 12, 13, 14, 15, and 16, the signal line S, the auxiliary electrode AE, the pixel electrode PE, and the alignment film AF1. The transparent substrate 10 may be a glass substrate as an insulating transparent substrate. Note that the transparent substrate 10 may be a substrate other than a glass substrate. For example, the transparent substrate 10 may be a resin substrate.

On the transparent substrate 10, the insulating layers 11, 12, 13, 14, 15, and 16 are arranged in this order. The insulating layers 11, 12, 13, 14, and 16 are formed of an inorganic insulating layer formed of a silicon oxide or a silicon nitride, or of layered structure of such materials. The insulating layer 15 is formed of an organic insulating layer.

The signal line S is located on the insulating layer 14, and is covered with the insulating layer 15. The auxiliary electrode AE is located on the insulating layer 15, and is covered with the insulating layer 16. The pixel electrode PE is located on the insulating layer 16, and is covered with the alignment film AF1. The auxiliary electrode AE, the insulating layer 16, and the pixel electrode PE form the condenser CO. The auxiliary electrode AE and the pixel electrode PE are formed of a light transmitting conductive material such as ITO. Thus, the first substrate SUB1 can be formed in a manufacturing method for a fringe field switching (FFS) mode liquid crystal display panel.

The second substrate SUB2 includes a transparent substrate 20, the light shielding layer BM, an overcoat layer OC, the common electrode CE, and the alignment film AF2. The transparent substrate 20 may be a glass substrate as an insulating transparent substrate. Note that, the transparent substrate 20 may be a substrate other than a glass substrate. For example, the transparent substrate 20 may be a resin substrate.

The light shielding layer BM and the overcoat layer OC are positioned in a side to be opposed to the first substrate SUB1 of the transparent substrate 20. The light shielding layer BM is positioned between the transparent substrate 20 and the overcoat layer OC. The light shielding layer BM includes a plurality of first light shielding parts BM1 arranged in the first direction X at intervals. Each of the first light shielding parts BM1 is opposed to the signal line S and extends along the signal line S. The end of the first light shielding part BM1 is opposed to the pixel electrode PE in the third direction Z. The common electrode CE and the alignment film AF2 are arranged in the side opposed to the first substrate SUB1 of the overcoat layer OC in this order. The overcoat layer OC is formed of a transparent resin.

With the light shielding layer BM, transparency of the display device may possibly be slightly decreased, but contrast of the display can be improved. Note that the light shielding layer BM may not be formed in the second substrate SUB2 to improve the transparency of the display device.

The first substrate SUB1 and the second substrate SUB2 are arranged such that the first alignment film AF1 and the second alignment film AF2 are opposed to each other. Although this is not shown, spacers are positioned between the first substrate SUB1 and the second substrate SUB2. Thus, a predetermined cell gap is formed between the first alignment film AF1 and the second alignment film AF2. Note that, as the spacers, other than the main spacers forming a cell gap, sub spacers which do not contact with one substrate in a normal condition in which an external force is not applied to the display panel PNL may be included. The cell gap is, for example, 2 to 5 μm.

The liquid crystal layer 30 is positioned between the first substrate SUB1 and the second substrate SUB2, and is held between the first alignment film AF1 and the second alignment film AF2. The liquid crystal layer 30 forms a plurality of pixels PX together with the first substrate SUB1 and the second substrate SUB2.

Figure 7:
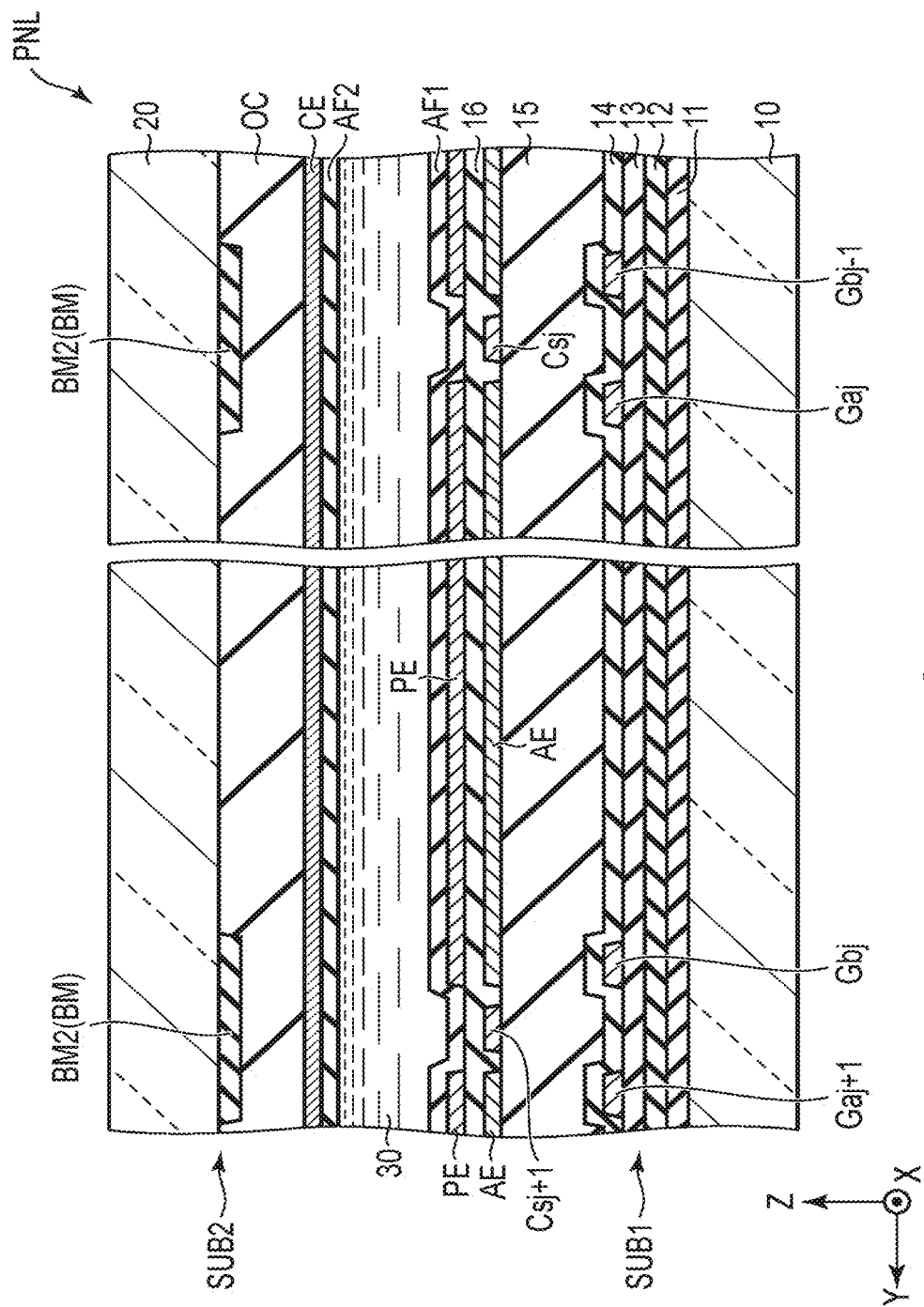
FIG. 7 is a cross-sectional view of the display panel of FIG. 5, taken along line VII-VII.

FIG. 7 is a cross-sectional view of the display panel PNL of FIG. 5, taken along line VII-VII.

As in FIG. 7, the first substrate SUB1 further includes the first scanning lines Ga, the second scanning lines Gb, and the capacitance lines Cs. The first scanning lines Gaj and Gaj+1, and the second scanning lines Gbj−1 and Gbj are located on the insulating layer 13, and are covered with the insulating layer 14. The capacitance line Csj is located on the insulating layer 15, and is covered with the insulating layer 16. The capacitance lines Cs and the auxiliary electrodes AE are located between the insulating layer 15 and the insulating layer 16, and are positioned to be apart from each other.

The light shielding layer BM includes a plurality of second light shielding parts BM2 arranged in the second direction Y at intervals. The second light shielding parts BM2 cross the first light shielding parts BM1 to be formed integrally with the first light shielding parts BM1. Each of the second light shielding parts BM2 is opposed to the second scanning line Gb, the capacitance line Cs, and the first scanning line Ga, and extends along the second scanning line Gb, the capacitance line Cs, and the first scanning line Ga. The end of the second light shielding part BM2 is opposed to the pixel electrode PE in the third direction Z.

Figure 8:
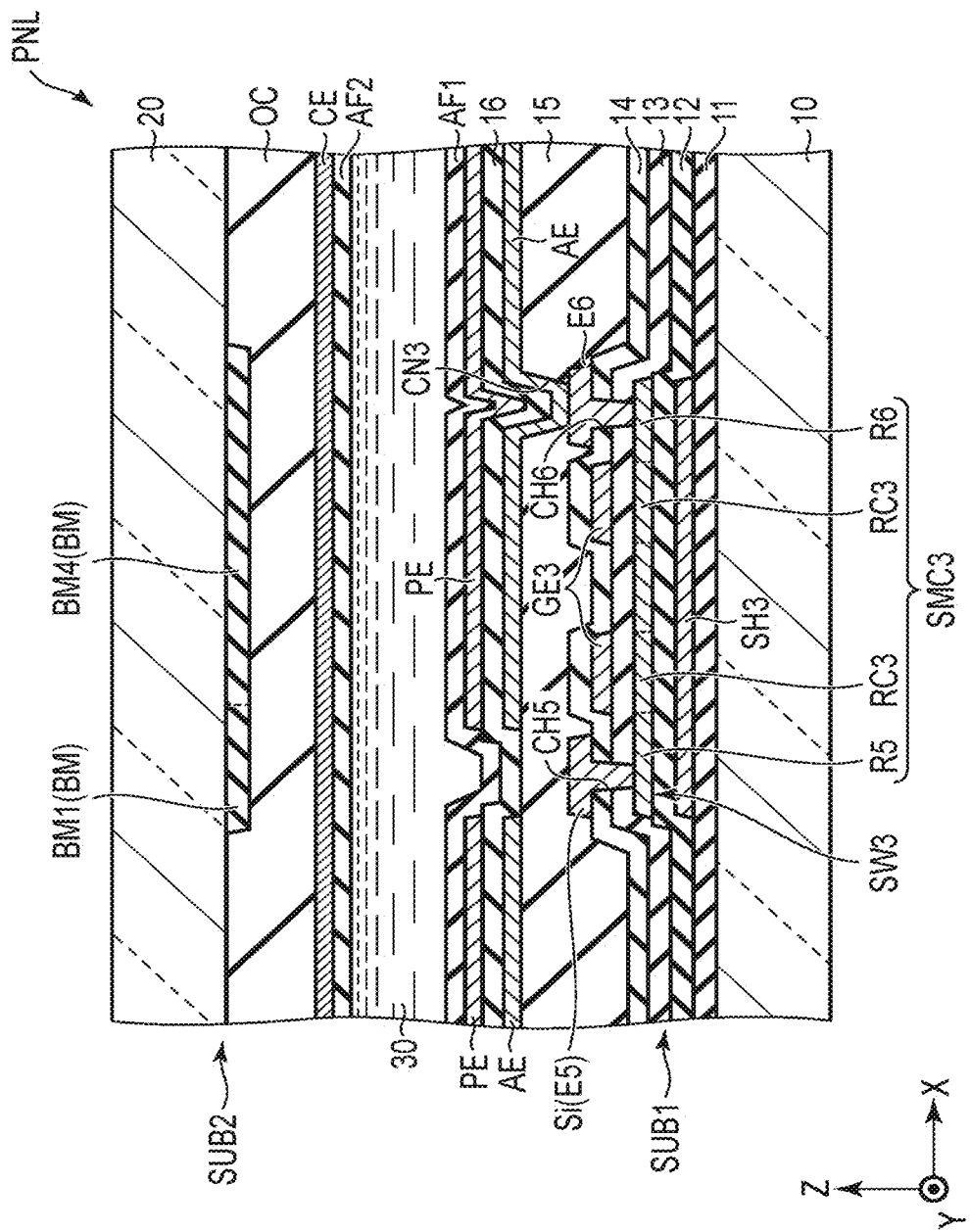
FIG. 8 is a cross-sectional view of the display panel of FIG. 5, taken along line VIII-VIII.

Now, a cross-sectional structure of the third switch SW3 will be explained. FIG. 8 is a cross-sectional view of the display panel PNL of FIG. 5, taken along line VIII-VIII.

As in FIG. 8, the first substrate SUB1 further includes a light shielding layer SH3 and the third switch SW3, for example. The light shielding layer SH3 is located on the insulating layer 11, and is covered with the insulating layer 12. The light shielding layer SH3 is formed of a metal material, or may be formed of a light shielding material such as a black resin.

The third gate electrode GE3 is located on the insulating layer 13, and is covered with the insulating layer 14. A third semiconductor layer SMC3 is located on the insulating layer 12, and is covered with the insulating layer 13. The third semiconductor layer SMC3 includes two third channel regions RC3, a fifth low resistive region R5, and a sixth low resistive region R6. The third channel regions RC3 are positioned between the fifth low resistive region R5 and the sixth low resistive region R6. Each of the third channel region RC3 is opposed to the third gate electrode GE3.

The fifth low resistive region R5 is electrically connected to the signal line Si (fifth electrode E5), and is lower resistive than a resistive the third channel region RC3. Note that the signal line Si (fifth electrode E5) passes through one or more contact holes CH5 passing through the insulating layers 13 and 14 and positioned in the area opposed to the fifth low resistive region R5 to be electrically connected to the fifth low resistive region R5.

The sixth low resistive region R6 is electrically connected to the auxiliary electrode AE via the sixth electrode E6, and is lower resistive than the third channel region RC3. Note that the sixth electrode E6 is formed on the insulating layer 14. The sixth electrode E6 passes through one or more contact holes CH6 passing through the insulating layers 13 and 14 and positioned in the area opposed to the sixth low resistive region R6 to be electrically connected to the sixth low resistive region R6.

The light shielding layer SH3 is opposed to the third switch SW3. The light shielding layer SH3 is opposed to at least the entirety of the third channel regions RC3 of the third semiconductor layer SMC3. The auxiliary electrode AE passes through the contact hole CN3 formed in the insulating layer 15 to be electrically connected to the sixth electrode E6.

The light shielding layer BM further includes a plurality of fourth light shielding parts BM4. Each of the fourth light shielding parts BM4 is opposed to the third switch SW3 together with the first light shielding parts BM1 and the second light shielding parts BM2, and is formed integrally with the first light shielding parts BM1 and the second light shielding parts BM2.

Figure 9:
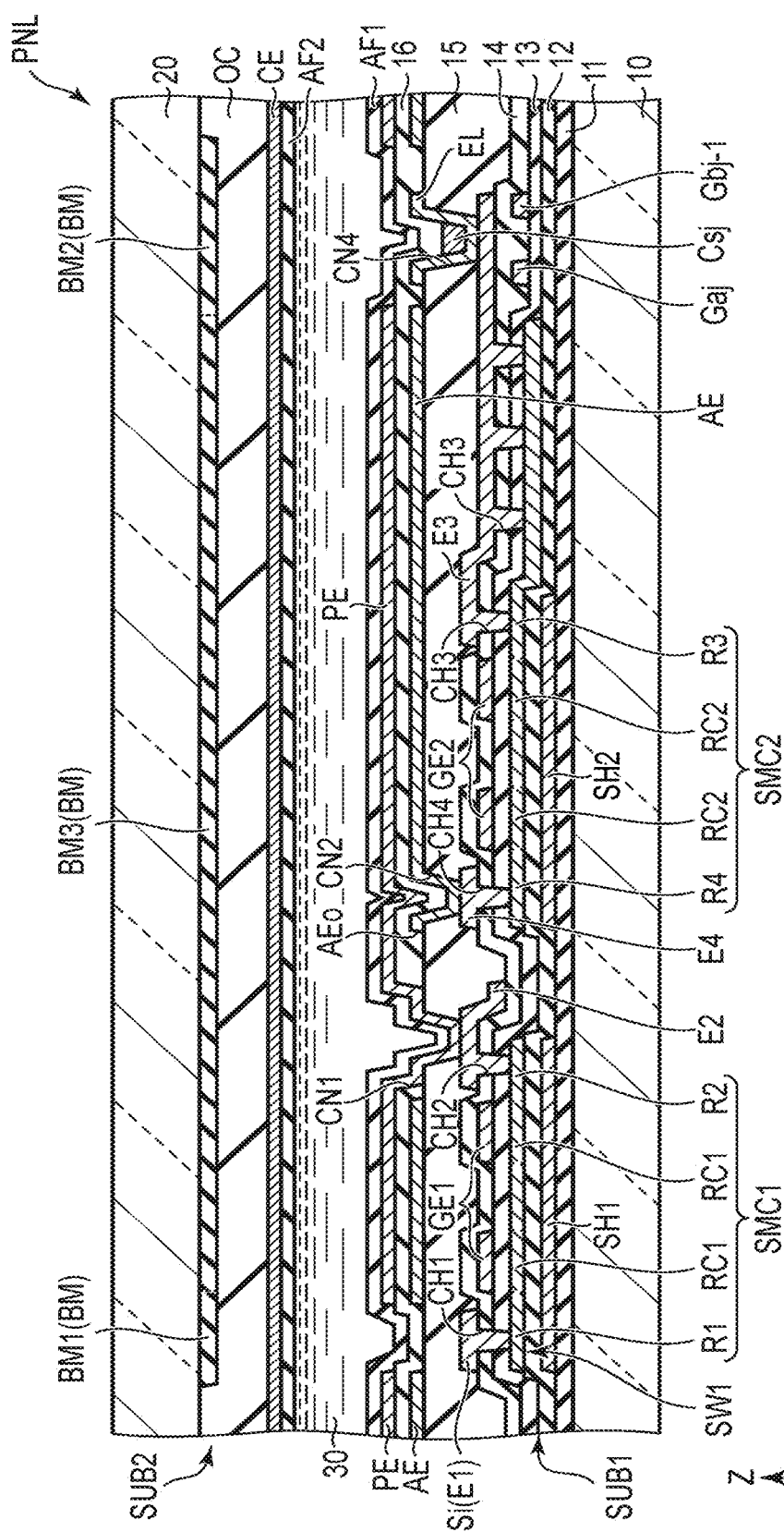
FIG. 9 is a cross-sectional view of the display panel of FIG. 5, taken along line IX-IX.

Now, a cross-sectional structure of the first switch SW1 and the second switch SW2 will be explained. FIG. 9 is a cross-sectional view of the display panel PNL of FIG. 5, taken along line IX-IX.

As in FIG. 9, the first substrate SUB1 further includes the light shielding layers SH1 and SH2, the first switch SW1, the second switch SW2, and the connection electrode EL. The light shielding layers SH1 and SH2 are located on the insulating layer 11 and are covered with the insulating layer 12. The light shielding layers SH1 and SH2 are formed of the same material as with the light shielding layer SH3. The light shielding layers SH1, SH2, and SH3 are positioned physically independently, and are in an electrically floating state. Note that the light shielding layers SH1 and SH2 may be formed physically continuously.

The first gate electrode GE1 is located on the insulating layer 13, and is covered with the insulating layer 14. The first semiconductor layer SMC1 is located on the insulating layer 12 and is covered with the insulating layer 13. The first semiconductor layer SMC1 includes two first channel regions RC1, a first low resistive region R1, and a second low resistive region R2. The first channel regions RC1 are positioned between the first low resistive region R1 and the second low resistive region R2. Each first channel region RC1 is opposed to the first gate electrode GE1.

The first low resistive region R1 is electrically connected to the signal line Si (first electrode E1), and is lower resistive than a resistive of the first channel region RC1. Note that the signal line Si (first electrode E1) passes through one or more contact holes CH1 passing thorough the insulating layers 13 and 14 and positioned in the area opposed to the first low resistive region R1 to be electrically connected to the first low resistive region R1.

The second low resistive region R2 is electrically connected to the auxiliary electrode AE via the second electrode E2, and is lower resistive than a resistive of the first channel region RC1. Note that the second electrode E2 is formed on the insulating layer 14. The second electrode E2 passes through one or more contact holes CH2 passing through the insulating layers 13 and 14 and positioned in the area opposed to the second low resistive region R2 to be electrically connected to the second low resistive region R2.

The light shielding layer SH1 is opposed to the first switch SW1. The light shielding layer SH1 is opposed to at least the entirety of the first channel regions RC1 of the first semiconductor layer SMC1. The pixel electrode PE passes through the contact hole CN1 formed in the insulating layers 15 and 16 to be electrically connected to the second electrode E2.

The second gate electrode GE2 is located on the insulating layer 13 and is covered with the insulating layer 14. The second semiconductor layer SMC2 is located on the insulating layer 12 and is covered with the insulating layer 13.

The second semiconductor layer SMC2 includes two second channel regions RC2, a third low resistive region R3, and a fourth low resistive region R4. The second channel regions RC2 are positioned between the third low resistive region R3 and the fourth low resistive region R4. Each second channel region RC2 is opposed to the second gate electrode GE2.

The third low resistive region R3 is electrically connected to the third electrode E3, and is lower resistive than the second channel region RC2. Note that the third electrode E3 passes through one or more contact holes CH3 passing through the insulating layers 13 and 14 and positioned in the area opposed to the third low resistive region R3 to be electrically connected to the third low resistive region R3. In the example depicted, the third electrode E3 passes through four contact holes CH3 to be electrically connected to the third low resistive region R3. In the present embodiment, the first electrode E1, second electrode E2, and fourth to sixth electrodes E4 to E6 pass through four contact holes CH, respectively, to be electrically connected to corresponding semiconductor layers SMC.

The fourth low resistive region R4 is electrically connected to the auxiliary electrode AE via the fourth electrode E4, and is lower resistive than a resistive of the second channel region RC2. Note that the fourth electrode E4 is formed on the insulating layer 14. The fourth electrode E4 passes through one or more contact holes CH4 passing through the insulating layers 13 and 14 and positioned in the area opposed to the fourth low resistive region R4 to be electrically connected to the fourth low resistive region R4.

The light shielding layer SH2 is opposed to the second switch SW2. The light shielding layer SH2 is opposed to at least the entirety of the second channel regions RC2 of the second semiconductor layer SMC2. The auxiliary electrode AE passes the contact hole CN2 formed in the insulating layer 15 to be electrically connected to the fourth electrode E4. The auxiliary electrode AE is positioned between the pixel electrode PE and a switch group including the first switch SW1, the second switch SW2, and the third switch SW3.

The connection electrode EL is located on the insulating layer 15, and is covered with the insulating layer 16. The connection electrode EL passes through the contact hole CN4 formed in the insulating layer 15 to be electrically connected to the third electrode E3. The capacitance line Csj is located on the connection electrode EL. In the present embodiment, after forming the auxiliary electrode AE and the connection electrode EL, the capacitance line Cs is formed; however, the auxiliary electrode AE and the connection electrode EL may be formed after forming the capacitance line Cs. In that case, the capacitance line Cs is in direct contact to the third electrode E3, and the connection electrode EL is formed on the capacitance line Cs.

In the present embodiment, a diameter of the contact holes CN2 and CN3 is substantially 5 µm. The diameter of the contact hole CN1 of the insulating layer 15 is substantially 5 µm. The contact holes CN1 and CN2 are positioned to be substantially apart from each other by 8 to 10 µm. Furthermore, one side of the pixel electrode PE is greater than the diameter of the contact hole CN, which is 80 to 300 µm, for example. In the present embodiment, it is 80 to 150 µm. Thus, a space to provide the contact holes CN1, CN2, and CN3 is sufficiently secured.

The light shielding layer BM further includes a plurality of third light shielding parts BM3. Each of the third light shielding parts BM3 is opposed to the first switch SW1 and the second switch SW2 together with the first light shielding parts BM1 and the second light shielding parts BM2, and is formed integrally with the first light shielding parts BM1 and the second light shielding parts BM2. The light shielding layers BM, SH1, SH2, and SH3 shield the first semiconductor layer SMC1, the second semiconductor layer SMC2, and the third semiconductor layer SMC3, and thus, leak current which may occur in the first semiconductor layer SMC1, the second semiconductor layer SMC2, and the third semiconductor layer SMC3 can be reduced.

The first semiconductor layer SMC1, the second semiconductor layer SMC2, and the third semiconductor layer SMC3 are formed of a semiconductor such as amorphous silicon, polycrystalline silicon, organic semiconductor, and oxide semiconductor. The oxide semiconductor may be, for example, indium gallium zinc oxide (IGZO), indium gallium oxide (IGO), indium zin oxide (IZO), zinc tin oxide (ZnSnO), zinc oxide (ZnO), and transparent amorphous oxide semiconductor (TAOS). In the present embodiment, the first semiconductor layer SMC1, the second semiconductor layer SMC2, and the third semiconductor layer SMC3 are formed of a low temperature polycrystalline silicon as polycrystalline silicon.

The first switch SW1, the second switch SW2, and the third switch SW3 each include two gate electrodes GE, and the number of gate electrodes GE may be one or three or more. For example, if the first semiconductor layer SMC1, the second semiconductor layer SMC2, and the third semiconductor layer SMC3 are formed of an amorphous silicon, the first switch SW1, the second switch SW2, and the third switch SW3 may each be a single gate TFT.

Furthermore, the first switch SW1, the second switch SW2, and the third switch SW3 are formed of a top gate TFT. Note that the first switch SW1, the second switch SW2, and the third switch SW3 are not limited to an example of the present embodiment, and may be a bottom gate TFT.

Figure 10A:
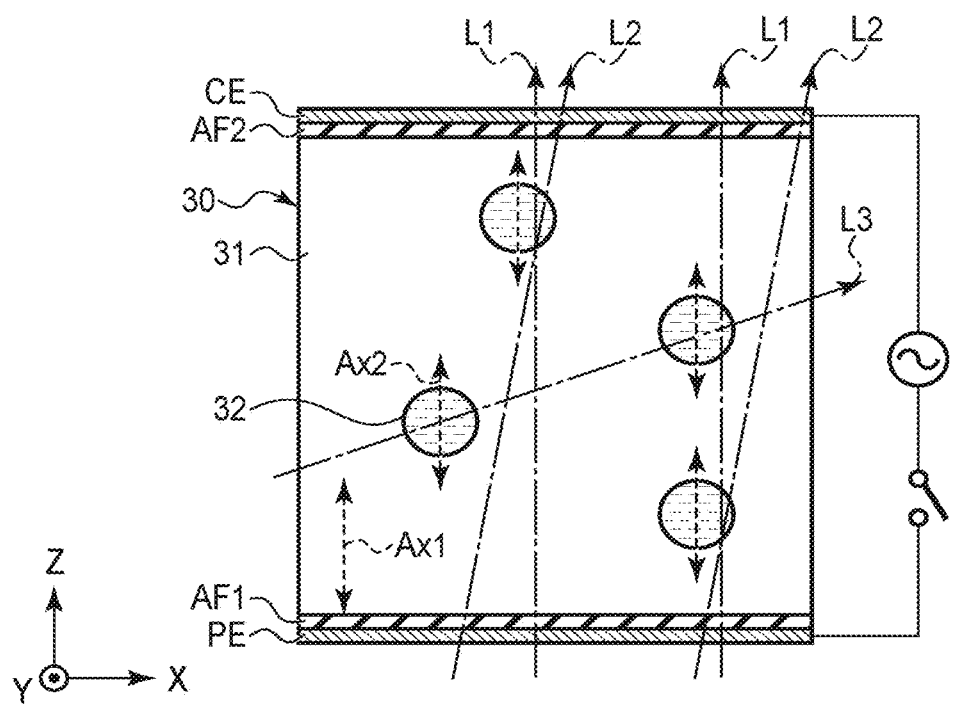
FIG. 10A is a schematic view of a liquid crystal layer in a transparent state.

Hereinafter, an example of the structure of the display device including the liquid crystal layer 30 as a polymer dispersed liquid crystal layer will be explained. FIG. 10A is a schematic view of the liquid crystal layer 30 in a transparent state.

As in FIG. 10A, the liquid crystal layer 30 includes a liquid crystal polymer 31 and liquid crystal molecules 32. The liquid crystal polymer 31 is achieved by, for example, polymerizing liquid crystal monomers to be aligned to a predetermined direction by an alignment restriction force of the alignment films AF1 and AF2. The liquid crystal molecules 32 are dispersed in the liquid crystal monomers, and when the liquid crystal monomers are polymerized, the molecules are aligned in a predetermined direction depending on the alignment direction of the liquid crystal monomers. Note that the alignment films AF1 and AF2 may be horizontal alignment films to align the liquid crystal monomers and the liquid crystal molecules 32 along the X-Y plan defined by the first direction X and the second direction Y, or may be vertical alignment films to align the liquid crystal monomers and the liquid crystal molecules 32 in the third direction Z.

The liquid crystal molecules 32 may be a positive type having positive dielectric anisotropy or a negative type having negative dielectric anisotropy. The liquid crystal polymer 31 and the liquid crystal molecules 32 each have equal optical anisotropy. Or, the liquid crystal polymer 31 and the liquid crystal molecules 32 each have equal refractive anisotropy. That is, the liquid crystal polymer 31 and the liquid crystal molecules 32 have substantially equal ordinary index and extraordinary index. Note that the values of the ordinary index and the extraordinary index may not be completely the same for the liquid crystal polymer 31 and the liquid crystal molecules 32, and a shift caused by an error in the manufacturing process will be accepted. Furthermore, responsibility of the liquid crystal polymer 31 and the liquid crystal molecules 32 with respect to each field differs. That is, the responsibility of the liquid crystal polymer 31 with respect to the electric field is lower than the responsibility of the liquid crystal molecules 32 with respect to the electric filed.

The example of FIG. 10A corresponds to a state where a voltage is not applied to the liquid crystal layer 30 (a potential difference between the pixel electrode PE and the common electrode CE is zero), or a state where a second transparent voltage which will be described later is applied to the liquid crystal layer 30.

As in FIG. 10A, optical axis Ax1 of the liquid crystal polymer 31 and optical axis Ax2 of the liquid crystal molecules 32 are parallel to each other. In the example depicted, the optical axis Ax1 and the optical axis Ax2 are parallel to the third direction Z. The optical axis corresponds to a line parallel to a travelling direction of light by which the index becomes one value without depending on polarizing direction.

As described above, the liquid crystal polymer 31 and the liquid crystal molecules 32 have substantially equal refractive anisotropy, and the optical axis Ax1 and the optical axis Ax2 are parallel to each other, and thus, there is almost no index difference between the liquid crystal polymer 31 and the liquid crystal molecules 32 in any directions including the first direction X, second direction Y, and third direction Z. Thus, light L1 incident on the liquid crystal layer 30 in the third direction Z passes through without being scattered in the liquid crystal layer 30. The liquid crystal layer 30 can maintain the parallelism of light L1. Similarly, light L2 and light L3 diagonally incident inclining with respect to the third direction Z are not scattered within the liquid crystal layer 30. Thus, high transparency can be achieved. The state shown in FIG. 10A will be referred to as transparent state.

Figure 10B:
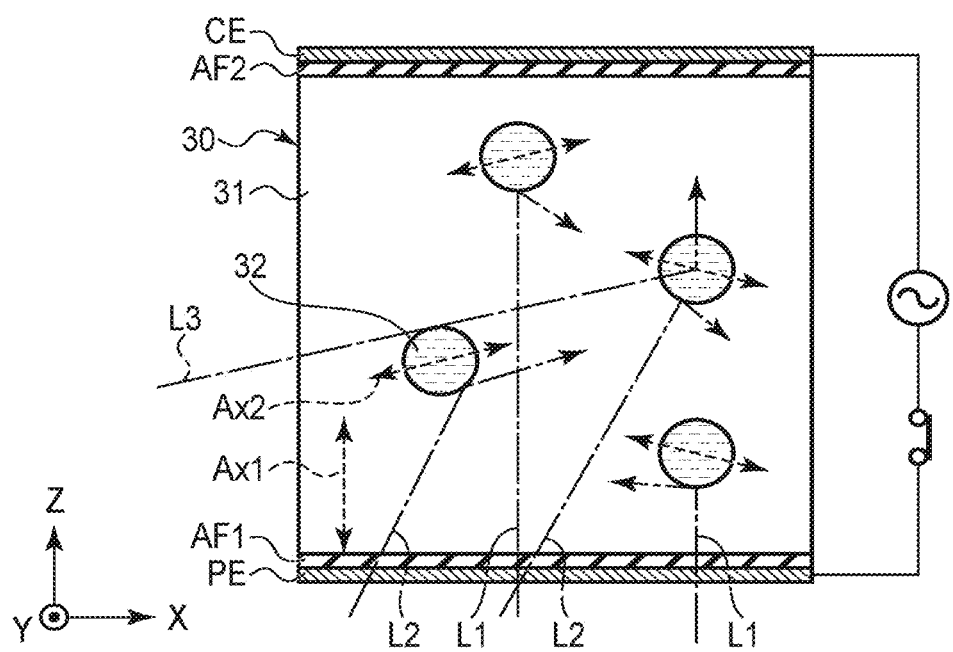
FIG. 10B is a schematic view of the liquid crystal layer in a scattering state.

FIG. 10B is a schematic view of the liquid crystal layer 30 in the scattering state.

As in FIG. 10B, as described above, the responsibility of the liquid crystal polymer 31 with respect to the electric field is lower than the responsibility of the liquid crystal molecules 32 with respect to the electric field. Thus, in a state where a voltage (scattering voltage which will be described later) higher than each of the second transparent voltage and first transparent voltage which will be described later is applied to the liquid crystal layer 30, the alignment direction of the liquid crystal polymer 31 does not change whereas the alignment direction of the liquid crystal molecules 32 changes depending on the electric field. That is, as in the figure, the optical axis Ax1 is almost parallel to the third direction Z, and the optical axis Ax2 is inclined with respect to the third direction Z. Thus, the optical axis Ax1 and the optical axis Ax2 are orthogonal to each other. Thus, there is a great index difference between the liquid crystal polymer 31 and the liquid crystal molecules 32 in any directions including the first direction X, second direction Y, and third direction Z. Thus, light L1, light L2, and light L3 incident on the liquid crystal layer 30 are scattered in liquid crystal layer 30. The state shown in FIG. 10B will be referred to as scattering state.

The driver DR switches the liquid crystal layer 30 between the transparent state and the scattering state.

Figure 11A:
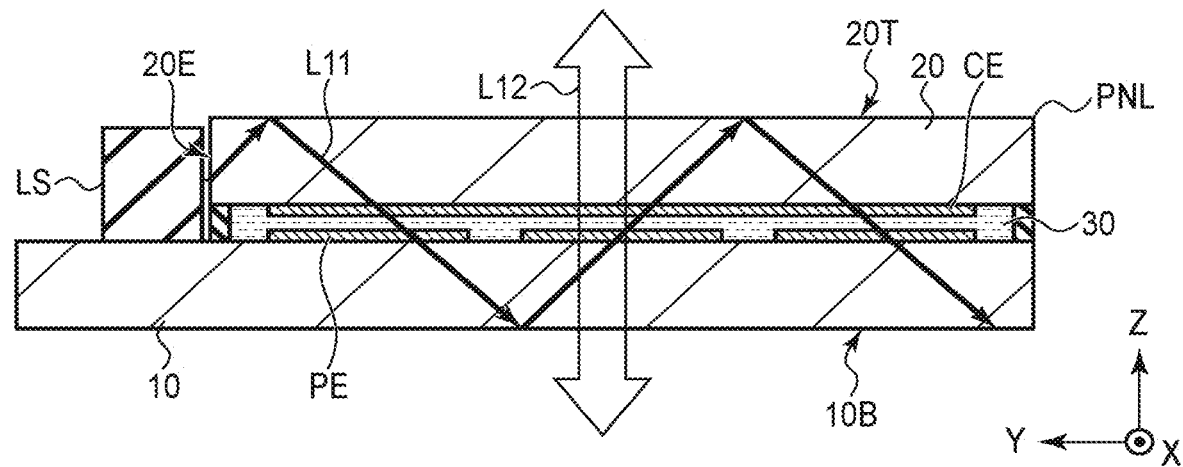
FIG. 11A is a cross-sectional view of a display panel with the liquid crystal layer in the transparent state.

FIG. 11A is a cross-sectional view of the display panel PNL in a case where the liquid crystal layer 30 is in a transparent state.

As in FIG. 11A, illumination light L11 emitted from the light emitting element LS enters in the display panel PNL from the end 20E to propagate through the transparent substrate 20, liquid crystal layer 30, and transparent substrate 10, for example. If the liquid crystal layer 30 is in a transparent state, the illumination light L11 is hardly scattered in the liquid crystal layer 30, and hardly leaks from the lower surface 10B of the transparent substrate 10 or the upper surface 20T of the transparent substrate 20.

External light L12 incident on the display panel PNL is hardly scattered by the liquid crystal layer 30 and passes through. That is, the external light incident on the display panel PNL from the lower surface 10B passes to the upper surface 20T, and the external light from the upper surface 20T passes to the lower surface 10B. Thus, when a user observes the display panel PNL from the upper surface 20T side, the user can recognize the background in the lower surface 10B side through the display panel PNL. Similarly, when a user observes the display panel PNL from the lower surface 10B side, the user can recognize the background in the upper surface 20T side through the display panel PNL.

Figure 11B:
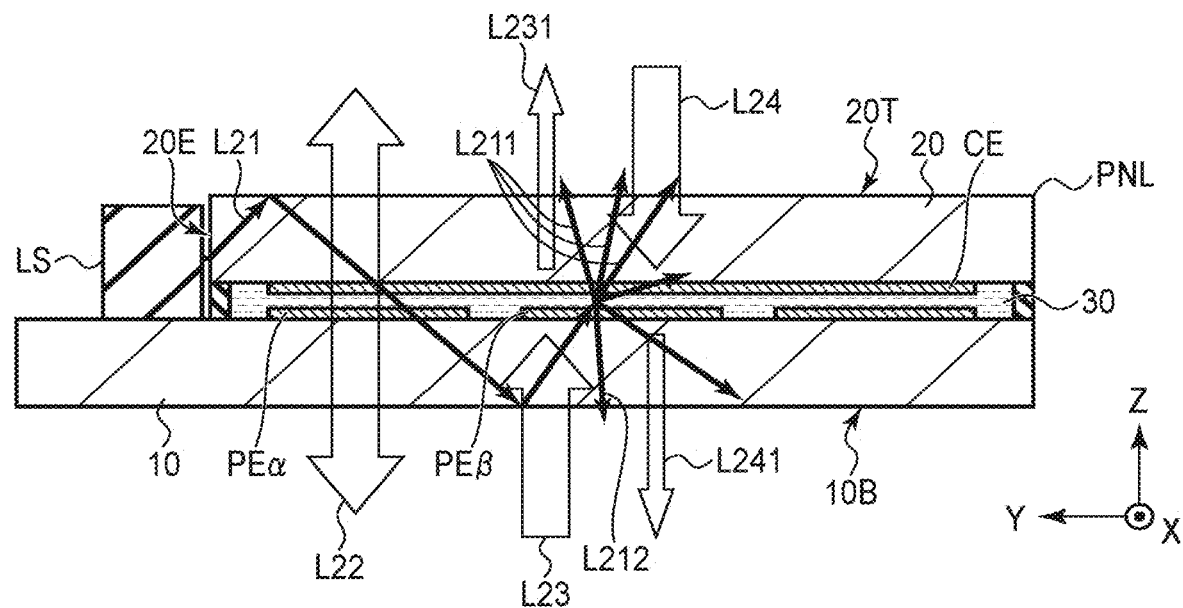
FIG. 11B is a cross-sectional view of the display panel with the liquid crystal layer in the scattering state.

FIG. 11B is a cross-sectional view of the display panel PNL in a case where the liquid crystal layer 30 is in the scattering state.

As in FIG. 11B, illumination light L21 emitted from the light emitting element LS enters into the display panel PNL from the end 20E to propagate through the transparent substrate 20, liquid crystal layer 30, and transparent substrate 10, for example. In the example depicted, the liquid crystal layer 30 between a pixel electrode PEα and the common electrode CE (liquid crystal layer to which a voltage applied between the pixel electrode PEα and the common electrode CE is applied) is in the transparent state, and thus, the illumination light L21 is hardly scattered in the area of the liquid crystal layer 30 opposed to the pixel electrode PEα. On the other hand, the liquid crystal layer 30 between a pixel electrode PEβ and the common electrode CE (liquid crystal layer to which a voltage applied between the pixel electrode PEβ and the common electrode CE) is in the scattering state, and thus, the illumination light L21 is scattered in the area of the liquid crystal layer 30 opposed to the pixel electrode PEβ. Scattered light L211 of the illumination light L21 is released to the outside from the upper surface 20T, and scattered light L212 is released to the outside from the lower surface 10B.

In a position overlapping the pixel electrode PEα, the external light L22 incident on the display panel PNL is hardly scattered to pass through the liquid crystal layer 30 as with the external light L12 shown in FIG. 11A. In a position overlapping the pixel electrode PER, the external light L23 incident from the lower surface 10B passes through the upper surface 20T after the partial light L231 is scattered by the liquid crystal layer 30. Furthermore, the external light L24 incident from the upper surface 20T passes through the lower surface 10B after the partial light L241 is scattered by the liquid crystal layer 30.

Thus, when the display panel PNL is observed from the upper surface 20T, color of the illumination light L21 can be recognized in the position overlapping the pixel electrode PEβ. In addition, the external light L231 passes through the display panel PNL, and thus, the background in the lower surface 10B side can be recognized through the display panel PNL. Similarly, when the display panel PNL is observed from the lower surface 10B side, color of the illumination light L21 can be recognized in the position overlapping the pixel electrode PEβ. In addition, the external light L241 passes through the display panel PNL, and thus, the background in the upper surface 20T side can be recognized through the display panel PNL. Note that, since the liquid crystal layer 30 is transparent in the position overlapping the pixel electrode PEα, color of the illumination light L21 is hardly recognized, and the background can be recognized through the display panel PNL.

Figure 12:
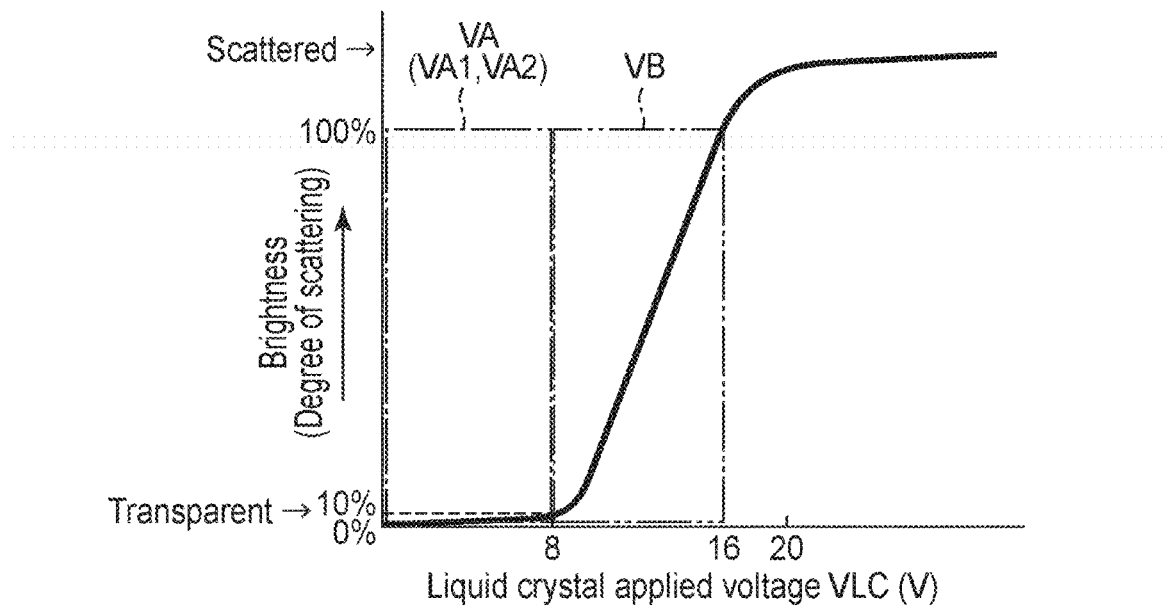
FIG. 12 is a graph indicative of scattering characteristics of the liquid crystal layer.

FIG. 12 is a graph indicating scattering characteristics of the liquid crystal layer 30, and illustrates a relationship between the voltage VLC applied to the liquid crystal layer 30 and the brightness. The brightness corresponds to the brightness of the scattered light L211 obtained when the illumination light L21 emitted from the light emitting element LS is scattered by the liquid crystal layer 30 as in FIG. 11B, for example. From a different point of view, the brightness represents a degree of scattering of the liquid crystal layer 30.

As in FIG. 12, when the voltage VLC is increased from 0 V, the brightness is steeply increased from approximately 8 V, and is saturated at approximately 20 V. Note that the brightness slightly increases when the voltage VLC is between 0 and 8 V. In the present embodiment, a voltage in the area surrounded by a two-dot chain line, that is, a voltage between 8 and 16 V is used for gradation (for example, 256 gradations) of each pixel PX. In the following description, a voltage of 8 V<VLC≤16 V will be referred to as scattering voltage. Furthermore, in the present embodiment, a voltage in the area surrounded by one-dot chain line, that is, a voltage of 0 V≤VLC≤8 V will be referred to as transparent voltage. The transparent voltage VA includes the above-mentioned first transparent voltage VA1 and the second transparent voltage VA2.

Note that values such as the voltage value described in the present application are examples. Thus, the voltage value may be different from the range described in the present application. For example, the upper value and the lower value of the scattering voltage VB and the transparent voltage VA are not limited to the examples, and may be arbitrarily determined based on the scattering characteristics of the liquid crystal layer 30. Unlike the present embodiment, for example, a voltage of 0 V≤VLC≤10 V may be referred to as transparent voltage and a voltage of 10 V<VLC≤20 V may be referred to as scattering voltage.

Degree of dispersion in a case where the degree of scattering of light incident on the liquid crystal layer 30 becomes highest when the scattering voltage VB is applied to the liquid crystal layer 30 is set to 100%. In this example, the degree of scattering when scattering voltage VB of 16 V is applied to the liquid crystal layer 30 is set to 100%. For example, the transparent voltage VA may be defined as a range of the voltage VLC by which the degree of scattering (brightness) becomes below 10%. Or, the transparent voltage VA may be defined as a voltage VLC which is equal to or less than the voltage corresponding to the lowest gradation (8 V in the example of FIG. 12).

Furthermore, the transparent voltage VA (first transparent voltage VA1 and second transparent voltage VA2) may be different from the example shown in FIG. 12. For example, the first transparent voltage VA1 may be a voltage by which the degree of scattering becomes between 10 and 50%. Furthermore, the second transparent voltage VA2 may be a voltage by which the degree of scattering becomes less than 10%.

Note that the graph of FIG. 12 is applicable to a case where the polarity of the voltage applied to the liquid crystal layer 30 is positive (+) and it is negative (−). In the latter case, the voltage VLC is an absolute value of the negative polarity voltage.

Figure 13A:
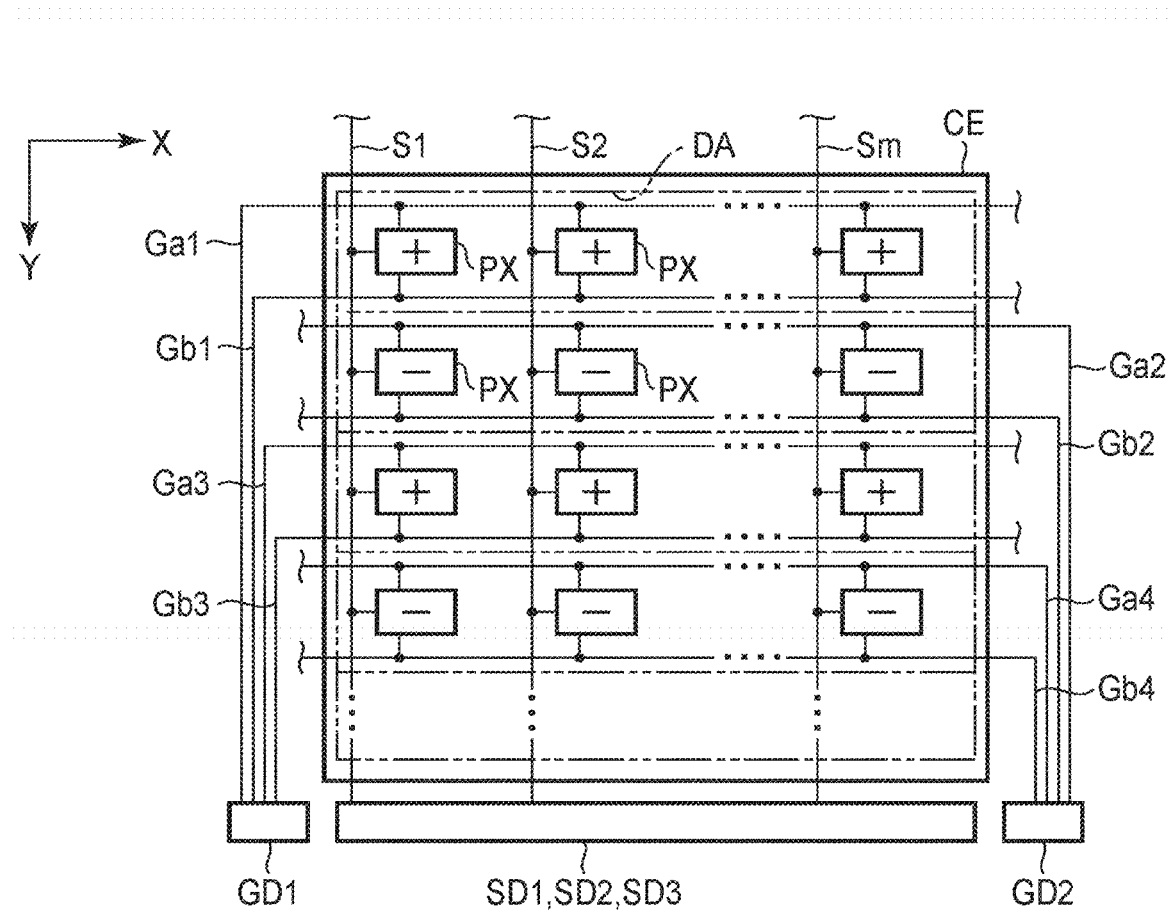
FIG. 13A illustrates an outline of one-line inverse driving.
Figure 13B:
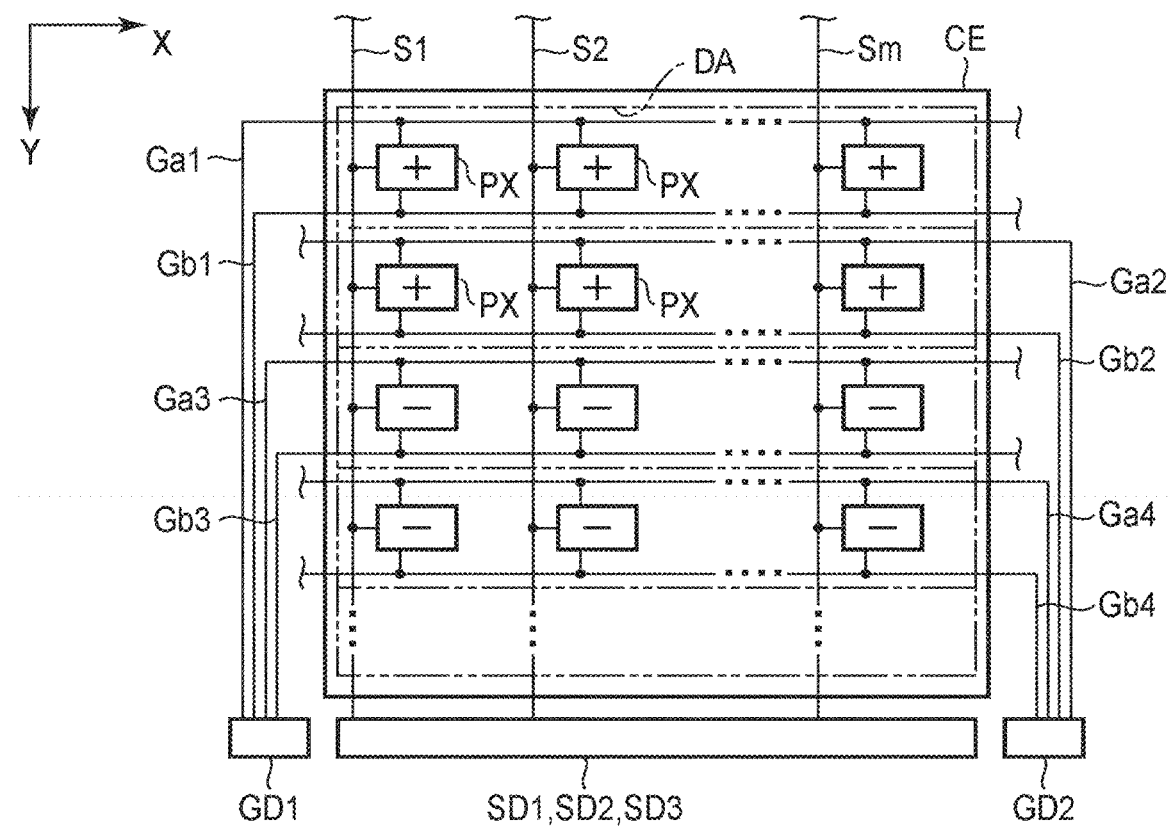
FIG. 13B illustrates an outline of two-line inverse driving.
Figure 13C:
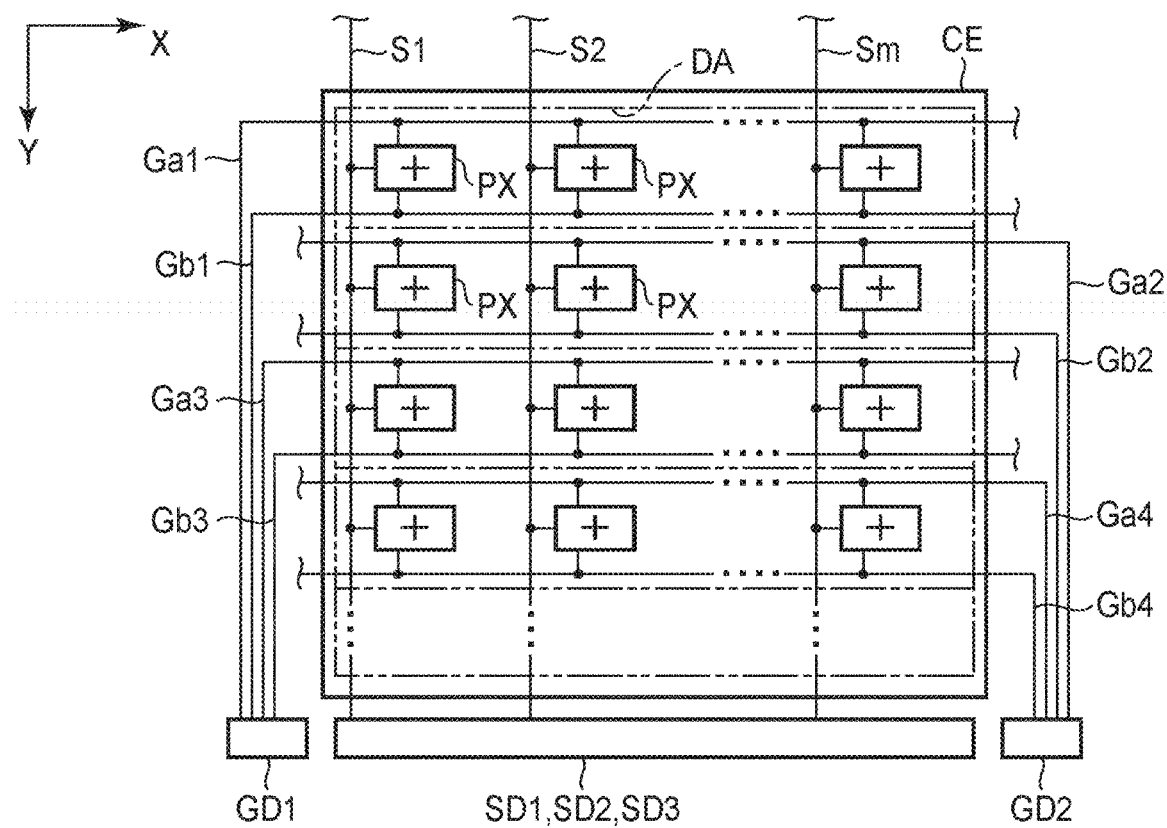
FIG. 13C illustrates an outline of subframe inverse driving.

To the display device DSP, the polarity inversion drive in which the polarity of the voltage applied to the liquid crystal layer 30 is reversed is applicable. FIGS. 13A, 13B, and 13C are diagrams indicating the outline of the polarity inversion drive. In this example, a driving method on which one frame period includes a plurality of subframe periods (a plurality of field periods) is applied to the display device DSP. The driving method may be referred to as a field sequential method, for example.

FIG. 13A indicates one line inverse drive in which the voltage (voltage written to pixels PX) applied to the liquid crystal layer 30 is reversed between the positive polarity (+) and negative polarity (−) per pixels in one row (one line) in per subframe period.

In the driving method, for example, the scanning line driving circuits GD1 and GD2 supply a first control signal Ca to the first scanning lines Ga while, in each one horizontal period in which a second control signal Cb is supplied to the second scanning lines Gb, the polarity of the common voltage Vcom supplied to the common electrode CE and the polarity of the image signal Vsig supplied from the signal line driving circuits SD1, SD2, and SD3 to the signal lines S are reversed. In the same horizontal period, the polarity of the common voltage and the polarity of the image signal are, for example, opposite.

Or, the driver DR may perform one line inverse driving in which the voltage applied to the liquid crystal layer 30 is reversed between the positive polarity and the negative polarity per frame period.

Or, the driver DR may perform interlace method driving per subframe period. In that case, when an odd-number field period and an even-number field period are switched, the driver DR performs the polarity reverse. The number of polarity reverses per subframe period can be greatly reduced, and the lower power consumption is facilitated. If pixels PX in one row are focused, the driver DR can perform one line inverse driving in which the voltage applied to the liquid crystal layer 30 is reversed between the positive polarity and the negative polarity per subframe period or per frame period.

FIG. 13B indicates two line inverse driving in which the voltage applied to the liquid crystal layer 30 is reversed between the positive polarity (+) and the negative polarity (−) at every two lines. Unlike the example of FIGS. 13A and 13B, the polarity may be reversed at every three or more lines.

FIG. 13C indicates subframe inverse driving in which the voltage applied to the liquid crystal layer 30 is reversed between the positive polarity (+) and the negative polarity (−) per subframe period. In such a driving method, for example, the polarity of the common voltage Vcom and the polarity of the image signal Vsig are reversed per subframe period. In the same subframe period, the polarity of the common voltage Vcom and the polarity of the image signal Vsig are opposite, for example.

Or, the driver DR may perform frame inverse driving in which the voltage applied to the liquid crystal layer 30 is reversed between the positive polarity and the negative polarity per frame period.

Now, a relationship between the image signal Vsig and the common voltage Vcom will be explained.

If the driver DR (signal line driving circuit SD, Vcom circuit VC, and the like) exerts excellent voltage resistivity by, for example, utilizing a highly pressure resistive signal line driving circuit SD, the signal line driving circuit SD outputs an image signal Vsig of 0 to +16 V, and the Vcom circuit VC switches the voltage value of the common voltage Vcom in a range of 0 to +16 V. Thus, the voltage VLC (−16 to +16 V) shown in FIG. 12 can be supplied to the liquid crystal layer 30.

However, if the above-mentioned driver DR is used, the power used by the driver DR is increased. Thus, the power used by the driver DR is required to be decreased.

Furthermore, for example, the voltage resistivity may possibly be insufficient when a conventional signal line driving circuit SD is used. Thus, the driver DR exerts, preferably, excellent voltage resistivity.

Furthermore, if a high pressure resistive signal line driving circuit SD is used, production costs may become high. Thus, production costs related to the driver DR is, preferably, lowered.

Thus, in the present embodiment, a technique of lowering at least the power used by the driver DR is presented. In the present embodiment, the signal line driving circuit SD outputs the image signal Vsig of 0 to +8 V, and the Vcom circuit VC switches the voltage value of the common voltage Vcom in a range of 0 to +8 V. Thus, the voltage VLC (−16 to +16 V) is supplied to the liquid crystal layer 30.

Furthermore, in the present embodiment, the voltage value of the image signal Vsig and the value of the common voltage Vcom can be suppressed, and thus, the pressure resistivity of the driver DR can be suppressed.

Furthermore, as compared to a case where the high pressure resistive signal line driving circuit SD is used, the production costs related to the driver DR can be decreased.

Now, a relationship between the image signal Vsig of 0 to +8 V, potential Pp of the pixel electrode PE, and common voltage Vcom of 0 to +8 V will be explained. Note that the polarity of the common voltage Vcom and the polarity of the image signal Vsig are opposite.

FIG. 14 illustrates an example of the image signal Vsig, potential Pp of the pixel electrode PE, common voltage Vcom, and auxiliary signal AS in display scanning to which the above-mentioned subframe inversion driving is applied, and illustrates waveforms corresponding to maximum values of the gradation. Note that a plurality of waveforms are plotted to be shifted from each other even if the voltage levels of the waveforms are the same for better understanding of the figures in FIG. 14, and FIGS. 15, 16A, and 16B which will be described later.

As in FIG. 14, the waveform of the image signal Vsig is depicted in two-dot chain line, waveform of potential Pp of the pixel electrode PE is depicted in a solid line, and waveform of the common voltage Vcom and the auxiliary signal AS is depicted in a dashed line. In the present embodiment, the voltage value of the auxiliary signal AS is the same as the value of the common voltage Vcom. With respect to the image signal Vsig and the potential Pp of the pixel electrode PE, waveforms corresponding to the maximum value of gradation (max) are shown. In the example depicted, the common voltage Vcom (auxiliary signal AS) and the image signal Vsig are polarity reversed per subframe period Psf. In each of the common voltage Vcom (auxiliary signal AS) and the image signal Vsig, the lower value is 0 V, and the upper value is 8 V.

Apart from the example of FIG. 14, when the polarity inversion driving including the below-mentioned examples of FIG. 15 and the like is focused, if the drive voltage applied to the liquid crystal layer 30 (voltage written to pixels PX) is positive, a difference between the potential Pp of the pixel electrode PE and the common voltage Vcom (Pp−Vcom) becomes 0 V or a positive voltage value. On the other hand, if the drive voltage applied to the liquid crystal layer 30 (voltage written to pixels PX) is negative, a difference between the potential Pp and the common voltage Vcom (Pp−Vcom) becomes 0 V or a negative voltage value.

When the polarity inversion driving of FIG. 14 is focused, in a subframe period Psf1 in which the negative polarity voltage is written to the pixels PX, the value of the common voltage Vcom (voltage value of the auxiliary signal AS) becomes 8 V, and the voltage value of the image signal Vsig becomes 0 V. In a first driving period Pd1 in the subframe period Psf1, the potential Pp is set to 0 V based on 0 V image signal Vsig. In the subframe period Psf1, the voltage value of the image signal Vsig is different from the voltage value of the auxiliary signal AS. Thus, in a second driving period Pd2 following the first driving period Pd1 in the subframe period Psf1, the potential Pp is changed by a coupling effect by the condenser CO to be set to −8 V. Note that the change of the potential Pp will be described later.

On the other hand, in a subframe period Psf2 in which the positive polarity voltage is written to the pixels PX, the value of the common voltage Vcom (voltage value of auxiliary signal AS) becomes 0 V, and the voltage value of the image signal Vsig becomes 8 V. In the first driving period Pd1 of the subframe period Psf2, the potential Pp is set to 8 V based on 8 V image signal Vsig. In the subframe period Psf2, the voltage value of the image signal Vsig and the voltage value of the auxiliary signal AS are different. Thus, in the second driving period Pd2 following the first driving period Pd1 of the subframe period Psf2, the potential Pp is changed by the coupling effect of the condenser CO to be set to 16 V.

In either case, 16 V voltage is applied between the common electrode CE and the pixel electrode PE. Then, scattering voltage VB to set the degree of scattering to be 100% is applied to the liquid crystal layer 30.

FIG. 15 illustrates an example of the image signal Vsig, potential Pp of the pixel electrode PE, common voltage Vcom, auxiliary signal AS in the display scanning to which the above-mentioned subframe inversion driving is applied, and illustrates waveforms corresponding to minimum values of gradation.

As in FIG. 15, the image signal Vsig and the potential Pp of the pixel electrode PE indicates a waveform corresponding to the minimum value (min) of gradation. In the example depicted, the common voltage Vcom (auxiliary signal AS) and the image signal Vsig are polarity reversed per subframe period Psf. In the common voltage Vcom (auxiliary signal AS), the lower value is 0 V, and the upper value is 8 V. The voltage value of the image signal Vsig is fixed to 4 V.

When focusing on the polarity inversion driving of FIG. 15, in a subframe period Psf1 in which the negative polarity voltage is written to the pixels PX, the value of the common voltage Vcom (voltage value of the auxiliary signal AS) becomes 8 V, and the voltage value of the image signal Vsig becomes 4 V. In the first driving period Pd1 of the subframe period Psf1, the potential Pp is set to 4 V based on 4 V image signal Vsig. In the subframe period Psf1, the voltage value of the image signal Vsig and the voltage value of the auxiliary signal AS are different. Thus, in the second driving period Pd2 following the first driving period Pd1 of the subframe period Psf1, the potential Pp is changed by the coupling effect of the condenser CO to be set to 0 V.

On the other hand, in a subframe period Psf2 in which the positive polarity voltage is written to the pixels PX, the value of the common voltage Vcom (voltage value of the auxiliary signal AS) is switched to 0 V while the voltage value of the image signal Vsig is maintained to be 8 V. In the first driving period Pd1 of the subframe period Psf2, the potential Pp is set to 4 V based on 4 V image signal Vsig.

In the subframe period Psf2, the voltage value of the image signal Vsig and the voltage value of the auxiliary signal AS are different. Thus, in the second driving period Pd2 following the first driving period Pd1 of the subframe period Psf2, the potential Pp is changed by the coupling effect of the condenser Co to be set to 8 V.

In either case, 8 V voltage is applied between the common electrode CE and the pixel electrode PE. Then, first transparent voltage VA1 to set the degree of scattering to be 0 to 10% is applied to the liquid crystal layer 30. Thus, if the image signal Vsig is set as the minimum value of gradation, external light incident on the display panel PNL is slightly scattered, and the visibility of the background of the display panel PNL may be decreased in some cases.

In consideration of the above, as will be described later, transparent scanning which lowers the voltage between the pixel electrode PE and the common electrode CE than the lowermost value of gradation (scanning in a reset period which will be described later) is utilized in sequencing of image display in order to improve the visibility of the background of the display panel PNL.

Figure 16A:
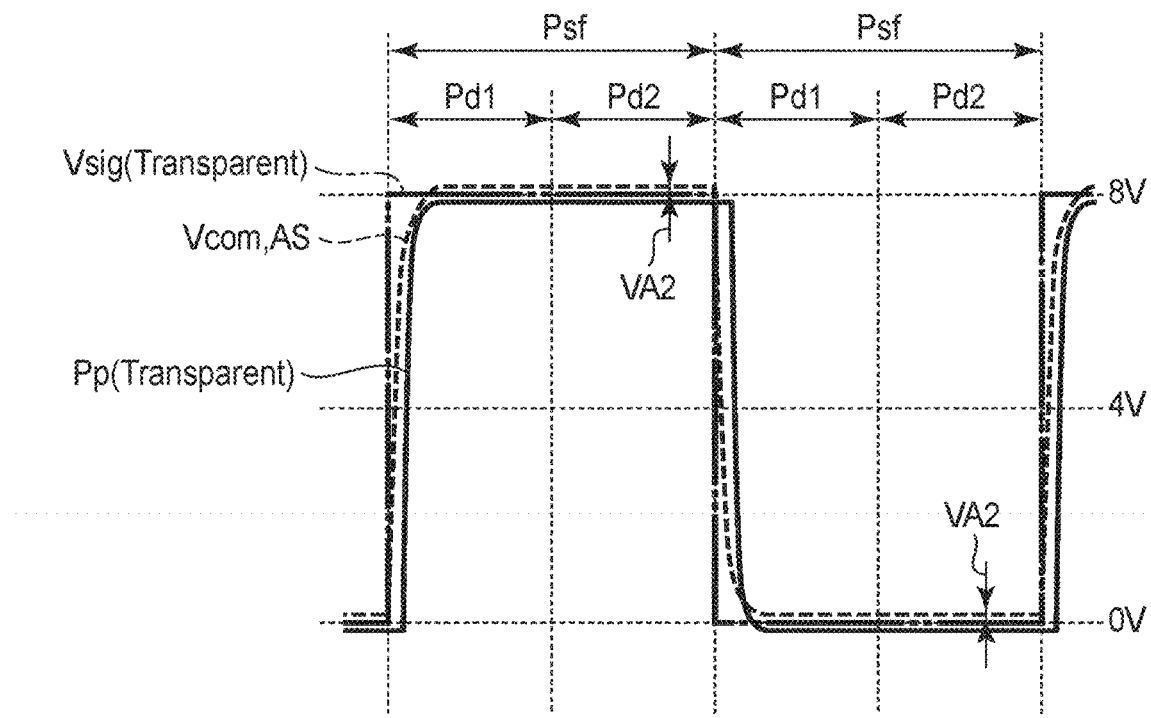
FIG. 16A is a diagram illustrating an example of an image signal in a transparent scanning, potential of the pixel electrode, common voltage, and auxiliary signal.

FIG. 16A illustrates an example of the image signal Vsig, potential Pp of pixel electrode PE, common voltage Vcom, and auxiliary signal AS in the transparent scanning.

As in FIG. 16A, as with the examples of FIGS. 14 and 15, the common voltage Vcom is switched between 0 and 8 V per subframe period Psf. In the transparent scanning, the image signal Vsig matches the common voltage Vcom per subframe period Psf (Vsig=Vcom=0 V or Vsig=Vcom=8 V).

In each subframe period Psf, the voltage value of the image signal Vsig and the voltage value of the auxiliary signal AS are the same. Thus, in the second driving period Pd2 of each subframe period Psf, a change to the potential Pp caused by the coupling effect of the condenser CO does not occur. Thus, in each subframe period Psf, the potential Pp is set to the same value as the common voltage Vcom based on the image signal Vsig. Thus, 0 V is applied to the liquid crystal layer 30. In other words, the second transparent voltage VA2 is applied to the liquid crystal layer 30.

However, the image signal Vsig in the transparent scanning is not limited to the example of FIG. 16A. For example, the potential Pp of the pixel electrode PE may be set to be above 0 V but below 8 V (0 V<Pp<8 V) while the common voltage Vcom is 0 V. The potential Pp may be set to be above 0 V but below 8 V (0 V<Pp<8 V) while the common voltage Vcom is 8 V. In each case, with the transparent scanning, the absolute value of the difference between the potential Pp and the common voltage Vcom becomes below 8 V, and the parallelism of light passing through the liquid crystal layer 30 increases. In other words, the second transparent voltage VA2 is not limited to 0 V, and the absolute value of the second transparent voltage VA2 may be less than 8 V.

Note that, in the transparent scanning, the voltage applied to the liquid crystal layer 30 should become below the lowermost value of gradation (for example, 8 V), and the potential Pp of the pixel electrode PE may not completely match the common voltage Vcom. As described above, the degree of scattering of light incident on the liquid crystal layer 30 becoming highest when the scattering voltage VB is applied to the liquid crystal layer 30 is set as 100%. For example, the second transparent voltage VA2 is, preferably, a voltage by which the degree of scattering becomes 10% or less.

Furthermore, in the transparent scanning of FIG. 16A, as described above, a change to the potential Pp caused by the coupling effect does not occur. Thus, each subframe period Psf may not include both of the first driving period Pd1 and the second driving period Pd2 and may include the first driving period Pd1 alone. In other words, only the first scanning line Ga may be driven but the second scanning line Gb may not be driven.

Figure 16B:
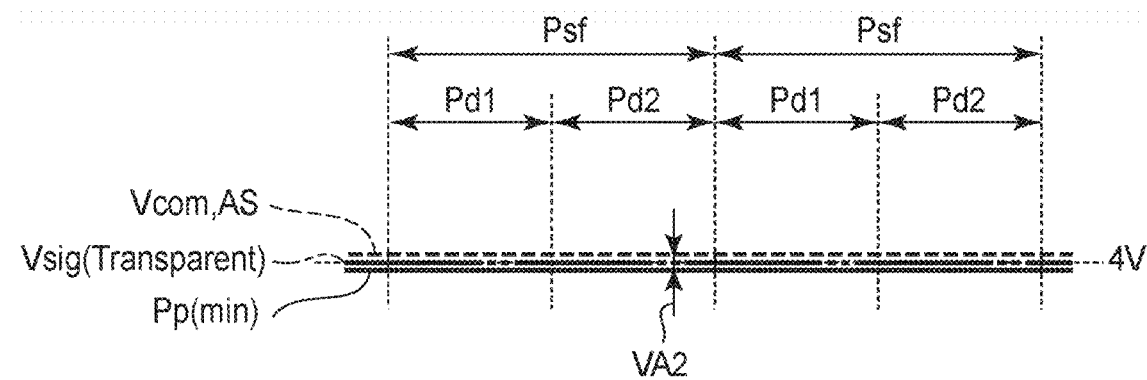
FIG. 16B is a diagram illustrating another example of the image signal in the transparent scanning, potential of the pixel electrode, common voltage, and auxiliary signal.

FIG. 16B illustrates another example of the image signal Vsig, potential Pp of pixel electrode PE, common voltage Vcom, and auxiliary signal AS in the transparent scanning.

As in FIG. 16B, in this example, in the transparent scanning, the polarity reverse of the common voltage Vcom and the image signal Vsig is stopped. Furthermore, the common voltage Vcom and the image single Vsig match each other as 4 V. Note that the common voltage Vcom and the image signal Vsig may match each other as a value other than 4 V, that is, for example, as 0 V.

In each subframe period Psf, the voltage value of the image signal Vsig and the voltage value of the auxiliary signal AS are the same. Thus, a change of the potential Pp caused by the coupling effect does not occur. Thus, in each subframe period Psf, the potential Pp is set to the same value as the common voltage Vcom based on the image signal Vsig. Thus, the second transparent voltage VA2 is applied to the liquid crystal layer 30. Furthermore, as with the case of FIG. 16A, the second transparent voltage VA2 is, preferably, a voltage by which the degree of scattering becomes 10% or less.

Note that, in the transparent scanning of FIG. 16B, a change to the potential Pp caused by the coupling effect does not occur. Thus, each subframe period Psf may not include both of the first driving period Pd1 and the second driving period Pd2, and may include the first driving period Pd1 alone.

Figure 17:
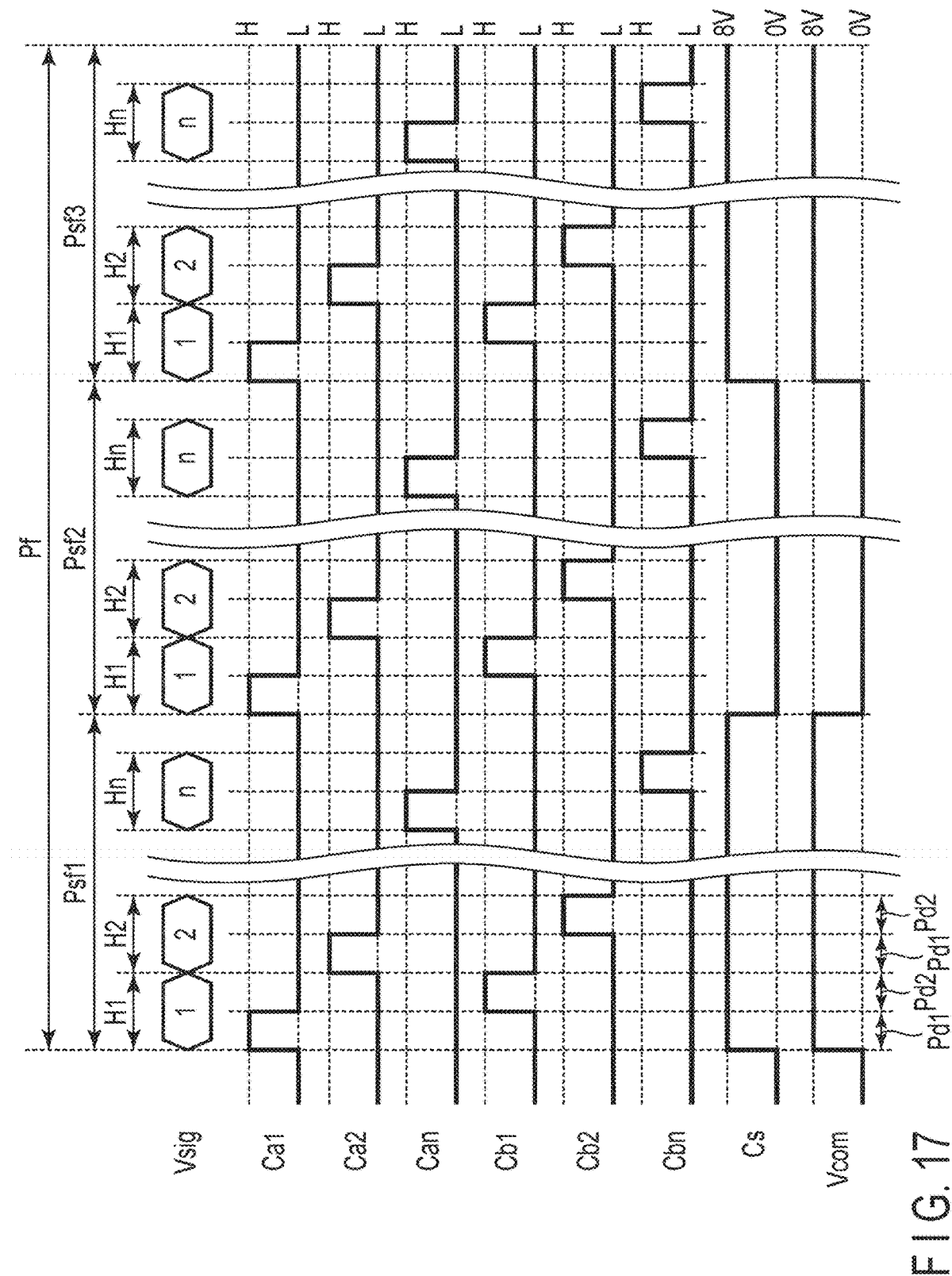
FIG. 17 is a timing chart illustrating changes of an image signal, first control signal, second control signal, auxiliary signal, and common voltage in one frame period.

Now, a method of driving the display device DSP will be explained. FIG. 17 is a timing chart illustrating changes of the image signal Vsig, first control signal Ca, second control signal Cb, auxiliary signal AS, and common voltage Vcom in one frame period Pf.

As in FIG. 17, one frame period Pf includes a first subframe period Psf1, second subframe period Psf2, and third subframe period Psf3. For example, red image is display in the first subframe period Psf1, green image is displayed in the second subframe period Psf2, and blue image is displayed in the third subframe period Psf3. These images displayed in a time division manner are combined such that users can recognize as multicolor display image. Furthermore, each subframe period Psf include a plurality of horizontal scanning periods H (H1 to Hn). Furthermore, the horizontal scanning period H includes the first driving period Pd1 and the second driving period Pd2.

As in FIGS. 17 and 4, in the first subframe period Psf1, the driver DR switches the common voltage Vcom and the auxiliary signal AS from 0 to +8 V, and the driver DR outputs the image signal Vsig.

In the first driving period Pd1 in the first horizontal scanning period H1, the driver DR shifts the voltage of the first control signal Ca1 to high (H) level and sets the voltages of other first control signals Ca2 to Can and all second control signals Cb1 to Cbn to low (L) level. As a result, the first switches SW1 and the second switches SW2 of all pixels PX in the first row are turned on, and the other switches are turned off. Then, the driver DR sets the voltage of the first controls signal Ca1 to L level, and the first switches SW1 and the second switches SW2 of all pixels PX in the first row are switched to off.

When transitioning to the second driving period Pd2 of the horizontal scanning period H1, the driver DR shifts the voltage of the second control signal Cb1 to H level, and maintains the voltage of the other control signals as L level.

Thus, the third switches SW3 of all pixels PX in the first row are turned on, and the other switches are turned off. Then, the driver DR shifts the voltage of the second control signal Cb1 to L level, and the third switches SW3 of all pixels PX in the first row are switched to off.

Then, in the first driving period Pd1 of the second horizontal scanning period H2, the driver DR shifts the voltage of the first control signal Ca2 to H level and sets the voltage of other control signals to L level. As a result, the first switches SW1 and the second switches SW2 of all pixels PX in the second row are turned on, and the other switches are turned off. Then, the driver DR shifts the voltage of the first control signal Ca2 to L level, and the first switches SW1 and the second switches SW2 of all pixels PX in the second row are switched to off.

When transitioning to the second driving period Pd2 of the horizontal scanning period H2, the driver DR shifts the voltage of the second control signal Cb2 to H level, and maintains the voltage of the other controls signals as L level. Thus, the third switches SW3 of all pixels PX in the second row is turned on, and the other switches are turned off. Then, the driver DR shifts the voltage of the second control signal Cb2 to L level, and the third switches SW3 of all pixels PX in the second row are switched to off.

As described above, in the first subframe period Psf1, the driver DR switches the first to third switches SW1 to SW3 in each row between on and off. Similarly, in the second subframe period Psf2 and the third subframe period Psf3, the driver DR switches the first to third switches SW1 to SW3 between on and off. Note that, in this example, the subframe inversion driving is used. Thus, in the second subframe period Psf2, the driver DR switches the voltage of the common voltage Vcom and the auxiliary signal AS from +8 to 0 V. Then, in the third subframe period Psf3, the driver DR switches the voltage of the common voltage Vcom and the auxiliary signal AS from 0 to +8 V.

Now, an example where the image signal Vsig is written to the pixel electrode PE (j, i) positioned in jth row and ith column will be explained with reference to FIGS. 18 and 19.

Figure 18:
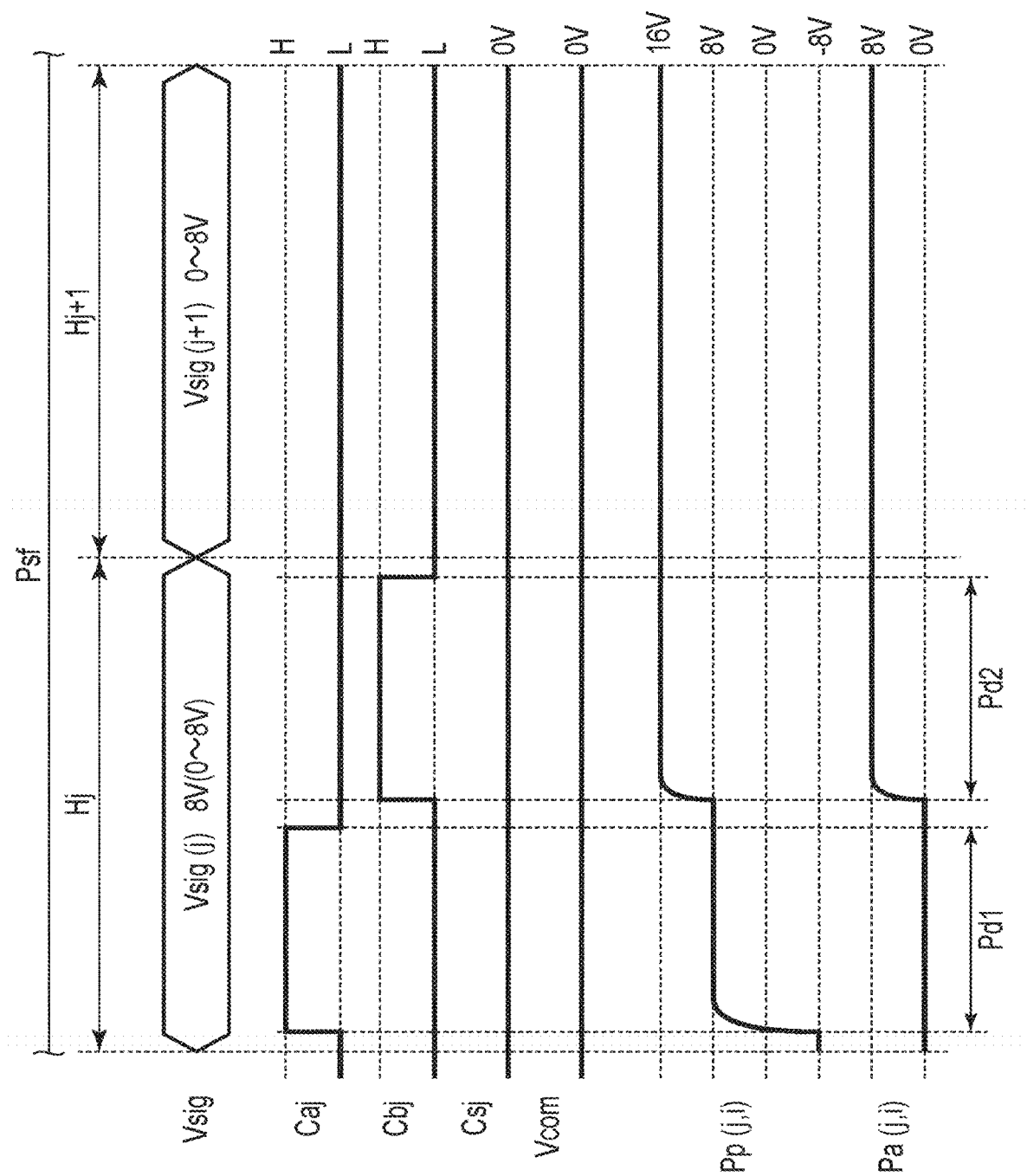
FIG. 18 is a timing chart illustrating changes of an image signal, first control signal, second control signal, auxiliary signal, common voltage, potential of pixel electrode, and potential of auxiliary electrode in two horizontal scanning periods, illustrating an example where positive polarity image signals are written to the pixel electrode.

FIG. 18 is a timing chart illustrating changes of the image signal Vsig, first control signal Caj, second scanning signal Cbj, auxiliary signal ASj, common voltage Vcom, potential Pp (j, i) of pixel electrode PE (j, i), and potential Pa (j, i) of auxiliary electrode AE (j, i) in two horizontal scanning periods Hj, and Hj+1, and illustrates an example where a positive polarity image signal Vsig is written to the pixel electrode PE (j, i).

In a subframe period Psf including a horizontal scanning period Hj, the driver DR supplies 0 V voltage to the common voltage Vcom and the auxiliary signal ASj. In the horizontal scanning period Hj, the driver DR outputs +8 V image signal Vsig and the like.

As in FIGS. 18 and 4, in the first driving period Pd1 of the horizontal scanning period Hj, the driver DR shifts the voltage of the first control signal Caj to H level, and the driver DR maintains the voltage of the second control signal Cbj to L level. As a result, the first switches SW1 and the second switches SW2 of all pixels PX in jth row are turned on, and the third switches SW3 of all pixels PX in jth row is maintained as off. The driver DR supplies the image signal Vsig to the pixel electrodes PE of all pixels PX in one (jth) row via the signal lines S and the first switches SW1, and supplies the auxiliary signal ASj to the auxiliary electrodes AE of all pixels PX of one (jth) row via corresponding one capacitance line Csj and the second switches SW2.

When focusing on the pixel PX (j, i), the image signal Vsig output by the driver DR is supplied to the pixel electrode PE (j, i) via the signal line Si and the first switch SW1 of the pixel PX (j, i), and the auxiliary signal ASj output by the driver DR is supplied to the auxiliary electrode AE (j, i) via the capacitance line Csj and the second switch SW2 of the pixel PX (j, i). That is, the potential Pp (j, i) of the pixel electrode PE (j, i) becomes +8 V, and the potential Pa (j, i) of the auxiliary electrode AE (j, i) becomes 0 V.

Then, the driver DR shifts the voltage of the first control signal Caj to L level. As a result, the first to third switches SW1 to SW3 of all pixels PX in jth row are turned off.

When transitioning to a second driving period Pd2 of the horizontal scanning period Hj, the driver DR shifts the voltage of the second control signal Cbj to H level. As a result, the first switches SW1 and the second switches SW2 of all pixels PX in one (jth) row are maintained as off, and the third switches SW3 of all pixels PX in one row (jth row) are switched to on. The driver DR supplies the image signal Vsig to the auxiliary electrodes AE of all pixels PX in one (jth) row via the signal lines S and the third switches SW3.

When focusing on the pixel PX (j, i), the image signal Vsig output from the driver DR is supplied to the auxiliary electrode AE (j, i) via the signal line Si and the third switch SW3 of pixel PX (j, i). That is, the potential Pa (j, i) of the auxiliary electrode AE (j, i) is changed from 0 to +8 V. As a result, the potential Pp (j, i) of the pixel electrode PE (j, i) transitions from +8 to +16 V by the coupling effect between the pixel electrode PE (j, i) and the auxiliary electrode AE (j, i).

Then, the driver DR shifts the voltage of the second control signal Cbj to L level. As a result, the first to third switches SW1 to SW3 of all pixels PX in jth row are turned off. Note that, as in the example depicted, there may be margin periods in the top of the horizontal scanning period Hj, between the first driving period Pd1 and the second driving period Pd2, and end of the horizontal scanning period Hj.

Then, in the next horizontal scanning period Hj+1 following the horizontal scanning period Hj, the pixel electrode PE (j, i) is in an electrically floating state. The common voltage Vcom is maintained as 0 V. As a result, the potential Pp (j, i) of the pixel electrode PE (j, i) is maintained as +16 V.

As described above, in the subframe period Psf, the potential Pp (j, i) of the pixel electrode PE (j, i) is +16 V after the second driving period Pd2 of the horizontal scanning period Hj, and 0 V common voltage Vcom is supplied to the common electrode CE, and thus, +16 V voltage is applied between the pixel electrode PE (j, i) and the common electrode CE. That is, +16 V voltage is applied to the liquid crystal layer 30. Thus, with the driving method of the present embodiment, a voltage higher than a voltage supplied to the signal lines S by the driver DR can be applied to the pixel electrodes PE, and thus, the driver DR can suppress the voltage applied to the signal line S, and the power used by the driver DR can be reduced.

Figure 19:
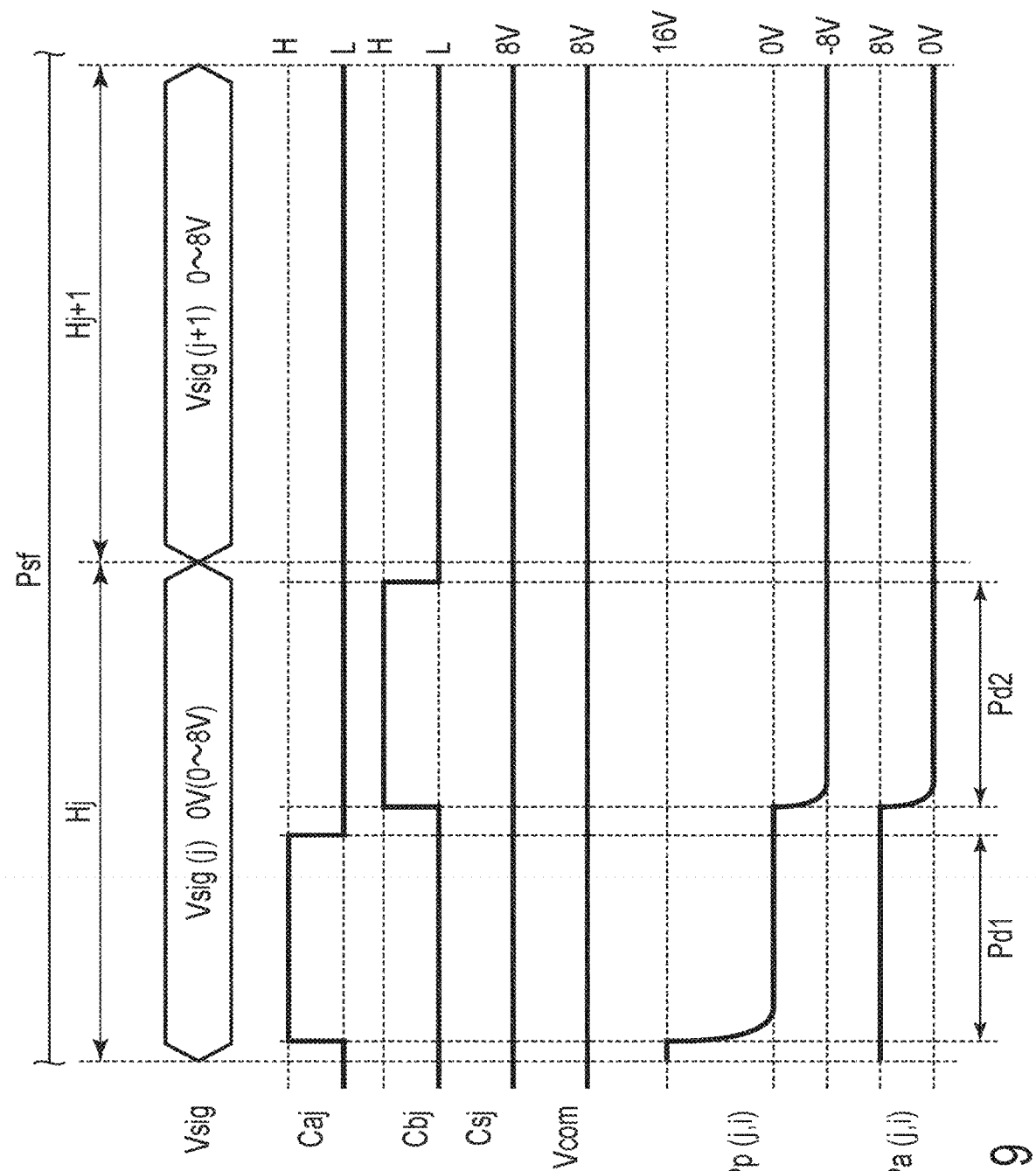
FIG. 19 is a timing chart illustrating changes of an image signal, first control signal, second control signal, auxiliary signal, common voltage, potential of pixel electrode, and potential of auxiliary electrode in two horizontal scanning periods, illustrating an example where negative polarity image signals are written to the pixel electrode.

FIG. 19 is a timing chart illustrating changes of the image signal Vsig, first scanning signal Caj, second scanning signal Cbj, auxiliary signal ASj, common voltage Vcom, potential Pp (j, i) of pixel electrode PE (j, i), and potential Pa (j, i) of auxiliary electrode AE (j, i) in two horizontal scanning periods Hj, and Hj+1, and illustrates an example where a negative image signal Vsig is written to the pixel electrode PE (j, i). Note that the matters explained above with reference to FIG. 18 will be omitted.

In the subframe period Psf including the horizontal scanning period Hj, the driver DR supplies +8 V voltage to the common voltage Vcom and the auxiliary signal ASj. In the horizontal scanning period Hj, the driver DR outputs 0 V image signal Vsig and the like.

As in FIGS. 19 and 4, in the first driving period Pd1 of the horizontal scanning period Hj, the image signal Vsig output by the driver DR is supplied to the pixel electrode PE (j, i), and the auxiliary signal ASj output by the driver DR is supplied to the auxiliary electrode AE (j, i). As a result, the pixel electrode PE (j, i) becomes 0 V, and the potential Pa (j, i) of the auxiliary electrode AE (j, i) becomes +8 V. Then, in the second driving period Pd2, the image signal Vsig output by the driver DR is supplied to the auxiliary electrode AE (j, i). That is, the potential Pa (j, i) of the auxiliary electrode AE (j, i) is changed from +8 to 0 V. As a result, by the coupling effect between the pixel electrode PE (j, i) and the auxiliary electrode AE (j, i), the potential Pp (j, i) of the pixel electrode PE (j, i) transits from 0 to −8 V.

Then, in the next horizontal scanning period Hj+1 following the horizontal scanning period Hj, the potential Pp of the pixel electrode PE (j, i) is maintained as −8 V, and the potential Pa (j, i) of the auxiliary electrode AE is maintained as 0 V.

As described above, in the subframe period Psf, after the second driving period Pd2 of the horizontal scanning period Hj, the potential Pp (j, i) of the pixel electrode (j, i) is maintained as −8 V, and 8 V voltage of the common voltage Vcom is supplied to the common electrode CE, and thus, −16 V voltage is supplied between the pixel electrode PE (j, i) and the common electrode CE (j, i). That is, −16 V voltage is applied to the liquid crystal layer 30. In the driving method of FIG. 19, the effect achieved by the driving method of FIG. 18 can be achieved.

An example of controlling of the display device DSP utilizing the transparent scanning will be explained with reference to FIGS. 20 to 24. Note that, in this example, a field sequential method is applied to the display device DSP as a driving method. In each subframe period, each of images of red, green, and blue is displayed. Images of each color displayed in the time division manner are combined such that users can recognize multicolor display images.

Figure 20:
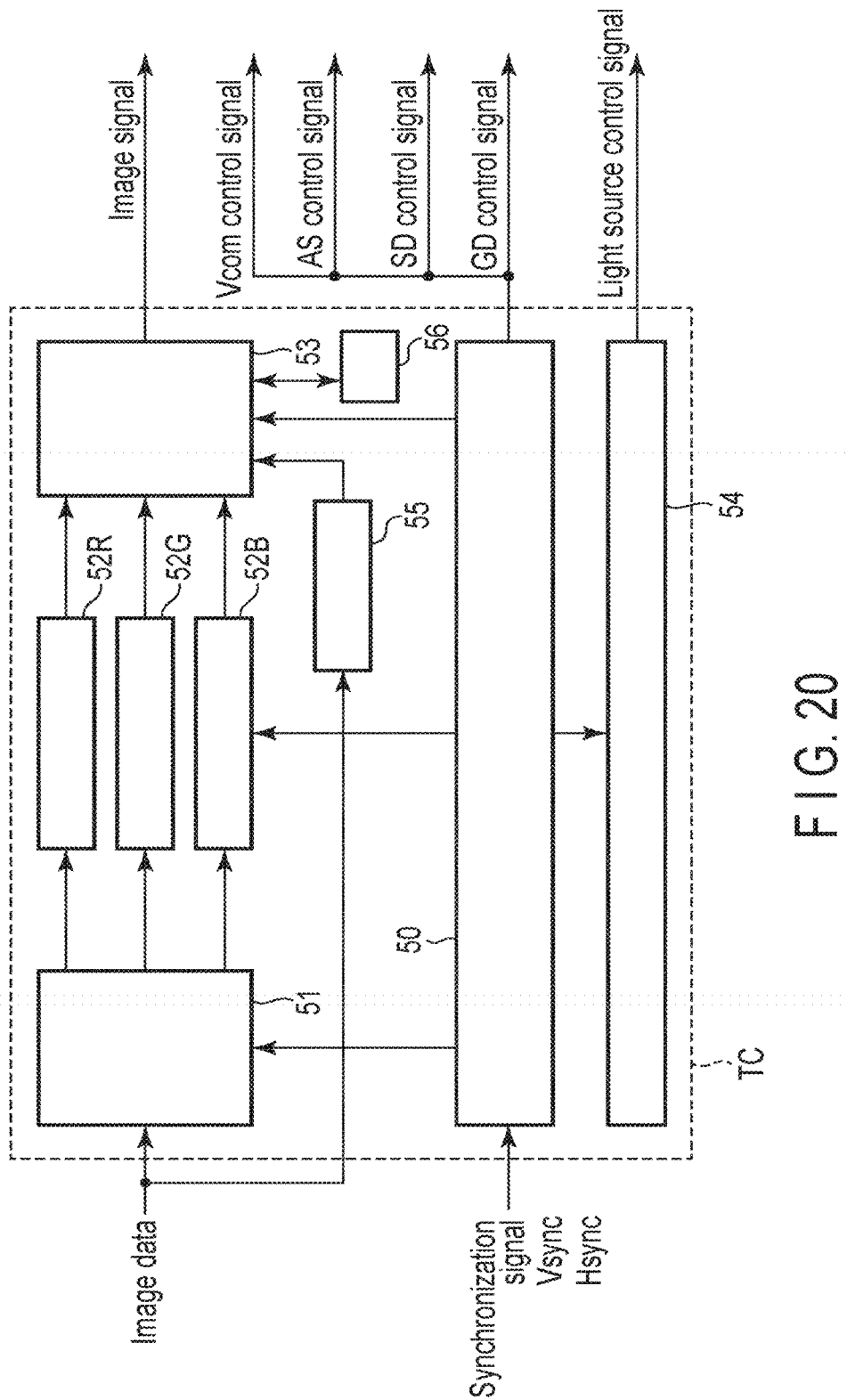
FIG. 20 is a diagram illustrating an example of the structure of a timing controller of FIG. 3.

FIG. 20 illustrates an example of the structure of the timing controller TC of FIG. 3.

As in FIG. 20, the timing controller TC includes, for example, a timing generator 50, frame memory 51, line memories 52R, 52G, and 52B, data converter 53, light source controller 54, and detector 55 as an address detector.

The frame memory 51 stores image data of one frame input externally. The line memories 52R, 52G, and 52B store subframe data of red, green, and blue. Each subframe data represents images of red, green, and blue to be displayed in each pixel PX in the time division manner (gradation value of each pixel PX, for example). Each subframe data stored in the line memories 52R, 52G, and 52B corresponds to one exceeding frame of the image data stored by the frame memory 51. The data converter 53 generates an image signal by performing various data conversion processes such as gamma correction with respect to the subframe data of each color stored in the line memories 52R, 52G, and 52B, outputs the image signal to the signal line driving circuit SD. Note that the timing controller TC may be structured such that the data are divided to the RGB data in the frame memory 51 to be sent to the RGB data to the data converter 53. In that case, the timing controller TC can be structured without the line memories 52R, 52G, and 52B.

The light source controller 54 outputs a light source control signal the light source driver LSD. The light source driver LSD drives light emitting elements LSR, LSG, and LSB based on the light source control signal. The light emitting elements LSR, LSG, and LSB are driven by, for example, pulse width modulation (PWM) control. That is, the light source driver LSD can adjust the brightness of each of the light emitting elements LSR, LSG, and LSB based on a duty ratio of the signals output to the light emitting elements LSR, LSG, and LSB.

The timing generator 50 controls operation timing of the frame memory 51, line memories 52R, 52G, and 52B, data converter 53, and light source controller 54 in synchronization with the vertical synchronization signal Vsync and horizontal synchronization signal Hsync input externally. Furthermore, the timing generator 50 controls the signal line driving circuit SD by outputting a SD control signal, controls the scanning line driving circuit GD by outputting a GD control signal, controls the Vcom circuit VC by outputting a Vcom control signal, and controls the auxiliary circuit AC by outputting an AS control signal.

The detector 55 is structured to detect, in a case where data of image is included in one frame image data input externally, an address of the data of image. The image is a character displayed on a part of the display area DA. The character may be a symbol including letters, diagram, or icon. Furthermore, a case where data of character is included in the image data is a case where data other than 0 is included in at least one part of all bits in the digital data. The address information of the data of image is supplied to the data converter 53. Thus, in a case where the data of image is included in the image data input externally, the timing controller TC generates a processed image signal and outputs the processed image signal to the signal line driving circuit SD to adjust the degree of scattering (transparency) of the area other than the area to display an image. The processed image signal may be generated by computing by the data converter 53 or may be generated by using the data stored in a table 56 of the timing controller TC.

Now, an example of adjusting the degree of scattering (transparency) of the area other than the area to display an image (character) will be explained.

Figure 21:
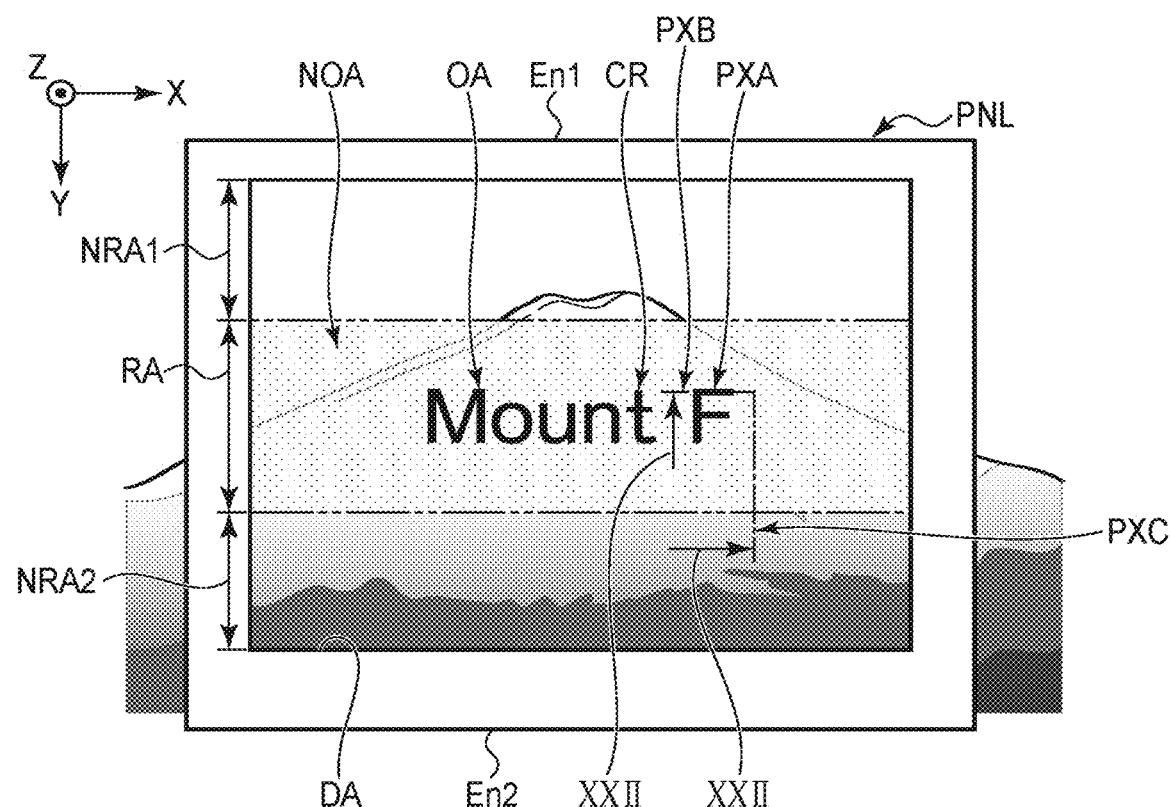
FIG. 21 is a diagram illustrating an example of the use of the display device, as a plan view of a display panel indicative of a state where an image is displayed in a single rewrite area.

As in FIG. 21, a user is now seeing mount F in the background through the display device DSP. In that case, if an image CR including a character column of Mount F is simply displayed in the display area DA, the image CR overlaps the mount F in the background, and the user may have difficulty in recognizing (identifying) the image CR. Thus, in the present embodiment, a technique by which a user can easily recognize the image CR even if the image CR overlaps the mount F in the background will be presented. Or, a technique by which a user is not easily affected by the background will be presented.

Here, in the display area DA, the area to display the image CR is a target area OA. In the present embodiment, the image CR is six characters arranged at intervals, and thus, the target area OA is a discontinuous area. In the display area DA, the area including the entirety of the rows where at least the target area OA is positioned is a rewrite area RA. In the present embodiment, the rewrite area RA includes not only the entirety of the rows in which the target area OA is positioned but also the entirety of several rows in the end En1 side with respect to the target area OA, and the entirety of several rows in the end En2 side with respect to the target area OA. Furthermore, the rewrite area RA is a center area of the display area DA in the second direction Y in this example. The area other than the target area OA in the rewrite area RA is non-target area NOA. The target area OA is an area corresponding to pixels to which a scattering voltage VB which is or greater than a predetermined voltage of gradation voltage is supplied. The non-target area NOA is an area corresponding to pixels to which the first transparent voltage VA1 is supplied. The first transparent voltage VA1 is a voltage within a predetermined range in vicinity where gradation display by gradation voltage becomes possible. The area other than the rewrite area RA in the display area DA is a non-rewrite area NRA. In this example, the display area DA includes a non-rewrite area NRA1 in the end En1 side with respect to the rewrite area RA and a non-rewrite area NRA2 in the end En2 side with respect to the rewrite area RA. As described above, the scattering voltage VB or the first transparent voltage VA1 is supplied to the pixels in the rewrite area RA, and the second transparent voltage VA2 is supplied to the pixels in the non-rewrite areas NRA1 and NRA2.

Figure 22:
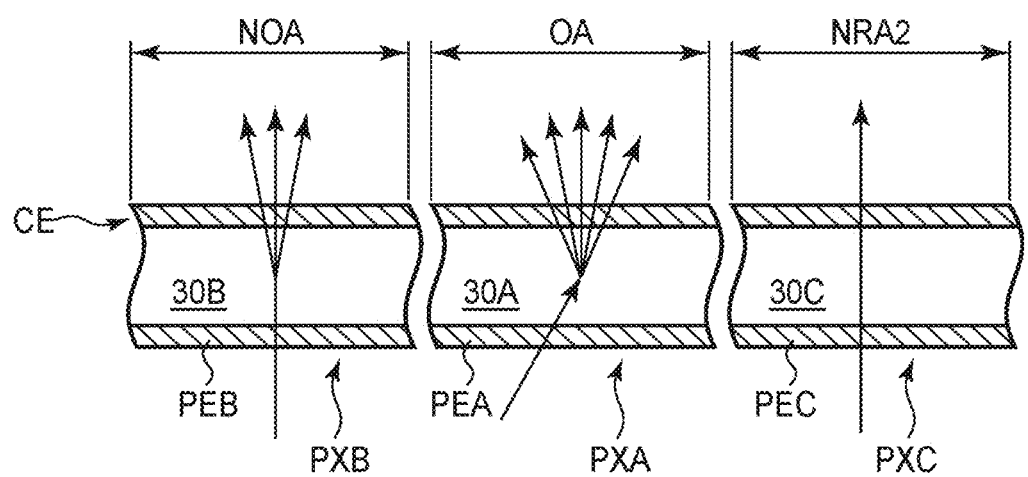
FIG. 22 is a cross-sectional view of the display panel of FIG. 21, taken along line XXII-XXII.
Figure 23:
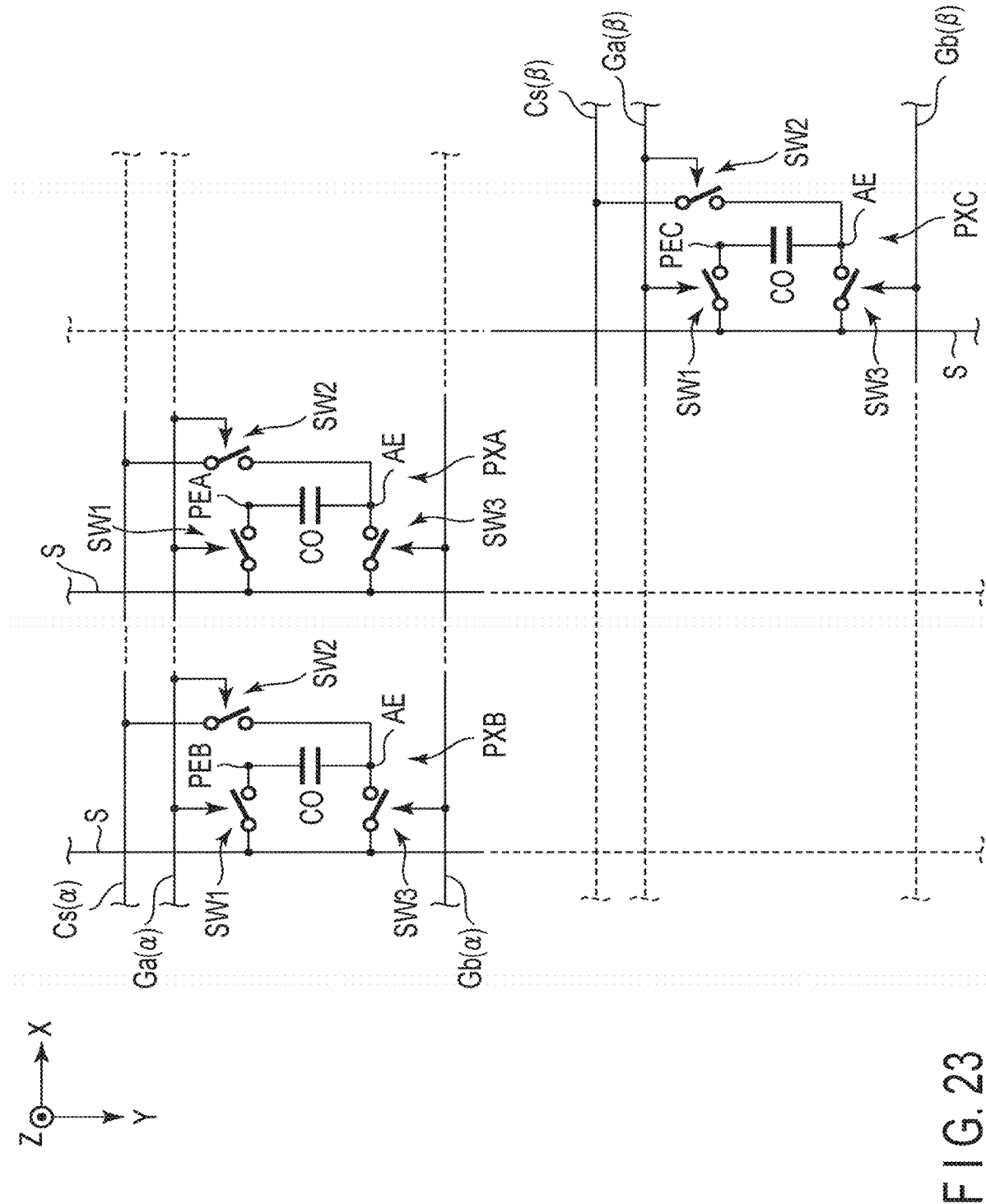
FIG. 23 is an equivalent circuit of a plurality of pixels of FIG. 22, illustrating a connection relationship between the first scanning line, second scanning line, signal line, capacitance line, switch, pixel electrode, and auxiliary electrode.

FIG. 22 illustrates only the elements of the display panel PNL necessary for the explanation. Furthermore, FIG. 22 illustrates light paths, and a state where the light is scattered by the liquid crystal layer 30 and a state where parallelism of light is maintained by the liquid crystal layer 30. FIG. 23 illustrates a connection relationship between the first scanning line Ga, the second scanning lien Gb, the signal line S, the capacitance line Cs, the switch SW, the pixel electrode PE, and the auxiliary electrode AE shown in FIG. 22. Note that, in FIG. 23, the liquid crystal layer 30 is omitted.

As in FIGS. 22 and 23, a plurality of pixel electrodes PE include a first pixel electrode PEA positioned in the target area OA, a second pixel electrode PEB positioned in the non-target area NOA, and a third pixel electrode PEC positioned in the non-rewrite area NRA2 (NRA). In this example, scanning lines G for pixels PX positioned in the rewrite area RA are first scanning line Ga($\alpha$) and second scanning line Gb($\alpha$), and capacitance line Cs is capacitance line Cs($\alpha$). Furthermore, scanning lines G for pixels PX positioned in the non-rewrite area NRA are first scanning line Ga($\beta$) and second scanning line Gb($\beta$), and the capacitance line Cs is capacitance line Cs($\beta$).

Pixels PX include a first pixel PXA, a second pixel PXB, and a third pixel PXC. Each of the first pixel PXA and the second pixel PXB is electrically connected to one corresponding first scanning line Ga($\alpha$), one corresponding second scanning line Gb($\alpha$), and one corresponding capacitance line Cs($\alpha$) of the first scanning lines Ga($\alpha$), the second scanning lines Gb($\alpha$), and the capacitance lines Cs($\alpha$). In this example, the first pixel PXA and the second pixel PXB are electrically connected to the same one first scanning line Ga($\alpha$), same one second scanning line Gb($\alpha$), and same one capacitance line Cs($\alpha$).

The third pixel PXC is electrically connected to one corresponding first scanning line Ga($\beta$), one corresponding second scanning line Gb($\beta$), and one corresponding capacitance line Cs($\beta$) of the first scanning lines Ga($\beta$), the second scanning lines Gb($\beta$), and the capacitance lines Cs($\beta$).

The liquid crystal layer 30 (display function layer) includes a first liquid crystal layer 30A (first display function layer) to which a voltage applied between the first pixel electrode PEA and the common electrode CE is applied, a second liquid crystal layer 30B (second display function layer) to which a voltage applied between the second pixel electrode PEB and the common electrode CE is applied, and a third liquid crystal layer 30C (third display function layer) to which a voltage applied between the third pixel electrode PEC and the common electrode CE is applied. In the present embodiment, the first liquid crystal layer 30A is interposed between the first pixel electrode PEA and the common electrode CE, the second liquid crystal layer 30B is interposed between the second pixel electrode PEB and the common electrode CE, and the third liquid crystal layer 30C is interposed between the third pixel electrode PEC and the common electrode CE.

The liquid crystal layer 30 (the first liquid crystal layer 30A, the second liquid crystal layer 30B, and the third liquid crystal layer 30C) scatters the light incident when the scattering voltage VB is applied, maintains the parallelism of the light incident when the first transparent voltage VA1 is applied, and maintains the parallelism of the light incident when the second transparent voltage VA2 is applied.

The parallelism of light passing the liquid crystal layer 30 when the second transparent voltage VA2 is applied is higher than the parallelism of the light passing through the liquid crystal layer 30 when the first transparent voltage VA1 is applied. The parallelism of light passing the liquid crystal layer 30 when the first transparent voltage VA1 is applied is higher than the parallelism of light passing through the liquid crystal layer 30 when the scattering voltage VB is applied.

Furthermore, the degree of scattering of light passing through the liquid crystal layer 30 when the scattering voltage VB is applied is higher than the degree of scattering of light passing through the liquid crystal layer 30 when the first transparent voltage VA1 is applied. The degree of scattering of light passing the liquid crystal layer 30 when the first transparent voltage VA1 is applied is higher than the degree of scattering of light passing through the liquid crystal layer 30 when the second transparent voltage VA2 is applied.

As in FIGS. 21 to 23, when the image CR is displayed in the target area OA of the display area DA, the driver DR of the present embodiment displays the image CR in the target area OA, sets the non-target area NOA to be transparent, and sets the non-rewrite area NRA to be transparent. The transparency of the non-rewrite area NRA is higher than the transparency of the non-target area NOA. In the present embodiment, the liquid crystal layer 30 utilizes the reverse polymer dispersed liquid crystal, and thus, the first transparent voltage VA1 is higher than the second transparent voltage VA2, and the scattering voltage VB is higher than the first transparent voltage VA1. Note that, unlike the present embodiment, if the liquid crystal layer 30 utilizes normal polymer dispersed liquid crystal, the first transparent voltage VA1 is higher than the scattering voltage VB, and the second transparent voltage VA2 is higher than the first transparent voltage VA1.

Thus, the driver applies the scattering voltage VB to the first liquid crystal layer 30A, applies the first transparent voltage VA1 to the second liquid crystal layer 30B, and applies the second transparent voltage VA2 to the third liquid crystal layer 30C. When one frame period during the period to display the image CR in the target area OA is focused, the driver DR drives the light source unit LU to emit light onto the liquid crystal layer 30, and while the light is irradiated to the liquid crystal layer 30, applies the scattering voltage VB to the first liquid crystal layer 30A, applies the first transparent voltage VA1 to the second liquid crystal layer 30B, and applies the second transparent voltage VA2 to the third liquid crystal layer 30C.

The color of the image CR (color displayed on the target area OA) is based on the color emitted by the light source unit LU. Thus, the driver DR can set the color of the image CR to be monochromatic emitted by the light source unit LU or mixed color of a plurality of colors emitted by the light source unit LU. Furthermore, the image CR may be displayed all monochromatic, or the image CR may be displayed with different colors part-by-part.

The degree of scattering of the light of first liquid crystal layer 30A is higher than the dispersity of light of each of the second liquid crystal layer 30B and the third liquid crystal layer 30C. The first liquid crystal layer 30A is in a scattering state. Thus, when the background is seen through the display panel PNL, the visibility of the background can be most decreased in the target area OA.

On the other hand, the parallelism of light passing the third liquid crystal layer 30C is higher than the parallelism of light passing each of the first liquid crystal layer 30A and the second liquid crystal layer 30B. The third liquid crystal layer 30C is in a second transparent state. Thus, when the background is seen through the display panel PNL, the visibility of the background in the non-rewrite area NRA becomes most suitable.

Furthermore, the second liquid crystal layer 30B is in a first transparent state. Note that the degree of scattering of light passing the second liquid crystal layer 30B is higher than the degree of scattering of light passing the third liquid crystal layer 30C. When the background is seen through the display panel PNL, the background can be blurred in the non-target area NOA, and the visibility of the background in the non-target area NOA can be decreased. Thus, a user can easily recognize the image CR.

Figure 24:
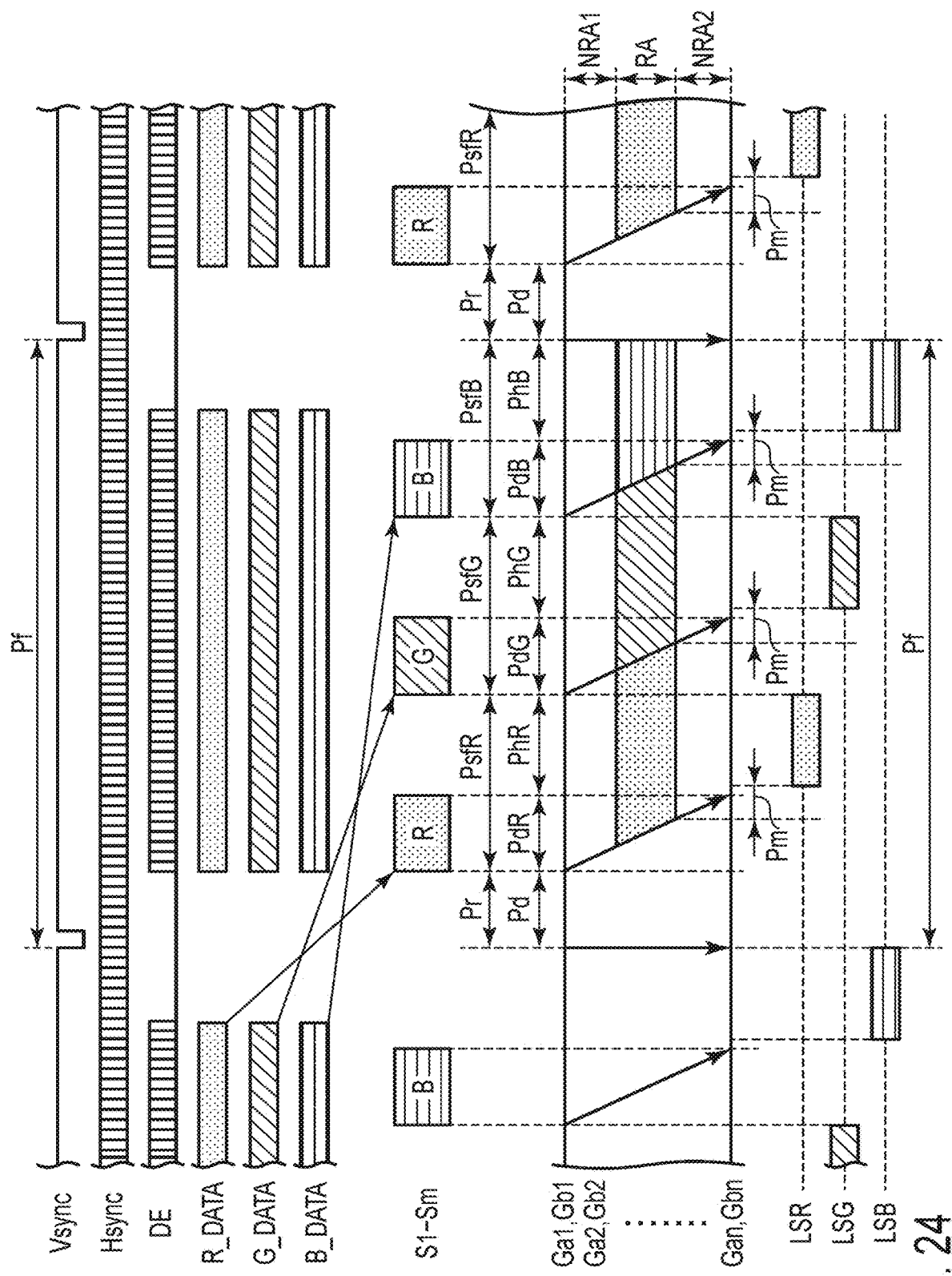
FIG. 24 is a timing chart illustrating an example of display operation.

FIG. 24 is a timing chart of an example of the display operation of the display device DSP of the present embodiment.

As in FIG. 24, when one frame starts, a vertical synchronization signal Vsync falls. That is, in this example, a time from the fall of the vertical synchronization signal Vsync to fall thereof corresponds to a frame period (one frame period) Pf. For example, if the display device DSP is driven at 60 Hz, the frame period Pf is approximately 16.7 ms.

The frame period Pf includes a reset period Pr executing the aforementioned transparent drive, a first subframe period PsfR, a second subframe period PsfG, and a third subframe period PsfB. Each subframe period Psf corresponds to a period to execute the aforementioned display drive. In this example, the reset period Pr is a top period of the frame period Pf. The reset period Pr, the first subframe period PsfR, the second subframe period PsfG, and the third subframe period PsfB are arranged in this order. Note that, unlike the present example, the reset period Pr may not be the top period of the frame period Pf but the last period of the frame period Pf.

In the reset period Pr, the transparent drive is executed under the control of the timing controller TC. That is, the scanning line driving circuit GD supplies the first control signal Ca of H level to all first scanning lines Ga at the same time. Furthermore, the scanning line driving circuit GD may supply the first control signal Ca of H level to the first scanning line Ga1 to the first scanning line Gan in this order.

Furthermore, in the reset period Pr, the signal line driving circuit SD supplies the image signal Vsig which is the same value as the common voltage Vcom, for example, to all signal lines S. Through this operation, the second transparent voltage VA2 is written between the pixel electrodes PE and the common electrode CE in all pixels PX. Then, the pixel electrode PE of each pixel PX is in an electrically floating state until the image signal Vsig is supplied thereto next. Thus, in the pixels PX to which the second transparent voltage VA2 is written, the second transparent voltage VA2 is maintained until the image signal Vsig is supplied next.

In the pixel PX to which the second transparent voltage VA2 is written, the liquid crystal layer 30 is in a good second transparent state, and thus, the visibility of the background of the display panel PNL is increased. In the present embodiment, in the reset period Pr, the light emitting elements LSR, LSG, and LSB are all turned off. Note that it is desirable that the light emitting elements LSR, LSG, and LSB are turned off in the reset period Pr; however, they may be turned on in the reset period Pr.

In the reset period Pr, the image signal Vsig supplied to each of the signal lines Si to Sm is not necessarily the same as the common voltage Vcom as long as the voltage written to each pixel PX is a value which becomes the second transparent voltage VA2. The various models explained above with reference to FIGS. 16A and 16B can be applied to the common voltage Vcom and the image signal Vsig in the transparent drive.

In the resent period Pr of the present embodiment, the first scanning lines Ga are driven, and thereafter, the second scanning lines Gb are not driven.

In the reset period Pr, a period to supply the first control signal Ca of H level collectively to all first scanning lines Ga is a drive period Pd. For example, a length of the drive period Pd is a period to orderly scan five to ten first scanning lines Ga. By securing the drive period Pd for a predetermined period as above, the potential of the pixel electrode PE and the potential of the common electrode CE can each transit to a desired value. Furthermore, in the example depicted, a first subframe period PsfR comes immediately after the drive period Pd, Pr=Pd with respect to a time period. The reset period Pr may include a retain period to further retain the second transparent voltage VA2 after the drive period Pd.

The first subframe period PsfR, the second subframe period PsfG, and the third subframe period PsfB continue in this order, but unlike the present example, the order of the subframe periods Psf may be different. In each subframe period Psf, the timing generator 50 controls the frame memory 51, the line memories 52R, 52G, and 52B, and the data converter 53 with a data synchronization signal SS, and uses the detector 55 and the table 56 to execute the display drive of each color.

The first subframe period PsfR includes a drive period PdR and a retain period PhR. In the drive period PdR, the scanning line driving circuit GD orderly supplies the first control signals of H level to the first scanning lines Ga1 to Gan, and orderly supplies the second control signal Cb of H level to the second scanning lines Gb1 to Gbn.

Furthermore, in the drive period PdR, the signal line driving circuit SD supplies the image signal Vsig corresponding to red subframe data stored in the line memory 52R (R_DATA) to each of the signal lines S1 to Sm. Specifically, an operation to supply the image signal Vsig of gradation corresponding to each pixel PX of a line to which the first control signal Ca of H level and the second control signal Cb of H level are supplied to each of the signal lines S1 to Sm at once is repeated.

The image signal Vsig is supplied to the pixel electrode PE of the selected pixel PX via the first switch SW1, and then, the first switch SW1 is turned off to maintain the potential of the pixel electrode PE. Or, by the coupling effect, the potential of the pixel electrode PE is changed. Then, a plurality of pixels PX in the next row are selected, and the same drive is sequentially performed.

Through the above operation, a voltage corresponding to red subframe data is written between the pixel electrode PE and the common electrode CE of each pixel PX.

The retain period PhR is a period between the completion of write to all pixels PX and the arrival of the second subframe period PsfG. In the retain period PhR, the light emitting element LSR emits red light. After the write to all pixels PX in the rewrite area RA is completed, a margin period Pm is prepared, and the light emitting element LSR is made to turn on after that. Before the light emitting element LSR is turned on, the margin period Pm may be omitted; however, the margin period Pm is preferred. Thereby, for example, a response period of liquid crystal can be secured. Thus, a red image is displayed in the display area DA.

The operation of each of the second subframe period PsfG and the third subframe period PsfB is the same as in the first subframe period PsfR. That is, the second subframe period PsfG includes the drive period PdG and the retain period PhG, and a voltage corresponding to green subframe data stored in the line memory 52G (G_DATA) is written to the pixels PX in the rewrite area RA in the drive period PdG. At that time, a state where the second transparent voltage VA2 is applied to the pixels PX in the non-rewrite area NRA is maintained, the scattering voltage VB is applied to the pixels PX in the target area OA, and the first transparent voltage VA1 is applied to the pixels in the non-target area NOA. In the retain period PhG, the light emitting element LSG emits green light. Thus, a green image is displayed on the display area DA.

Furthermore, the third subframe period PsfB includes the drive period PdB and the retain period PhB, and a voltage corresponding to blue subframe data stored in the line memory 52B (B_DATA) is written to the pixels PX in the rewrite area RA in the drive period PdB. In the retain period PhB, the light emitting element LSB emits blue light. Thus, a blue image is displayed on the display area DA.

In a frame period Pf, an image data to be displayed in the next frame period Pf is written to the frame memory 51. Furthermore, subframe data of the line memories 52R, 52G, and 52B which have completed write to the pixels PX are rewritten to subframe data corresponding to the image data written to the frame memory 51.

The red, green, and blue images displayed in the first subframe period PsfR, second subframe period PsfG, and third subframe period PsfB in a time division manner are mixed, and users can recognize a multicolor display image CR. Furthermore, in a reset period Pr, the second transparent voltage VA2 is applied between the pixel electrode PE and the common electrode CE of each pixel PX. Such a reset period Pr is set once per frame period Pf in order to increase the transparency of the display area DA and to improve the visibility of the background of the display area DA. Note that the reset period Pr may be set once per several frame periods Pf as described above. Or, the reset period Pr and one subframe period Psf may be set alternately. Or, the reset period Pr and several subframe periods Psf may be set alternately. In order to suppress display errors such as image burning, resets are preferred to be performed highly frequently.

When the reset period Pr is adjusted, not only the aforementioned period when the potential of the pixel electrode PE and the potential of common electrode CE transit to a desired value but also transparency of the display area DA may be considered as well.

The transparency of the display area DA is increased more when the occupation ratio of the reset periods Pr in the frame period Pf becomes greater; however, the visibility of image may be decreased. In consideration of such matters, a length of the reset period Pr is, preferably, set to be ½ or less than the length of one frame period Pf, for example. Note that, when the transparency is prioritized, the ratio of the reset periods Pr occupying the frame period Pf may further be increased. The first subframe period PsfR, second subframe period PsfG, and third subframe period PsfB are, for example, the same length. The hue of the display image may be adjusted by differing the ratio between the first subframe period PsfR, second subframe period PsfG, and third subframe period PsfB.

Now, a display operation of one frame period when the image CR is displayed as in FIG. 21 will be explained using a display operation of FIG. 24.

As in FIGS. 21 to 24, the driver DR applies, in a reset period Pr, the second transparent voltage VA2 to each of the first liquid crystal layer 30A, the second liquid crystal layer 30B, and the third liquid crystal layer 30C, and switches the light source unit LU to an off state which does not irradiate light onto the liquid crystal layer 30. In the driver DR, in all first subframe periods PsfR, second subframe period PsfG, and third subframe period PsfB, the first transparent voltage VA1 is applied to the second liquid crystal layer 30B, and maintains a state where the second transparent voltage VA2 is applied to the third liquid crystal layer 30C. The driver DR applies in one or more subframe periods of the first to third subframe periods PsfR, PsfG, and PsfB, the scattering voltage VB to the first liquid crystal layer 30A.

Here, a case where the polarity inversion drive is applied to the above display operation will be explained.

As in FIGS. 21 to 24, the scattering voltage VB includes a positive scattering voltage and a negative scattering voltage (cf. FIG. 14). The positive scattering voltage is, for example, 8 to 16 V, and the negative scattering voltage is, for example, −16 to −8 V. When the image CR is displayed in the target area OA, the driver DR applies, per frame period Pf, the positive scattering voltage VB and the negative scattering voltage VB to the first liquid crystal layer 30A alternately. At that time, the driver DR alternately applies, per frame period Pf, a positive first transparent voltage VA1 and a negative first transparent voltage VA1 to the second liquid crystal layer 30B. At that time, the driver DR applies, in each frame period Pf, a second transparent voltage VA2 to the third liquid crystal layer 30C.

The absolute value of each of the positive first transparent voltage VA1 and the negative first transparent voltage VA1 is half the maximum value of the positive scattering voltage VB and is half the maximum value of the absolute value of the negative scattering voltage VB. For example, as in the examples of FIGS. 14 and 15, the absolute value of each of the positive first transparent voltage VA1 and the negative first transparent voltage VA1 is 8 V, and the maximum value of the positive scattering voltage VB and the maximum value of the absolute value of the negative scattering voltage VB are 16 V, respectively. For example, regardless of the polarity of the first transparent voltage VA1 and the scattering voltage VB, the absolute value of the first transparent voltage VA1 is half the maximum value of the absolute value of the scattering voltage VB. Note that, it is not limited to the above example, and the positive and negative first transparent voltages VA1 should be set to a range by which the degree of scattering becomes 50% or less.

With the display device DSP and the method of driving the display device DSP of the above-described embodiment, the display device DSP includes the first scanning line Ga, the second scanning line Gb, the signal line S, the capacitance line Cs, the pixel PX, and the driver DR. The pixel PX includes the pixel electrode PE, the auxiliary electrode AE which is electrostatic capacitance coupling with the pixel electrode, the first switch SW1, the second switch SW2, and the third switch SW3. The driver DR supplies the first control signal Ca to the first scanning line Ga to switch each of the first switch SW1 and the second switch SW2 between on and off, supplies the second control signal Cb to the second scanning line Gb to switch the third switch SW3 between on and off, supplies the image signal Vsig to the signal line S, and supplies the auxiliary signal AS to the capacitance line Cs.

In the first drive period Pd1, the driver DR turns on each of the first switch SW1 and the second switch SW2, turns off the third switch SW3, supplies the image signal Vsig to the pixel electrode PE via the signal line S and the first switch SW1, and supplies the auxiliary signal AS to the auxiliary electrode AE via the capacitance line Cs and the second switch SW2. Furthermore, in the second drive period Pd2 following the first drive period Pd1, the driver DR turns off each of the first switch SW1 and the second switch SW2, turns on the third switch SW3, and supplies the image signal Vsig to the auxiliary electrode AE via the signal line S and the third switch SW3.

Even if the voltage range of each of the image signal Vsig, the common voltage Vcom, and the auxiliary signal AS is set to 0 to +8 V, the voltage VLC applied to the liquid crystal layer 30 can be set to a range of −16 to +16 V. Since the voltage range of each of the image signal Vsig, the common voltage Vcom, and the auxiliary signal AS is not necessarily set to 0 to +16 V, a display device DSP which can reduce power use and a method of driving a display device DSP can be achieved.

Furthermore, in the present embodiment, a display device DSP of excellent voltage resistance and a method of driving such a display device DSP can be achieved. Furthermore, in the present embodiment, a display device DSP which can suppress production costs of a driver DR and a method of driving such a display device DSP can be achieved.

(Variation 1)

Now, a display device DSP of a variation 1 of the above-described embodiment and a method of driving the display device DSP will be explained. FIG. 25 illustrates main structural elements of the display device DSP of variation 1 of the embodiment.

As in FIG. 25, the display device DSP is different from the structure of FIG. 3 in respect of a controller CNT including a level conversion circuit (L/S circuit) LSC and Vcom drawing circuit LIC.

A common voltage (Vcom) supplied from the Vcom circuit VC is supplied to the common electrode CE, and is also supplied to the Vcom drawing circuit LIC. The Vcom drawing circuit LIC is interposed between the signal line driving circuit SD and each signal line S. The Vcom drawing circuit LIC supplies the image signal output from the signal line driving circuit SD to each signal line S. Furthermore, the Vcom drawing circuit LIC may supply the common voltage form the Vcom circuit VC to each signal line S.

FIG. 26 illustrates an example of the structure of the Vcom drawing circuit LIC of FIG. 25. The Vcom drawing circuit LIC includes switching elements SWI1 to SWIm. The switching elements SWI1 to SWIm are arranged in the first substrate SUB1 of the display panel PNL, for example. A line LN1 is connected to input ends (sources) of the switching elements SWI1 to SWIm, signal lines S1 to Sm are connected to output ends (drains) thereof, respectively, and a line LN2 is connected to control ends (gates).

The Vcom circuit VC of FIG. 25 supplies the common voltage Vcom to the line LN1. Note that this operation may be applied to drive performed when the second transparent voltage is written to the pixels PX, to drive performed in a reset period, and to both of said drives. When the Vcom drawing circuit LIC supplies the common voltage Vcom to the signal lines S1 to Sm, the output of the signal line driving circuit SD is controlled in a high impedance manner. Furthermore, the timing controller TC outputs the control signal to the level conversion circuit LSC when executing the transparent scanning. The level conversion circuit LSC converts the control signal to a predetermined level voltage and supplies the voltage to the line LN2. When the control signal is supplied to the line LN2, the line LN1 and each of the signal lines S1 to Sm become conductive, and the common voltage Vcom of the line LN1 is supplied to each of the signal lines S1 to Sm.

When the first control signal Ca is supplied to each of the first scanning lines Ga1 to Gan while the common voltage Vcom is being supplied to each of the signal lines S1 to Sm as above, the common voltage Vcom of each of the signal lines S1 to Sm is supplied to each pixel electrode PE. That is, a potential difference between each pixel electrode PE and the common electrode CE becomes 0 V (second transparent voltage).

In the variation 1, the advantages of the above embodiment can be achieved the same. With the structure of variation 1, there is no need of a circuit to supply a voltage for transparent scanning (for example, common voltage Vcom) in the signal line driving circuit SD, for example.

(Variation 2)

Figure 27:
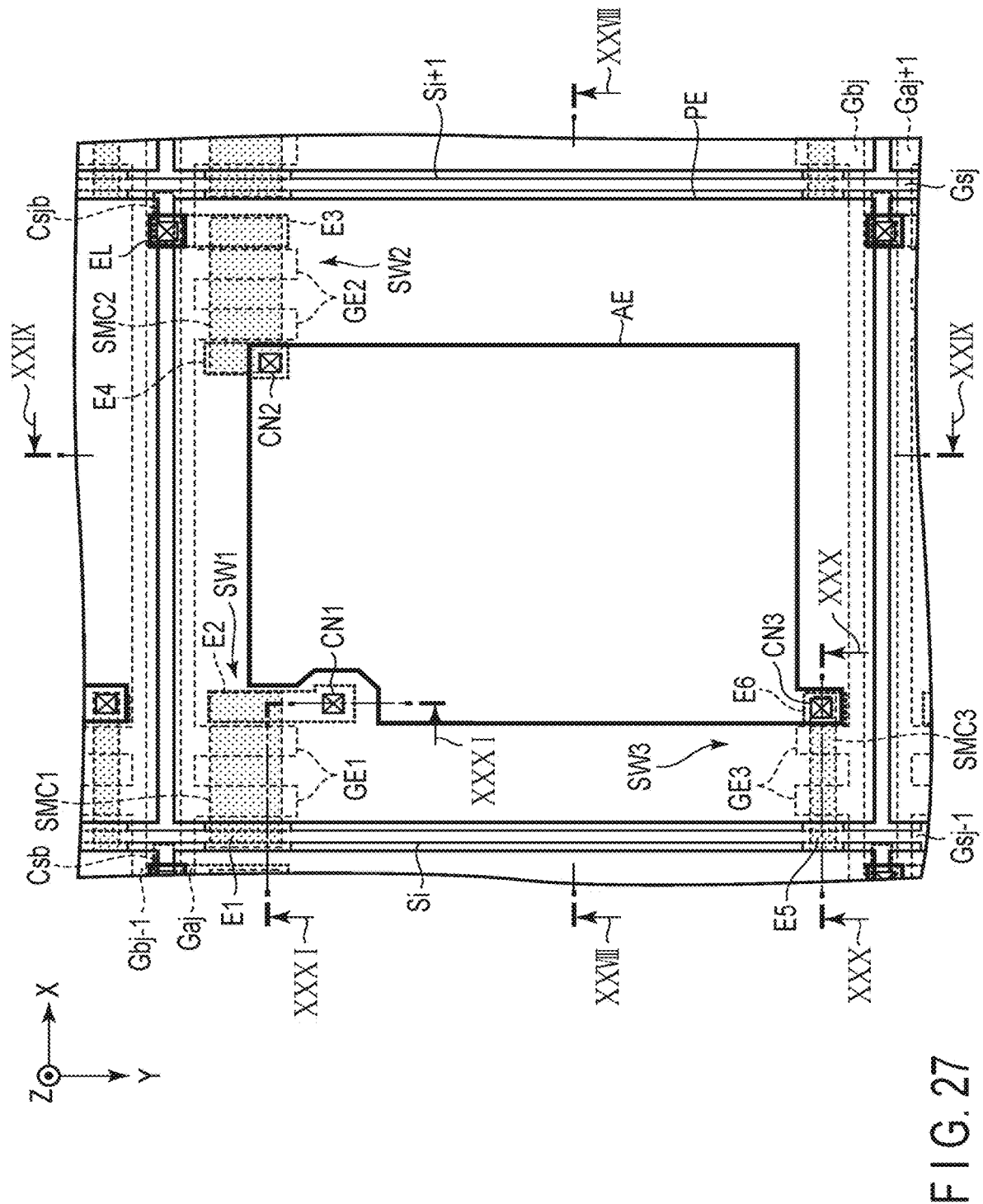
FIG. 27 is a plan view of a part of a first substrate of a display device of variation 2 of the embodiment, illustrating the pixel.

Now, the display device DSP of variation 2 of the embodiment will be explained. FIG. 27 is a plan view of a part of a first substrate SUB1 of the display device DSP of variation 2 of the embodiment, and illustrates the pixel PX. As compared to the above-described embodiment, variation 2 has (1) different extending direction of the capacitance line Cs, (2) different channel widths of the switches SW1, SW2, and SW3 (TFT), (3) different capacitance size of the condenser CO, and (4) different arrangement of the switches SW1, SW2, and SW3.

Now, item (1) will be explained.

As in FIG. 27, in variation 2, the capacitance line Cs extends in the second direction Y, and is opposed to the signal line S. The capacitance line Cs includes a projection Csb projecting in the first direction X to be electrically connected to the third electrode E3. For example, a capacitance line Csj−1 is opposed to a signal line Si and extends along the signal line Si. A capacitance line Csj is opposed to a signal line Si+1 and extends along the signal line Si+1. A projection Csjb of the capacitance line Csj is opposed to the connection electrode EL and is electrically connected to the third electrode E3 via the connection electrode EL.

In variation 2, capacitance coupling between the capacitance line Cs and the scanning line G can be reduced. In other words, load of the scanning line G can be decreased. Thus, in variation 2, the scanning line G can be driven rapidly.

Note that, in variation 2, load of the signal line S increases as compared to the above-described embodiment; however, it is preferred than a case where load of scanning line G is increased. Furthermore, even if load of the signal line S is increased, affect by load of the signal line S can be suppressed by adjusting a material of the signal line S to reduce the electric resistance value thereof.

Now, item (2) will be explained.

Channel widths of the switches SW1, SW2, and SW3 (TFT) in variation 2 are smaller than those of the above-described embodiment. The area of the channel region of each of the switches SW1, SW2, and SW3 (TFT) can be decreased. Thus, as compared to the above-described embodiment, the switches SW1, SW2, and SW3 (TFT) of variation 2 can shorten a time to write a signal (voltage). Furthermore, in variation 2, the switches SW1, SW2, and SW3 can be minimized, and thus, improvement of an opening area of the pixel PX can be facilitated.

Now, item (3) will be explained.

The size of the auxiliary electrode AE is smaller than the size of the pixel electrode PE. The auxiliary electrode AE is formed to be further inner side than is the pixel electrode PE. In variation 2, the auxiliary electrode AE is not opposed to the first switch SW1 while being opposed to a part of the fourth electrode E4 of the second switch SW2, and is opposed to the sixth electrode E6 of the third switch SW3. Thus, the shape of the auxiliary electrode AE is not a quadrangle but is a partially-deformed quadrangle. For example, in the area opposed to the first switch SW1, the auxiliary electrode AE is formed as a quadrangle partially concaved. A part of the auxiliary electrode AE is projected in order to be opposed to the sixth electrode E6. Furthermore, the main part of the auxiliary electrode AE is not limited to a quadrangle, and may be a polygon or a non-rectangle such as a circle, and even if the main part of the auxiliary electrode AE is a polygon or a non-rectangle, a part thereof may be projected to be connected to the second switch SW2 and the third switch SW3.

In variation 2, the size of the condenser CO can be smaller than that of the above-described embodiment. When the size of the auxiliary electrode AE becomes smaller, the capacitance size of the condenser CO becomes smaller accordingly. Note that, if the capacitance size of the condenser CO is desired to be small, decreasing the size of the auxiliary electrode AE as in variation 2 is preferred. For example, by decreasing the size of the auxiliary electrode AE, a time for writing can be shortened.

Now, item (4) will be explained.

The switches SW1, SW2, and SW3 are randomly arranged at corners of the pixel PX. In variation 2, the first switch SW1 is positioned at the upper left corner of the pixel PX. The second switch SW2 is positioned at the upper right corner of the pixel PX. The third switch SW3 is positioned at the lower left corner of the pixel PX. Note that, as in the embodiment shown in FIG. 5, if the first switch and the second switch are adjacent to each other at the upper left corner, there may be a high transparent area and a low transparent area in the pixel PX, and thus, a viewer may recognize the area where the first switch and the second switch are adjacent to each other as a dot pattern in the display image, and quality of scattering state may possibly be decreased. By randomly arranging the switches SW1, SW2, and SW3 at corners of the pixel PX as in variation 2, a block of non-transparent areas formed by the switches can be resolved to be not easily recognized by viewers, and a possibility of decreasing the quality of scattering state can be suppressed.

Figure 28:
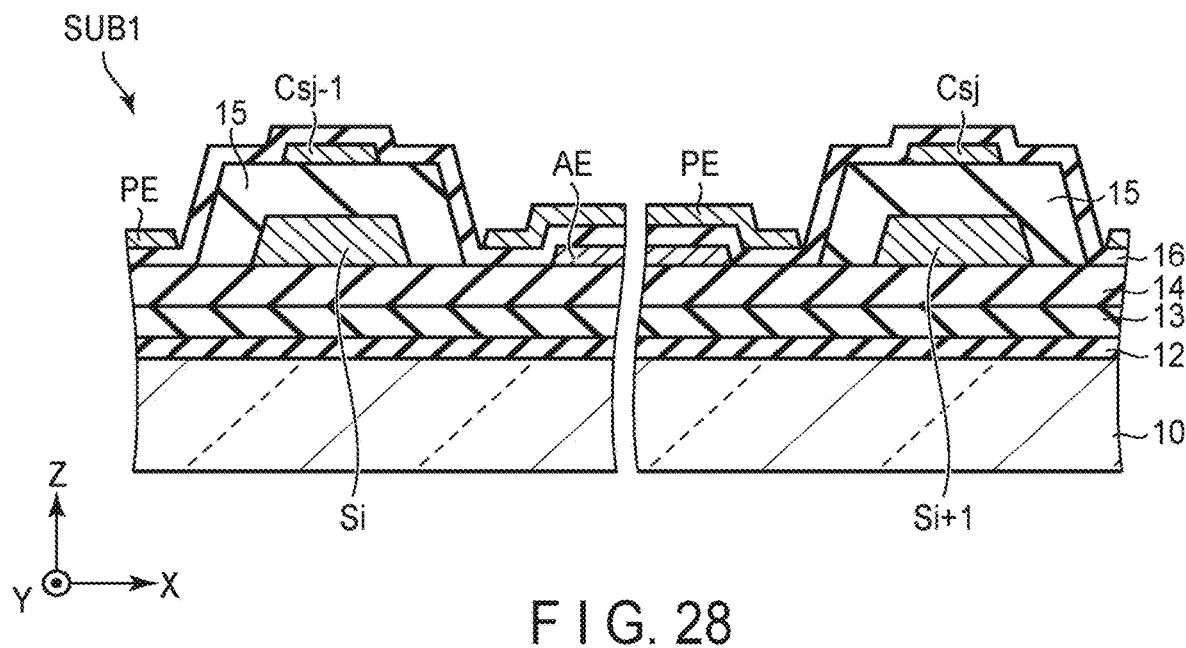
FIG. 28 is a cross-sectional view of the first substrate of FIG. 27, taken along line XXVIII-XXVIII.
Figure 29:
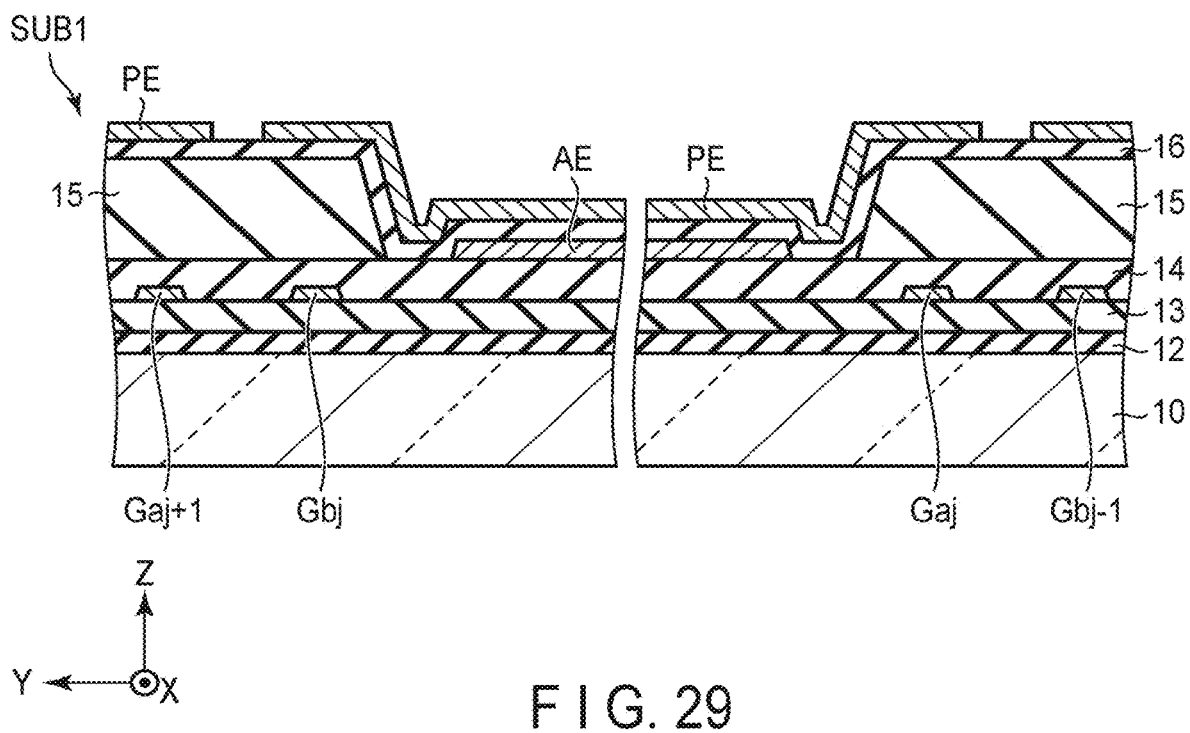
FIG. 29 is a cross-sectional view of the first substrate of FIG. 27, taken along line XXIX-XXIX.
Figure 30:
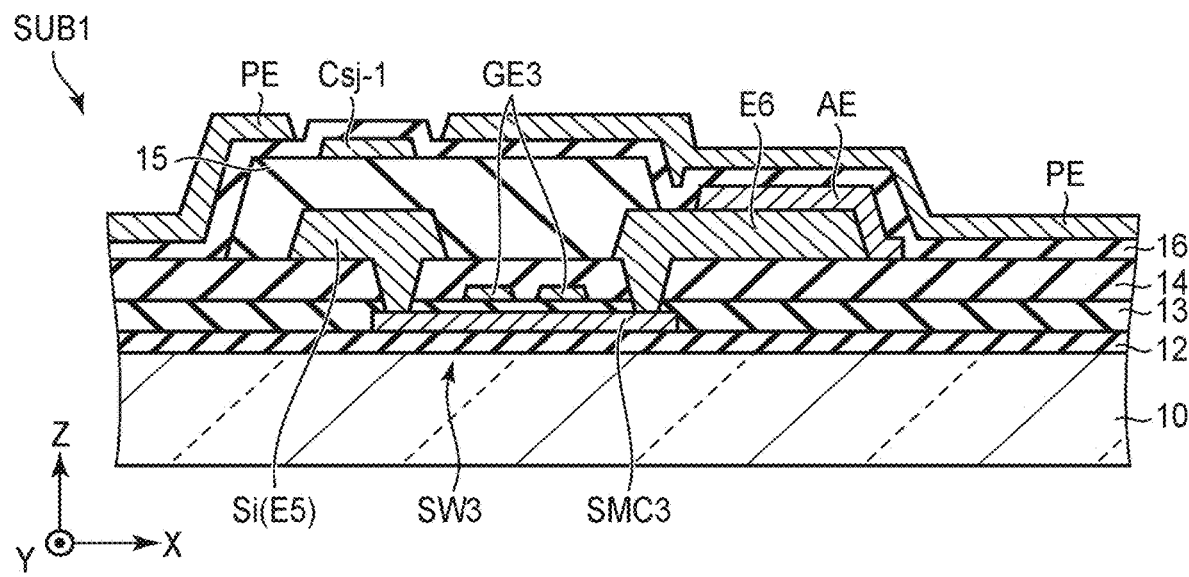
FIG. 30 is a cross-sectional view of the first substrate of FIG. 27, taken along line XXX-XXX.
Figure 31:
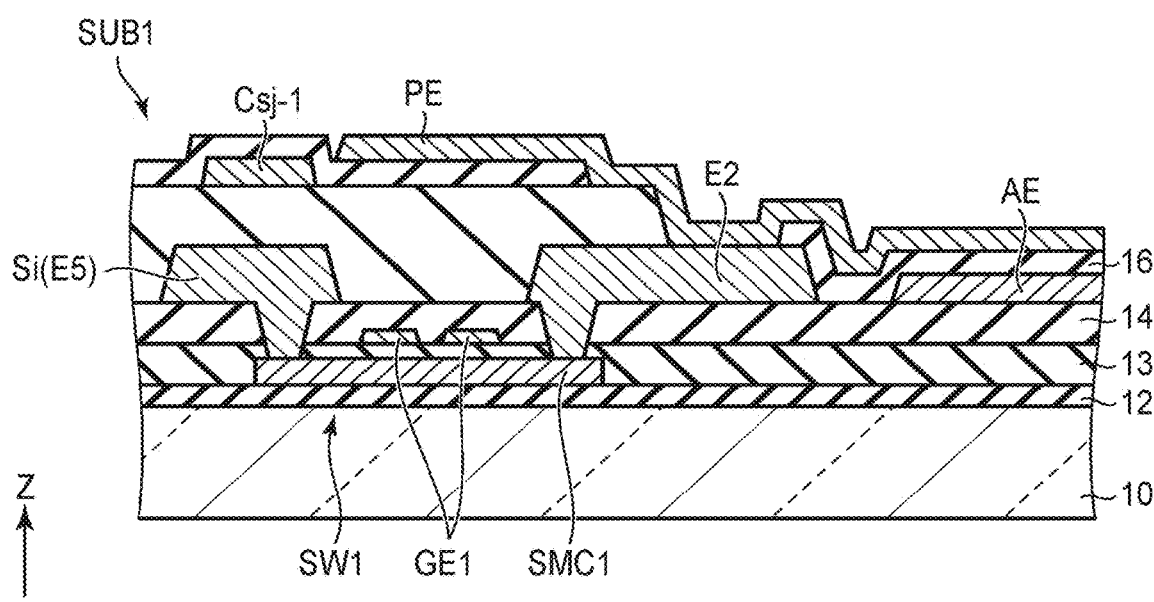
FIG. 31 is a cross-sectional view of the first substrate of FIG. 27, taken along line XXXI-XXXI.

Now, a cross-sectional structure of the first substrate SUB1 of variation 2 will be explained. FIG. 28 is a cross-sectional view of the first substrate SUB1 of FIG. 27, taken along line XXVIII-XXVIII. FIG. 29 is a cross-sectional view of the first substrate SUB1 of FIG. 27, taken along line XXIX-XXIX. FIG. 30 is a cross-sectional view of the first substrate SUB1 of FIG. 27, taken along line XXX-XXX. FIG. 31 is a cross-sectional view of the first substrate SUB1, taken along line XXXI-XXXI. In FIGS. 28 to 31, the alignment film AF1 is omitted.

As in FIG. 28, the first substrate SUB1 of variation 2 is formed without an insulating layer 11, and light shielding layers SH1, SH2, and SH3. The insulating layer 12 is arranged on the transparent substrate 10. The insulating layer 15 is not formed on the entirety of the insulating layer 14 without any gap, but is formed substantially as a lattice.

In FIG. 28, the insulating layer 15 covers the signal line S, and includes a linear part extending along the signal line S. The auxiliary electrode AE is located on the insulating layer 14. The insulating layer 16 partially contacts the insulating layer 14. The capacitance line Cs is located on the insulating layer 15 to be opposed to the signal line S.

As in FIG. 29, the insulating layer 15 is opposed to the scanning line G, and includes a linear part extending along the scanning line G.

As in FIG. 30, the insulating layer 15 includes a part opposed to the third switch SW3 excluding a part of the sixth electrode E6. The above part of the insulating layer 15 is formed integrally with the linear part of the insulating layer 15. The auxiliary electrode AE is arranged on the insulating layer 14 and the sixth electrode E6, and is in contact with the sixth electrode E6. The auxiliary electrode AE is in contact with the sixth electrode E6 without forming a contact hole in the insulating layer 15.

As in FIG. 31, the insulating layer 15 includes a part opposed to the first switch SW1 excluding a part of the second electrode E2. The above part of the insulating layer 15 is formed integrally with the linear part of the insulating layer 15. The insulating layer 16 is opposed to a part of the second electrode E2, and a part of the insulating layer 15, and the like. The pixel electrode PE is arranged on the second electrode E2, the insulating layer 15, and the insulating layer 16, and is in contact with the second electrode E2.

The advantages of the above embodiment can be achieved in variation 2 as well.

(Variation 3)

Figure 32:
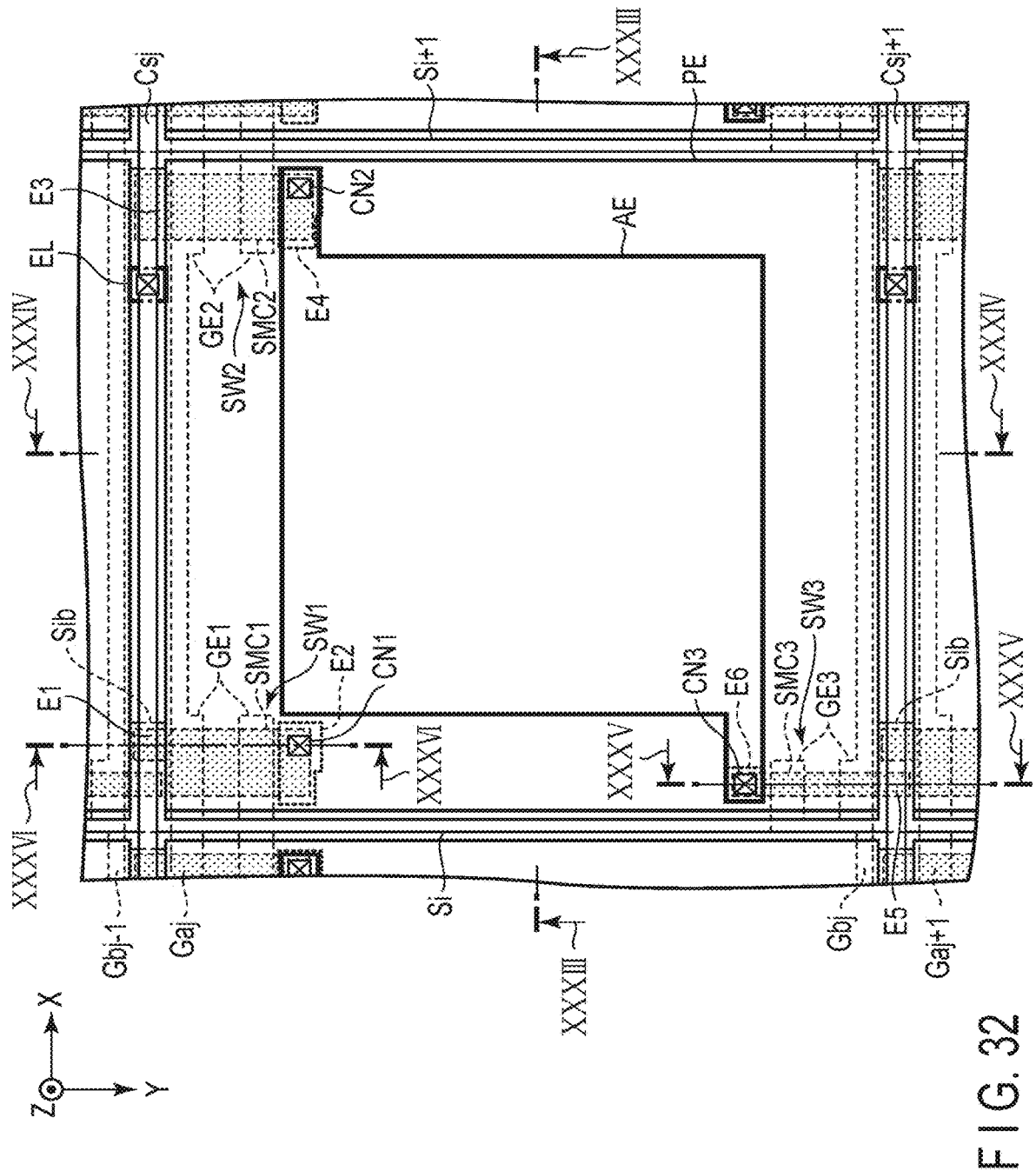
FIG. 32 is a plan view of a part of a first substrate of a display device of variation 3 of the embodiment, illustrating the pixel.

Now, a display device DSP of variation 3 of the embodiment will be explained. FIG. 32 is a plan view illustrating a part of the first substrate SUB1 of the display device DSP of variation 3 of the embodiment, and illustrates the pixel PX. As compared to variation 2, variation 3 includes (2) same channel widths of the switches SW1, SW2, and SW3 (TFT), (3) same capacitance size of the condenser CO, and (4) same arrangement of the switches SW1, SW2, and SW3 while including (1) different extending direction of the capacitance line Cs and (5) different orientation of the switches SW1, SW2, and SW3.

Now, item (1) will be explained.

As in FIG. 32, in variation 3, the capacitance line Cs extends in the first direction X as with the embodiment (FIG. 5).

Now, item (5) will be explained.

In the first switch SW1, the first semiconductor layer SMC1 extends in the second direction Y, and the first gate electrode GE1 extends in the first direction to cross the first semiconductor layer SMC1. The signal line S includes a projection Sb projecting in the first direction X to be electrically connected to the first semiconductor layer SMC1. For example, the projection Sib of the signal line Si is the first electrode E1, is opposed to the first semiconductor layer SMC1, and is electrically connected to the first semiconductor layer SMC1.

In the second switch SW2, the second semiconductor layer SMC2 extends in the second direction Y, and the second gate electrode GE2 extends in the first direction X to cross the second semiconductor layer SMC2. The third electrode E3 extends in the first direction X to be opposed to the capacitance line Cs. The connection electrode EL is opposed to the third electrode E3. Thus, the capacitance line Csj is electrically connected to the third electrode E3 via the connection electrode EL.

In the third switch SW3, the third semiconductor layer SMC3 extends in the second direction Y, and the third gate electrode GE3 extends in the first direction X to cross the third semiconductor layer SMC3. Note that the third semiconductor layer SMC3 is positioned with the first semiconductor layer SMC1 of an adjacent pixel PX with an insulating gap therebetween. The projection Sb of the signal line S is opposed to the third semiconductor layer SMC3. For example, among the projections Sib of the signal line Si, the projection Sib opposed to the capacitance line Csj+1 is the fifth electrode E5 which is opposed to the third semiconductor layer SMC3 and is electrically connected to the third semiconductor layer SMC3. Note that the projection Sib opposed to the capacitance line Csj+1 functions as the first electrode E1 of the pixel PX in j+1th row.

Now, item (3) will be explained.

The auxiliary electrode AE is not opposed to the first switch SW1 but is opposed to the fourth electrode E4 of the second switch SW2, and is opposed to the sixth electrode E6 of the third switch SW3. In variation 3, the shape of the auxiliary electrode AE is not a quadrangle but is a partially-deformed quadrangle. For example, the auxiliary electrode AE is formed as a quadrangle part of which is projected in the first direction X to be opposed to the fourth electrode E4. Furthermore, the auxiliary electrode AE is formed as a quadrangle part of which is projected in the first direction X to be opposed to the sixth electrode E6.

Figure 33:
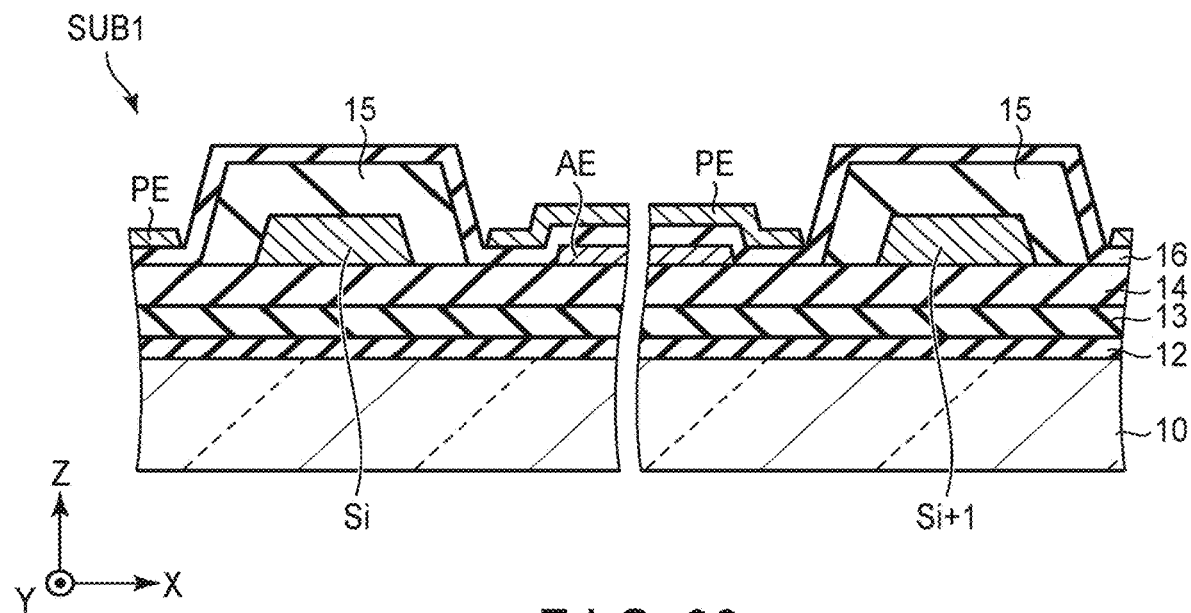
FIG. 33 is a cross-sectional view of the first substrate of FIG. 32, taken along line XXXIII-XXXIII.
Figure 34:
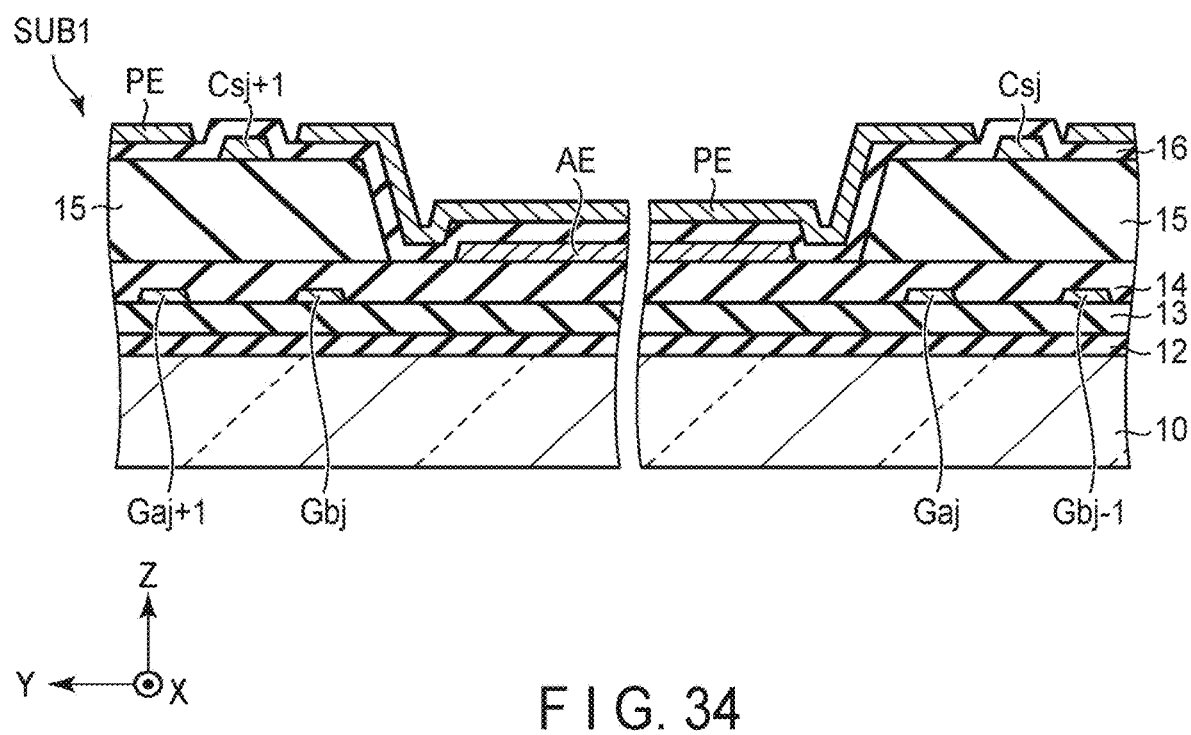
FIG. 34 is a cross-sectional view of the first substrate of FIG. 32, taken along line XXXIV-XXXIV.
Figure 35:
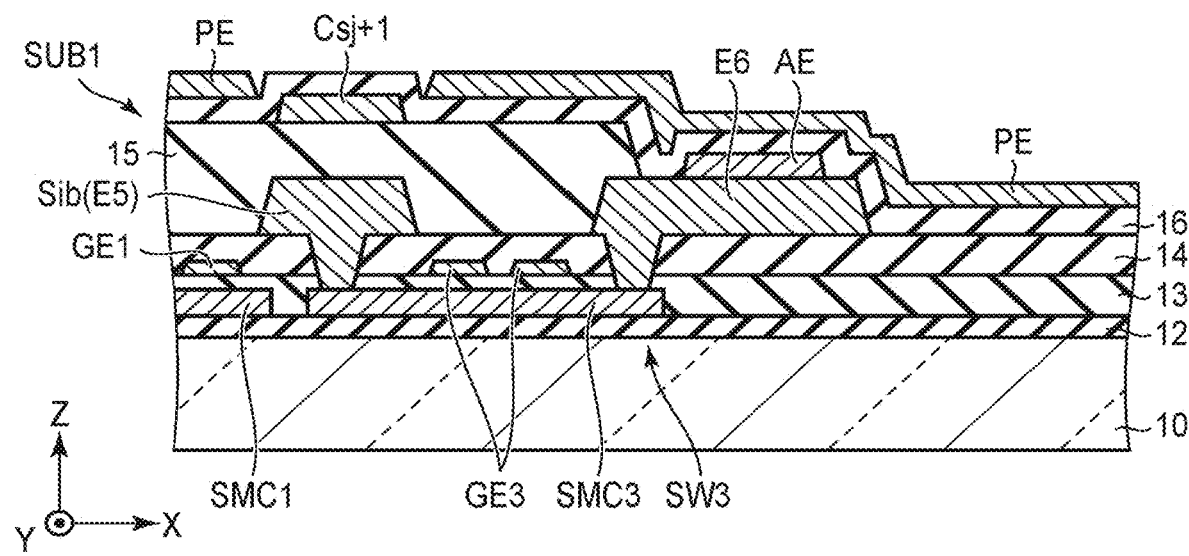
FIG. 35 is a cross-sectional view of the first substrate of FIG. 32, taken along line XXXV-XXXV.
Figure 36:
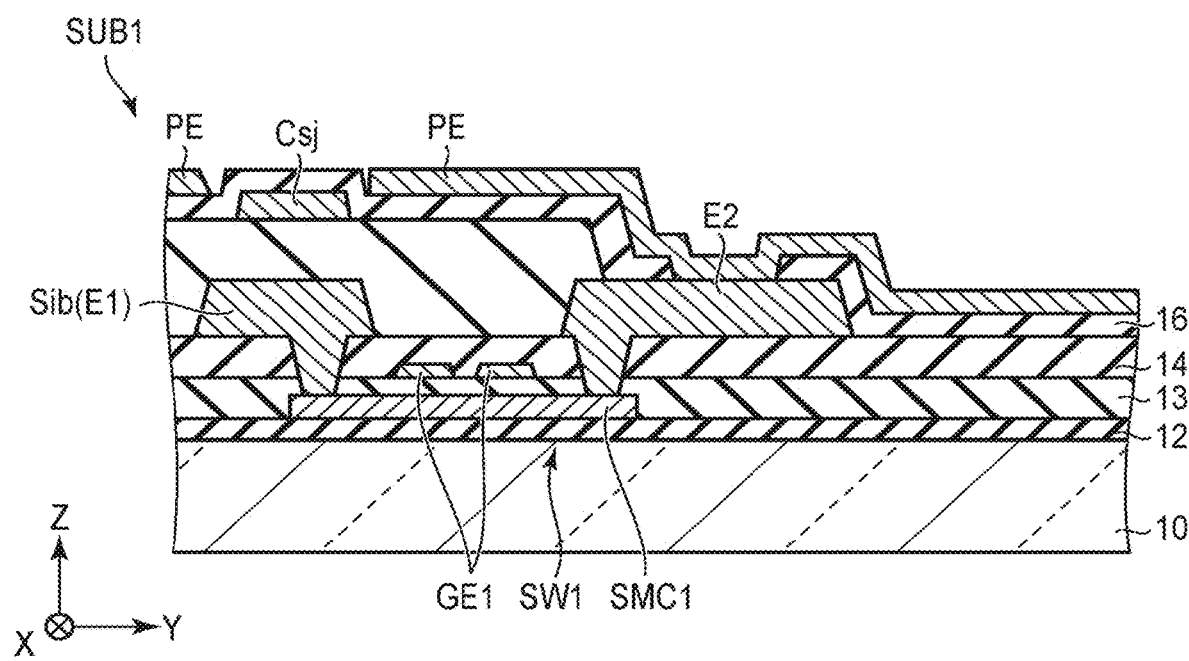
FIG. 36 is a cross-sectional view of the first substrate of FIG. 32, taken along line XXXVI-XXXVI.

Now, a cross-sectional structure of the first substrate SUB1 of variation 3 will be explained. FIG. 33 is a cross-sectional view of the first substrate SUB1 of FIG. 32, taken along line XXXIII-XXXIII. FIG. 34 is a cross-sectional view of the first substrate SUB1 of FIG. 32, taken along line XXXIV-XXXIV. FIG. 35 is a cross-sectional view of the first substrate SUB1 of FIG. 32, taken along line XXXV-XXXV. FIG. 36 is a cross-sectional view of the first substrate SUB1 of FIG. 32, taken along line XXXVI-XXXVI. In FIGS. 33 to 36, the alignment film AF1 is omitted.

As in FIG. 33, in variation 3, the insulating layer 15 is not formed on the entirety of the insulating layer 14 without any gap, but is formed substantially as a lattice. In FIG. 33, the insulating layer 15 covers the signal line 5, and includes a linear part extending along the signal line S. Unlike variation 2, the capacitance line Cs is not opposed to the signal line S or does not extend along the signal line S.

As in FIG. 34, the insulating layer 15 is opposed to the scanning line G and includes a linear part extending along the scanning line G. The capacitance line Cs is located on the insulating layer 15. In the second direction Y, the capacitance line Csj+1 is positioned between the first scanning line Gaj+1 and the second scanning line Gbj, and the capacitance line Csj is positioned between the first scanning line Gaj and the second scanning line Gbj−1.

As in FIG. 35, the insulating layer 15 includes a part opposed to the third switch SW3 excluding a part of the sixth electrode E6. The above part of the insulating layer 15 is formed integrally with the linear part of the insulating layer 15. The auxiliary electrode AE is arranged on the sixth electrode E6, and is in contact with the sixth electrode E6. The capacitance line Csj+1 is located on the insulating layer 15 and is opposed to the projection Sib.

As in FIG. 36, the insulating layer 15 includes a part opposed to the first switch SW1 excluding a part of the second electrode E2. The above part of the insulating layer 15 is formed integrally with the linear part of the insulating layer 15. The insulating layer 16 is opposed to the insulating layer 14, part of the second electrode E2, and insulating layer 15, for example. The pixel electrode PE is arranged on the second electrode E2, the insulating layer 15, and the insulating layer 16, and is in contact with the second electrode E2.

In variation 3, the advantage of the above embodiment can be achieved as well.

(Variation 4)

Figure 37:
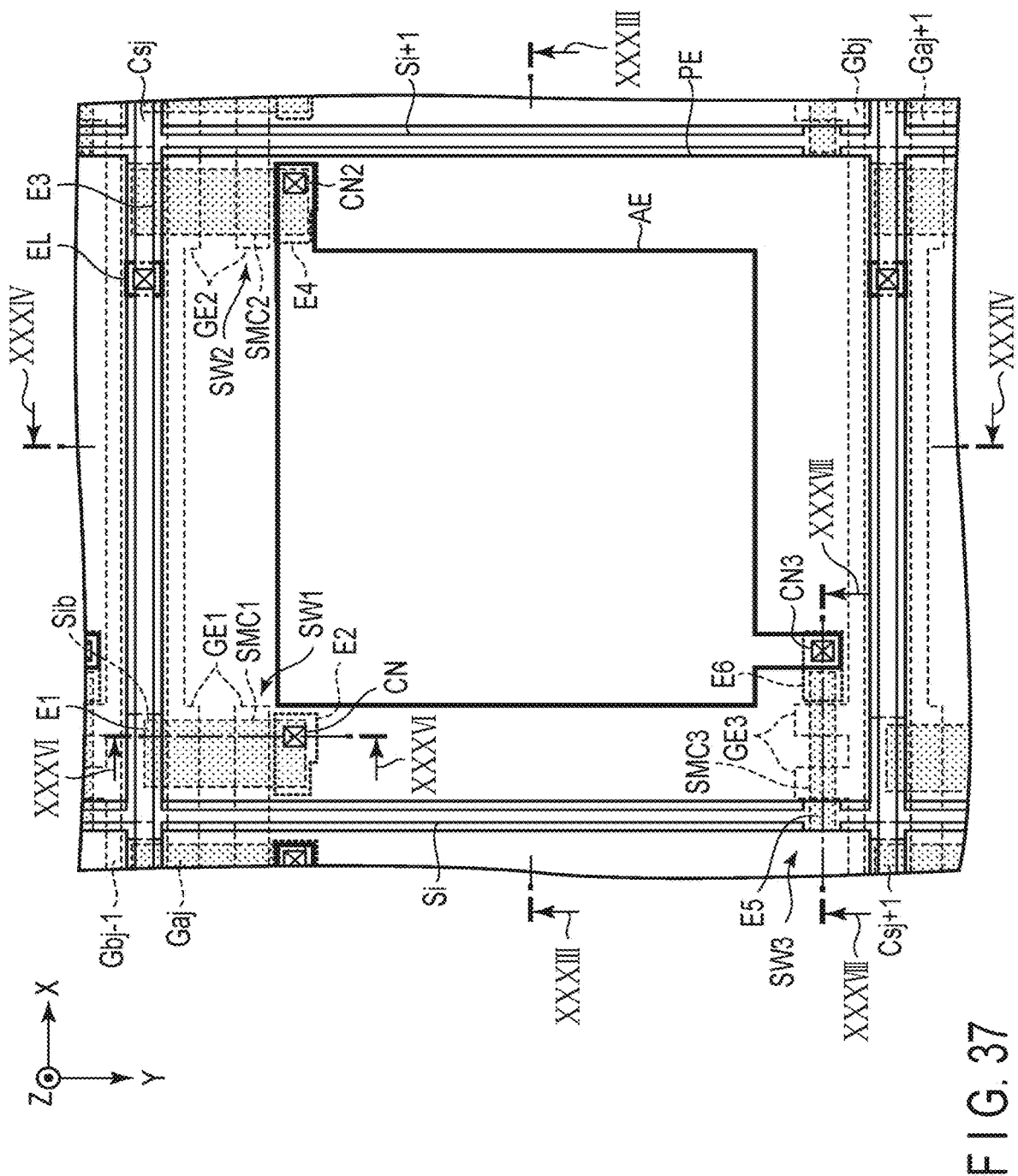
FIG. 37 is a plan view of a part of a first substrate of a display device of variation 4 of the embodiment, illustrating the pixel.

Now, a display device DSP of variation 4 of the embodiment will be explained. FIG. 37 is a plan view illustrating a part of the first substrate SUB1 of the display device DSP of variation 4 of the embodiment, and illustrates the pixel PX. As compared to variation 3, variation 4 includes (1) same extending direction of the capacitance line Cs, (2) same channel widths of the switches SW1, SW2, and SW3 (TFT), (3) same capacitance size of the condenser CO, and (4) same arrangement of the switches SW1, SW2, and SW3 while including (5) different orientation of the third switch SW3.

Now, item (5) will be explained.

As in FIG. 37, in the third switch SW3, the third semiconductor layer SMC3 extends in the first direction X, and the third gate electrode GE3 extends in the second direction Y to cross the third semiconductor layer SMC3. Note that, in variation 4, an insulating gap between the third semiconductor layer SMC3 and the first semiconductor layer SMC1 of adjacent pixel PX is sufficiently secured. Thus, the shape of the first semiconductor layer SMC1 is different from the shape of that of variation 3.

Now, a cross-sectional structure of the first substrate SUB1 of variation 4 will be explained. Note that, in FIG. 37, a cross-sectional view of the first substrate SUB1, taken along line XXXIII-XXXIII is as in FIG. 33. A cross-sectional view of the first substrate SUB1, taken along line XXXIV-XXXIV is as in FIG. 34. A cross-sectional view of the first substrate SUB1, taken along line XXXVI-XXXVI is as in FIG. 36. FIG. 38 is a cross-sectional view of the first substrate SUB1 of FIG. 37, taken along line XXXVIII-XXXVIII. In FIG. 38, the alignment film AF1 is omitted.

As in FIG. 38, the capacitance line Cs is not opposed to the signal line S or does not extend along the signal line S unlike variation 3.

In variation 4, the advantages of the above embodiment can be achieved as well.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

For example, in the above-described embodiment, a liquid crystal display device with a liquid crystal layer 30 utilizing PDLC and a driving method thereof are described as an example. However, the above-described embodiment may be applied to various liquid crystal display devices with a liquid crystal layer 30 not utilizing PDLC and a driving method thereof. Furthermore, the display device DSP and the driving method thereof are not limited to the liquid crystal display device and the driving method thereof, and can be applied to any display device and a driving method thereof. An example of the display device other than the liquid crystal display device is, for example, an electrophoretic device.

What is claimed is:

1. A display device comprising:
a first scanning line;
a second scanning line;
a signal line;
a capacitance; and
a pixel including a pixel electrode, an auxiliary electrode which is electrostatic capacitive coupling with the pixel electrode, a first switch, a second switch, and a third switch,
wherein
the first switch is electrically connected to the signal line, the pixel electrode, and the first scanning line,
the second switch is electrically connected to the auxiliary electrode, the first scanning line, and the capacitance line,
the third switch is electrically connected to the signal line, the second scanning line, and the auxiliary electrode,
the first switch is formed of a thin film transistor, and includes a first gate electrode electrically connected to the first scanning line, and a first semiconductor layer, the first semiconductor layer including a first channel region opposed to the first gate electrode, a first low resistance region which is electrically connected to the signal line and has a lower resistance than a resistance of the first channel region, and a second low resistance region which is electrically connected to the pixel electrode and has a lower resistance than the resistance of the first channel region, the first channel region positioned between the first low resistance region and the second low resistance region,
the second switch is formed of a thin film transistor, and includes a second gate electrode electrically connected to the first scanning line, and a second semiconductor laver, the second semiconductor layer including a second channel region opposed to the second gate electrode, a third low resistance region which is electrically connected to the capacitance line and has a lower resistance than a resistance of the second channel region, and a fourth low resistance region which is electrically connected to the auxiliary electrode and has a lower resistance than the resistance of the second channel region, the second channel region positioned between the third low resistance region and the fourth low resistance region, and
the third switch is formed of a thin film transistor, and includes a third gate electrode electrically connected to the second scanning line, and a third semiconductor laver, the third semiconductor layer including a third channel region opposed to the third gate electrode, a fifth low resistance region which is electrically connected to the signal line and has a lower resistance than a resistance of the third channel region, and a sixth low resistance region which is electrically connected to the auxiliary electrode and has a lower resistance than the resistance of the third channel region, the third channel region positioned between the fifth low resistance region and the sixth low resistance region.

2. The display device of claim 1, further comprising
a driver configured to feed a first control signal to the first scanning line to switch each of the first switch and the second switch between on and off, a second control signal to the second scanning line to switch the third switch between on and off, an image signal to the signal line, and an auxiliary signal to the capacitance line,
wherein
the driver is configured, in a first driving period, to turn on each of the first switch and the second switch, turn off the third switch, to feed the image signal to the pixel electrode via the signal line and the first switch, and to feed the auxiliary signal to the auxiliary electrode via the capacitance line and the second switch, and
in a second driving period following the first driving period, to turn off the first switch and the second switch, to turn on the third switch, and to feed the image signal to the auxiliary electrode via the signal line and the third switch.

3. The display device of claim 2, wherein
the driver is configured, in the second driving period,
to change a potential of the pixel electrode if a voltage value of the image signal is different from a voltage value of the auxiliary signal, and
not to change the potential of the pixel electrode if the voltage value of the image signal and the voltage value of the auxiliary signal are the same.

4. The display device of claim 2, further comprising:
a common electrode which is a part of the pixel; and
a display function layer to which a voltage applied between the pixel electrode and the common electrode is supplied,
wherein
the driver supplies a common voltage to the common electrode.

5. The display device of claim 4, further comprising:
a first substrate including the first scanning line, the second scanning line, the signal line, the capacitance line, the pixel electrode, the auxiliary electrode, the first switch, the second switch, and the third switch; and
a second substrate including the common electrode,
wherein
the display function layer is a liquid crystal layer using reverse polymer dispersed liquid crystal.

6. The display device of claim 5, wherein
one frame period includes a plurality of continuous subframe periods, and
the driver is configured, for each subframe period, to feed a positive image signal and a negative image signal alternately to the pixel electrode, and to set polarization of the common electrode to be different from that of the image signal.

7. The display device of claim 4, wherein
a voltage value of the auxiliary signal is the same as a value of the common voltage.

8. The display device of claim 1, wherein
the auxiliary electrode is opposed to each of the first switch, the second switch, and the third switch.

9. The display device of claim 1, wherein
the auxiliary electrode is positioned between the pixel electrode and a switch group including the first, second, and third switches.

10. The display device of claim 1, wherein
the first scanning line, the second scanning line, and capacitance line extend in a first direction,
the signal line extends in a second direction crossing the first direction,
the first, second, and third switches are positioned, in a plan view, between the first scanning line and the second scanning line, and opposed to the auxiliary electrode, and
the capacitance line is positioned, in a plan view, closer to the first scanning line than is the second scanning line to be apart from the auxiliary electrode.

11. The display device of claim 10, further comprising:
an insulating layer; and
another insulating layer located on the insulating layer, wherein
the capacitance line and the auxiliary electrode are positioned between the insulating layer and the another insulating layer.

\* \* \* \* \*